(12) United States Patent
Chau et al.

(10) Patent No.: US 7,174,327 B2
(45) Date of Patent: Feb. 6, 2007

(54) GENERATING ONE OR MORE XML DOCUMENTS FROM A RELATIONAL DATABASE USING XPATH DATA MODEL

(75) Inventors: Hoang K. Chau, Sunnyvale, CA (US); Isaac Kam-Chak Cheng, San Jose, CA (US); Josephine Miu Cheng, San Jose, CA (US); Suet Mui Chiu, San Jose, CA (US); Jyh-Herng Chow, San Jose, CA (US); Michael Leon Pauser, Morgan Hill, CA (US); Jian Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/062,127

(22) Filed: Jan. 31, 2002

(65) Prior Publication Data

US 2003/0014397 A1    Jan. 16, 2003

Related U.S. Application Data

(63) Continuation of application No. 09/725,363, filed on Nov. 29, 2000, now Pat. No. 6,721,727.

(60) Provisional application No. 60/168,659, filed on Dec. 2, 1999.

(51) Int. Cl.
*G06F 17/30* (2006.01)

(52) U.S. Cl. .............................................. 707/3; 707/4

(58) Field of Classification Search .............. 707/1–10, 707/100–104.1, 103 R, 501.1, 200–206; 717/100, 104, 114; 709/223, 206

See application file for complete search history.

(56) References Cited

U.S. PATENT DOCUMENTS

| 5,701,451 | A | 12/1997 | Rogers et al. | .................. | 707/1 |
| 5,734,887 | A | 3/1998 | Kingberg et al. | .............. | 707/4 |
| 5,737,592 | A | 4/1998 | Nguyen et al. | ................. | 707/4 |

(Continued)

FOREIGN PATENT DOCUMENTS

AU          740007          8/1998

(Continued)

OTHER PUBLICATIONS

Deutsch, Fernandez, Suciu (1998) Storing Semistructured Data with STORED.*

(Continued)

*Primary Examiner*—Jeffrey Gaffin
*Assistant Examiner*—Yicun Wu
(74) *Attorney, Agent, or Firm*—Gates & Cooper LLP

(57) ABSTRACT

A technique is provided for generating one or more XML documents from a relational database using the XPath data model. Data stored on a data storage device that is connected to a computer is transformed. Initially, a document object model tee is generated using a document access definition, which defines the mapping between an XML tree structure and relational tables. The document object model tree is traversed to obtain information to retrieve relational data. The relational data is mapped to one or more XML documents.

45 Claims, 11 Drawing Sheets

U.S. PATENT DOCUMENTS

| | | | | |
|---|---|---|---|---|
| 5,826,258 | A | 10/1998 | Gupta et al. | 707/4 |
| 5,870,549 | A | 2/1999 | Bobo, II | 709/206 |
| 5,899,990 | A | 5/1999 | Maritzen et al. | 707/4 |
| 5,911,075 | A | 6/1999 | Glaser et al. | 717/100 |
| 6,012,067 | A * | 1/2000 | Sarkar | 707/103 R |
| 6,199,195 | B1 * | 3/2001 | Goodwin et al. | 717/104 |
| 6,209,124 | B1 * | 3/2001 | Vermeire et al. | 717/114 |
| 6,226,675 | B1 * | 5/2001 | Meltzer et al. | 709/223 |
| 6,240,407 | B1 | 5/2001 | Chang et al. | 707/2 |
| 6,356,920 | B1 * | 3/2002 | Vandersluis | 707/501.1 |

FOREIGN PATENT DOCUMENTS

| | | |
|---|---|---|
| WO | WO 97/15017 | 4/1997 |

OTHER PUBLICATIONS

Relational Databases for Querying XML Documents: Limitations and Opportunities (Sep. 1999)☐☐Jayavel Shanmugasundaram Kristin Tufte Gang He Chun Zhang David DeWitt.*

S. Ceri et al., "XML-GL: a Graphical Query Language for Querying and Restructuring XML Documents," 8th International World Wide Web Conference (WWW8), May 1999, Toronto, Canada, 28 pp.

P. Pazandak, "XML Documents are Objects!" http://www.oasis-open.org/cover/pazandakOOXML.html; 1998; 8 pp.

V. Turau, "DB2XML: A Tool for Tranforming Relational Databases into XML Documents," http://www.informatik.fh-wiesbaden.de/~turau/DB2XML/; 1999; 6 pp.

Author Unknown, "A Time and Attendance System: Integrating Data Sources with XML," http://msdn.microsoft.com/xml/scenario/objdesign.asp/, Aug. 11, 1998, 4 pp.

Research Disclosure Article, "XML-Based Templates for Generating Artifacts from Java-Based Models," IBM, Dec. 1998, 3 pp.

Research Disclosure Article, "A Process and Tools for Multi-Modal Authoring of Web Content," IBM, Jun. 1999, 2 pp.

Floyd, M., "Web Publishing with LivePage Enterprise," Web Techniques, Jun. 1999, 4(6) 75-76, 78-79, Abstract only.

S.B. Goschnick, "Design and Development of Melbourne IT CreatorTM-a System for Authoring and Management of Online Education," Proceedings Technology of Object-Oriented Languages, Los Alamitos, CA, 1998, 187-201, Abstract only.

K. North, "Modeling, Metadata, and XML," WEB Techniques, Jun. 1999, 4(6) 18, 20-22, Abstract only.

M.M. David, "SQL-Based XML Structured Data Access," WEB Techniques, Jun. 1999, 4(6) 67-68, 70, 72, Abstract only.

T. Nguyen et al., "Accessing Relational Databases from the World Wide Web," 1996 ACM SIGMOD International Coference, Montreal Canada, Jun. 1996, pp. 529-540.

M. David, "SQL-Based XML Structured Data Access," Web Techniques, Jun. 1999, pp. 67-72.

K. North, "Modeling, Metadata, and XML," WebTechniques.com, Jun. 1999, pp. 18-22.

M. Floyd, "Web Publishing with LivePage Enterprise," Web Techniques, Jun. 1999, pp. 75-79.

S. Goschnick, "Design and Development of *Melbourne IT Creator*™—A System for Authoring and Management of Online Education," IEEE, Jun. 1998, pp. 187-201.

* cited by examiner

GENERATING ONE OR MORE XML DOCUMENTS FROM A RELATIONAL DATABASE USING XPATH DATA MODEL

PROVISIONAL APPLICATION

This application is a Continuation of application Ser. No. 09/725,363, filed Nov. 29, 2000 now U.S. Pat. No. 6,721,727, entitled 'XML DOCUMENT PROCESSING', which application is incorporated herein by reference.

This application claims the benefit of U.S. Provisional Application No. 60 168,659, entitled "XML DOCUMENT PROCESSING," filed on Dec. 2, 1999, by Isaac Cheng, et al., attorney's reference number ST9-99-106, which is incorporated by reference herein.

FIELD OF THE INVENTION

This invention relates in general to computer-implemented database systems, and, in particular, to processing Extensible Markup Language (XML) documents.

BACKGROUND OF THE INVENTION

The Internet is a collection of computer networks that exchange information via Hyper Text Transfer Protocol (HTTP). The Internet computer network consists of many internet networks. Currently, the use of the Internet computer network for commercial and noncommercial uses is exploding. Via its networks, the Internet computer network enables many users in different locations to access information stored in data sources (e.g., databases) stored in different locations.

The World Wide Web (i.e., the "WWW" or the "Web") is a hypertext information and communication system used on the Internet computer network with data communications operating according to a client/server model. Typically, a Web client computer will request data stored in data sources from a Web server computer, at which Web server software resides. The Web server software interacts with an interface connected to, for example. a Database Management System ("DBMS"), which is connected to the data sources. These computer programs residing at the Web server computer will retrieve the data and transmit the data to the client computer. The data can be any type of information, including database data, static data, HTML data, or dynamically generated data.

With the fast growing popularity of the Internet and the World Wide Web (also known as "WWW" or the "Web"), there is also a fast growing demand for Web access to databases.

Databases are computerized information storage and retrieval systems. A Relational Database Management System (RDBMS) is a database management system (DBMS) which uses relational techniques for storing and retrieving data. Relational databases are organized into physical tables which consist of rows and columns of data. The rows are formally called tuples. A database will typically have many physical tables and each physical table will typically have multiple tuples and multiple columns. The physical tables are typically stored on random access storage devices (RASED) such as magnetic or optical disk drives for semi-permanent storage. Additionally, logical tables or "views" can be generated based on the physical tables and provide a particular way of looking at the database. A view arranges rot s in some order, without affecting the physical organization of the database.

RDBMS software using a Structured Query Language (SQL) interface is shell known in the art. The SQL interface has evolved into a standard language for RDBMS software and has been adopted as such by both the American National Standards Institute (ANSI) and the International Standards Organization (ISO).

The SQL interface allows users to formulate relational operations on the tables either interactively, in batch files, or embedded in host languages, such as C and COBOL. SQL allows the user to manipulate the data. The definitions for SQL provide that a RDBMS should respond to a particular query with a particular set of data given a specified database content, but the technique that the RDBMS uses to actually find the required information in the tables on the disk drives is left up to the RDBMS. Typically, there will be more than one technique that can be used by the RDBMS to access the required data. The RDBMS will optimize the technique used to find the data requested in a query in order to minimize the computer time used and, therefore, the cost of performing the query.

Additionally, an index is an ordered set of references to the records or rows in a database file or table. The index is used to access each record in the file using a key (i.e., one of the fields of the record or attributes of the row). When data is to be retrieved, an index is used to locate records. Then, the data is sorted into a user-specified order and returned to the user.

Extensible Markup Language (XML) is a new specification that is quickly gaining popularity for creating what are termed "XML documents". XML documents comprise structured data. XML documents are being shared between multiple businesses and between businesses and customers.

When XML documents are stored as column data, searching for desired XML data can be time-consuming. Typically, a search for XML data would require searching each XML document. This is usually called a document scan. Thus, there is a need in the art for an improved technique for searching for XML documents stored as column data.

With the longstanding use of relational databases, many businesses have stored their data in relational tables. In order to share this data with businesses that are using XML documents, the data in the relational databases may be manually selected, retrieved, and stored into XML documents. This is a long, tedious task. Thus, there is a need for an improved technique of selecting, retrieving, and storing relational data into XML documents.

In order to share relational data with other businesses that are using XML documents, a user may manually convert the relational data into XML documents. This is time consuming and inefficient. Thus, there is a need for an improved technique of generating XML documents from relational data.

Additionally, when an XML document is received, a user may need to store the data from the XML document into a relational database. Currently, this is a time consuming processing in which a user manually transfers the data from the XML document to the relational database. Thus, there is a need for an improved technique of decomposing an XML document and storing the decomposed data into a relational database.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented technique for processing XML documents.

In accordance with one aspect of the present invention, data is stored in a data store connected to a computer. A main table is created having a column for storing a document, wherein the document has one or more elements or attributes. One or more side tables are created, wherein each side table stores one or more elements or attributes. Then, the side tables are used to locate data in the main table.

In accordance with another aspect of the present invention, data stored on a data storage device that is connected to a computer is transformed. A query that selects data in the data storage device is received. The selected data is retrieved into a work space. Then, one or more XML documents are generated to consist of the selected data.

In accordance with yet another aspect of the present invention, data stored on a data storage device that is connected to a computer is transformed. Initially, a document object model tree is generated using a document access definition. The document object model tree is traversed to obtain information to retrieve relational data. The relational data is mapped to one or more XML documents.

In accordance with a further aspect of the present invention, data stored on a data store that is connected to a computer is transformed. Initially an XML document containing XML data is received. A document access definition that identifies one or more relational tables and columns is received. The XML data is mapped from the application DTD to the relational tables and columns using the document access definition based on the XPath data model.

BRIEF DESCRIPTION OF THE DRAWINGS

Referring now to the drawings in which like reference numbers represent corresponding parts throughout.

DETAILED DESCRIPTION

In the following description of an embodiment of the invention, reference is made to the accompanying drawings which form a part hereof and which is shown by way of illustration a specific embodiment in which the invention may be practiced. It is to be understood that other embodiments may be utilized as structural changes may be made without departing from the scope of the present invention.

A. Hardware Architecture

Figure 1:
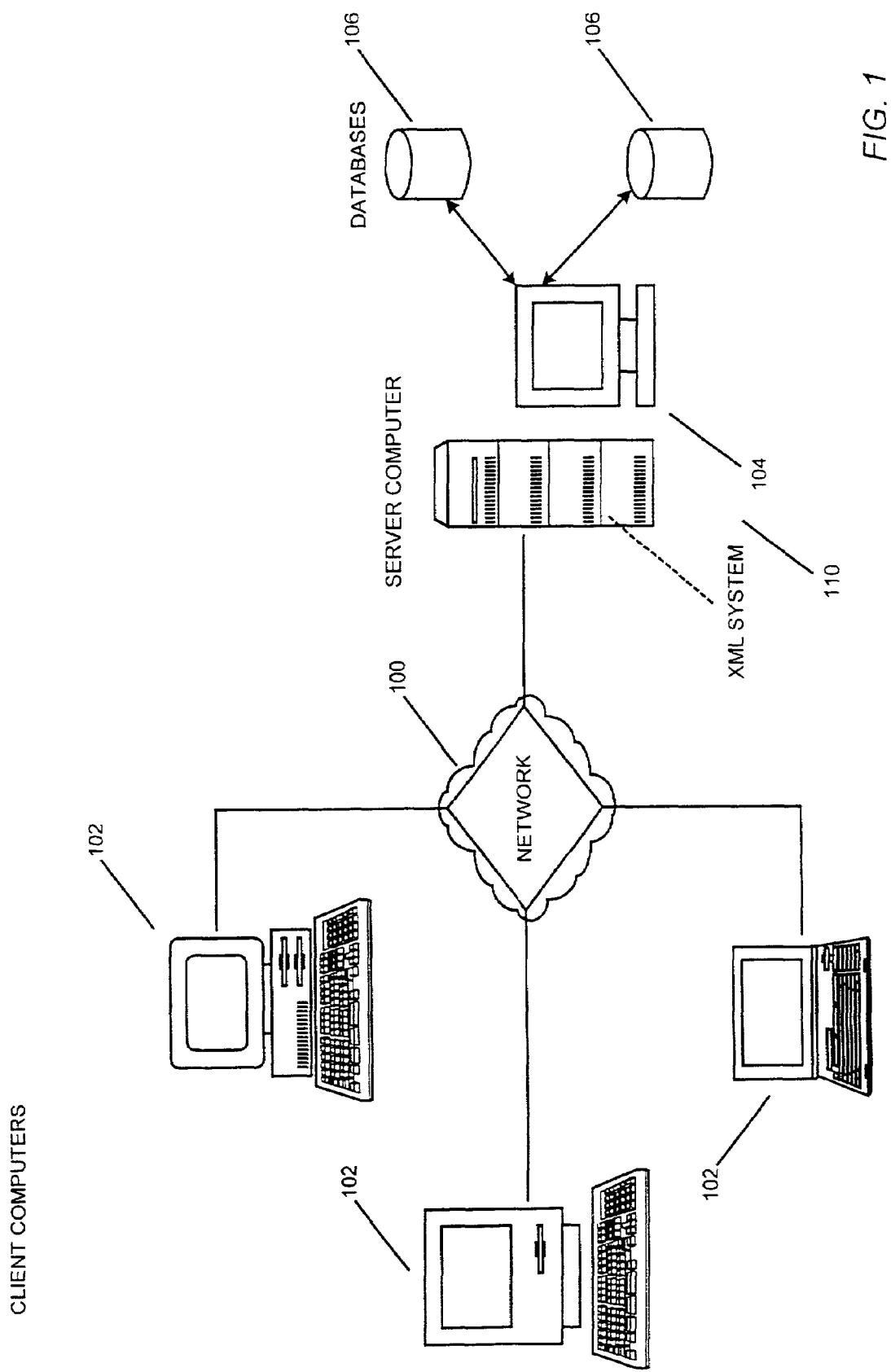
FIG. 1 schematically illustrates the hardware environment of an embodiment of the present invention, and more particularly, illustrates a typical distributed computer system using a network.

FIG. 1 schematically illustrates the hardware environment of an embodiment of the present invention, and more particularly, illustrates a typical distributed computer system using a network 100 to connect client computers 102 executing client applications to a server computer 104 executing software and other computer programs, and to connect the server system 104 to data sources 106. A typical combination of resources may include client computers 102 that are personal computers or workstations, and a server computer 104 that is a personal computer, workstation, minicomputer, or mainframe. These systems are coupled to one another by various networks, including LANs, WANs, SNA networks, and the Internet. Each client computer 102 and the server computer 104 additionally comprise an operating system and one or more computer programs.

A client computer 102 typically executes a client application and is coupled to a server computer 104 executing one or more server software. The server software may include an XML system 110. The server computer 104 also uses a data store interface and, possibly, other computer programs, for connecting to the data sources 106. The client computer 102 is bi-directionally coupled with the server computer 104 over a line or via a wireless system. In turn, the server computer 104 is bi-directionally coupled with data sources 106.

The data store interface may be connected to a Database Management System (DBMS), which supports access to a data store 106 by executing, for example, RDBMS software. The interface and DBMS may be located at the server computer 104 or may be located on one or more separate machines. The data sources 106 may be geographically distributed.

The operating system and computer programs are comprised of instructions which, when read and executed by the client and server computers 102 and 104, cause the client and server computers 102 and 104 to perform the steps necessary to implement and/or use the present invention. Generally, the operating system and computer programs are tangibly embodied in and/or readable from a device, carrier, or media, such as memory, other data storage devices, and/or data communications devices. Under control of the operating system, the computer programs may be loaded from memory, other data storage devices and/or data communications devices into the memory of the computer for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

B. XML Background

Extensible Markup Language (XML) is a subset of Standard Generalized Markup Language (SGML). XML works in conjunction with Extensible Stylesheet Language Transformation, (XSLT) and Extensible Markup Language Path (XPath). XML may also work in conjunction with a Document Object Model (DOM) or Namespace.

Extensible Markup Language (XML) is a subset of Standard Generalized Markup Language (SGML). XML is described in XML 1.0, found at the following web site: http://www.w3.org/TR/REC-xml. Extensible Markup Language (XML) is a set of rules or guidelines for designing text formats for structured data using tags. Additional detail may be found at the following web site: http://www.w3.org/XML/1999/XML-in-10-points. For interoperability, domain-specific tags called a vocabulary can be standardized using a Document Type Definition, so that applications in that domain understand the meaning of the tags.

Extensible Style Language Transformer or XSLT is a language for transforming XML documents into other XML documents. The XSLT specification defines the syntax and semantics of the XSLT language. XSLT-defined elements are distinguished by belonging to a specific XML namespace, which is referred to as the XSLT namespace. A transformation expressed in XSLT describes rules for transforming a source tree into a result tree. Further detail about XSLT may be found at http://www.w3.org/TR/xslt.

XML Path or XPath addresses parts of an XML document. XPath gets its name from its use of a path notation as in URLs for navigating through the hierarchical structure of an XML document. Further detail about XML path may be found at http://www.w3.org/TR/xpath.

A Document Object Model (DOM) is a standard set of function calls for manipulating XML files from a programming language. Additional detail may be found at the following web site: http://www.w3.org/TR/REC-DOM-Level-1/.

C. Overview of the XML System

Figure 2:
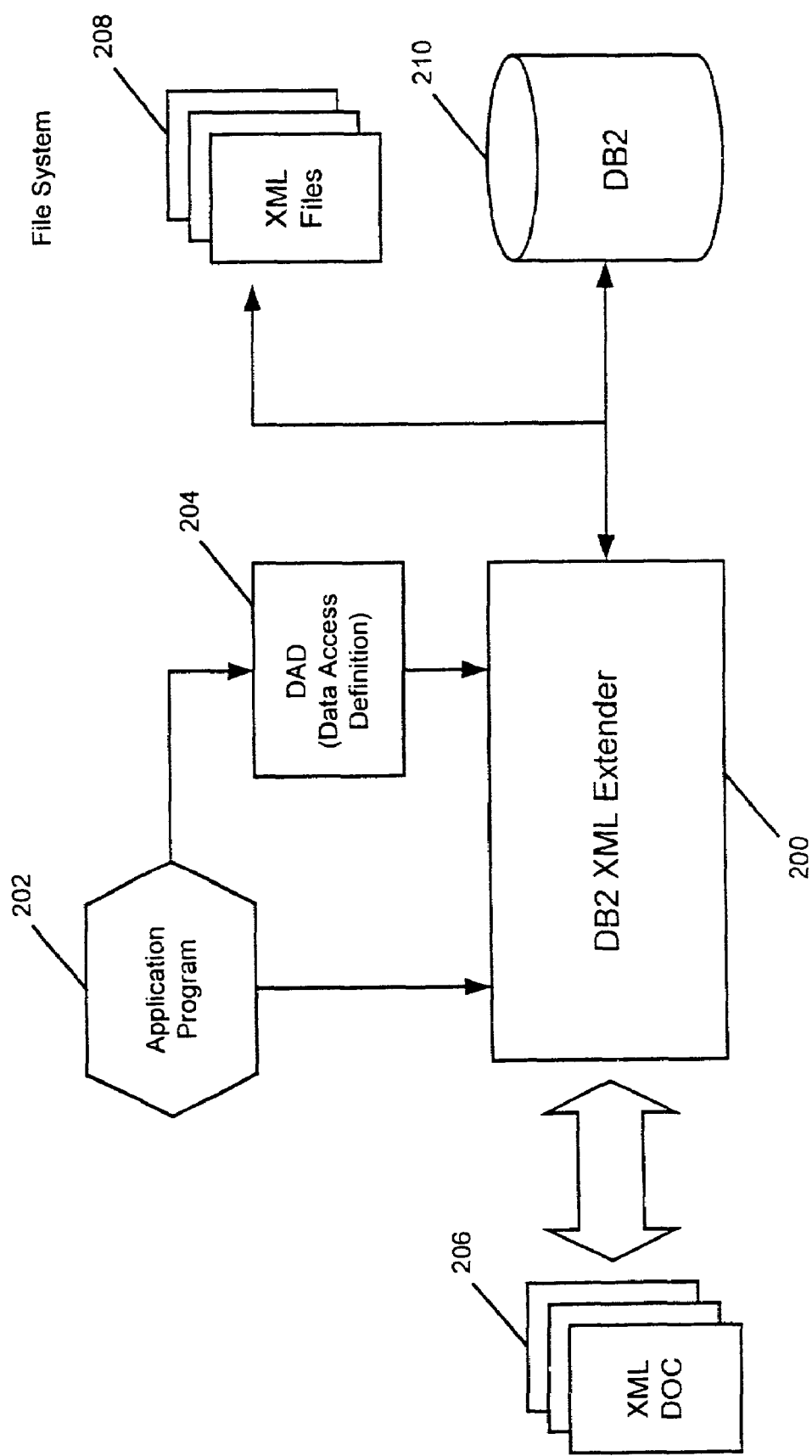
FIG. 2 is a diagram illustrating a computer software environment that could be used in accordance with the present invention.

In one embodiment of the invention, the XML System comprises the XML Extender from International Business Machines, Corporation, of Armonk, N.Y. The XML System offers the capability of XML storage and data interchange. By storage, the XML System provides mechanisms for storing and retrieving XML documents in a relational database (e.g., DB2® from International Business Machines, Corporation) and searching the content of XML with high performance. By data interchange, the XML System provides a mapping between new and existing relational tables and XML formatted documents. Thus, the XML System allows customers to do e-business anywhere, enabling XML with Business to Business (B2B) and Business to Consumer (B2C) applications. For B2B applications, application data flows between database servers, via any network (e.g., the internet or an intranet), either directly without client interaction or indirectly via some client systems. For B2C applications, application data flows between a consumer at, for example, a workstation, and a server connected via a network (e.g., between database servers and web clients via the internet). Thus, the XML System supports Business to Business (B2B) and Business to Client (B2C) applications. In both cases, the following requirements will apply:

Performance
Scalability
Integration with existing business logic
Smart query support
Legacy file support
Developer efficiency FIG. 2 is a diagram illustrating a computer hardware environment that could be used in accordance with the present invention. In one embodiment, the DB2 XML Extender 200, a product from International Business Machines, Corporation, is at the center of the architecture. An application program 202 and a document access definition (DAD) 204 are received by the DB2 XML Extender 200. The DB2 XML Extender 200 takes an XML document 206 as the input, stores the XML document 206 in DB2 210 (i.e., a relational database) either internally inside DB2 210 or externally on the file system as one or more XML files 208. Then the stored XML document 206 can also be retrieved from DB2 210 or the file system through the DB2 Extender 200. The processing performed by the DB2 XML Extender 200 will be described in more detail below.

In another embodiment, an application program 202 and a document access definition (DAD) 204 are received by the DB2 XML Extender 200. The DB2 XML Extender 200 takes an XML document 206 as input, decomposes the XML document 206 into fragmented data and stores the fragmented data in DB2 210 (i.e., a relational database). Then, the fragmented data stored in DB2 210 can be regenerated from DB2 210 through the DB2 Extender 200. The processing performed by the DB2 XML Extender 200 will be described in more detail below.

Those skilled in the art will recognize that the environment illustrated in FIG. 2 is not intended to limit the present invention. Indeed, those skilled in the art will recognize that other alternative hardware environments may be used without departing from the scope of the present invention.

C.1 Applications

Different types of applications can benefit from the use of the XML System. Some illustrations follow:

Business to Business (B2B) Applications for E-Commerce:

B2B applications mainly use XML as their interchange format, such as Electronic Data Interchange (EDI). The XML System enables maintaining native XML formatted documents, as well as mapping data into/from relational tables. With native XML formatted documents XML enables storing entire XML documents into a database and searching on known elements or attributes. With mapping, XML System enables an application builder who knows the relational data model of particular business tables to custom map XML content to or from existing tables.

Web Information Retrieval Applications:

These are B2C applications which are often used in interactive Web sites, such as sites for insurance and real-estate industries. The XML documents are usually not very large in size, but have structured information.

The XML System enables storing entire XML documents into a database and using SQL to do a fast search on desired XML elements or attributes with rich data types. Range search for rich data types is often important. Additionally the XML System enables retrieving data from existing business tables and from XML documents and putting them on a web site for viewing.

For example, an insurance company may set up a call center system in which agents retrieve phone calls from their customers. The information is collected, and the case is archived. The XML System is used to store entire XML documents in a database. Then, an insurance agent can easily display an insurance case on a screen. The XML System also provides a fast and powerful search of these insurance cases, so the insurance agent can quickly retrieve information while still on the phone with a customer. Additionally, alternative ways of searching for information, i.e. numbers, text wildcards, key words, etc., are provided by XML System.

Content Management:

This type of application provides advanced content management functions to a user. A user could use XML System as physical storage, and have fast search with indexing. The XML documents are usually large in size. In some cases, it is desirable to partition the XML documents into multiple pieces and perform update in place.

As an extender to DB2®, XML System enhances DB2® functionality for XML enablement. That is, XML System enables use of SQL as the main access technique, along with database features of: stored procedures, user defined types (UDT) and user defined functions (UDF).

The XML System meets the following requirements:

Physical Storage: for entire document, or shredded structured data, with data types.

Support of flat files: allows data to be stored in flat files, and imported/exported to/from database.

Access via SQL: supports field search, full text search, structural search.

Indexing facility: builds on different data types for better query performance.

Updates XML element/attribute.

Mapping to/from relational: composes/decomposes XML documents from/to data store in relational tables.

NLV support: support of double byte characters.

C.2 XColumns and XCollections

XML System provides good data and metadata management solutions to handle traditional and non-traditional data. With the content of structured XML documents in a database, a user can combine structured XML information with traditional relational data. Based on the application, a user can choose whether to store entire XML documents in a database as a non-traditional distinct data type or map the XML content as traditional data in relational tables. For non-traditional XML data types, the XML System adds the power to search rich data types of XML element or attribute values. For traditional SQL data, that is either decomposed from incoming XML documents or in existing relational tables to be used to create outgoing XML documents, the XML System provides a custom mapping mechanism to allow the transformation between XML documents and relational data.

The XML System offers the flexibility to store entire XML documents as column data or transform between XML documents and data in existing tables. The transformation includes decomposing an XML document into one or multiple pieces and storing the pieces in the form of relational data, as well as, composing XML documents from the data in existing relational tables. A user can decide how structured XML documents are to be stored or created through a Document Access Definition (DAD).

The DAD itself is an XML formatted document. The DAD associates XML documents to a database through two major access and storage techniques by defining elements Xcolumn and Xcollection. Xcolumn defines how to store and retrieve entire XML documents as column data of the XML user defined type (UDT). An XML column is a column of XML System's user defined type (UDT). Applications can include an XML column in any user table. Operations on the XML column can be processed after the column is enabled with the XML System. A user can access XML column data mainly through the SQL statements and XML System's user defined function (UDF). With the different access and storage techniques, the XML System provides the flexibility of XML data storage and retrieval.

In particular, an XML column is used to store entire XML documents in the native XML format. This approach treats XML format as an non-traditional data type and offers user defined types (UDTs) and user defined functions (IDFs) for a fast, versatile, and intelligent technique for searching through XML documents. The XML System gives applications the freedom to specify a list of XML elements/attributes as general SQL data types for fast search. The XML System will extract these values from the XML documents and store them in side tables so that a user can create indices on them. The application can query these side tables or join them with the application (i.e., "main") table to do a fast search. For example, a user can input a query such as: "give me all the documents whose prices are greater than $2500.00", providing 2500.00 is the value of an XML element or attribute inside the XML documents.

The XML System provides several user defined types (UDTs) for XML columns. These data types are used to identify the storage types of XML documents in the application table. The XML System supports legacy flat files, and a user is not restricted to storing XML documents inside a database. A user can also store XML documents as files on the local or remote file system, specified by a URL or a local file name.

The XML System provides powerful user-defined function (UDF)s to store and retrieve XML documents in XML columns, as well as to extract XML element/attribute values. The UDFs are applied to XML user defined types (UDTs), thus, these are mainly used for XML columns.

An Xcollection defines how to decompose XML documents into a collection of relational tables or to compose XML documents from a collection of relational tables An XML collection is a virtual name of a set of relational tables. Applications can enable an XML collection of any user tables. These user tables can be existing tables of legacy business data or the ones newly created by the XML System. A user can access XML collection data mainly through the stored procedures provided by the XML System.

An XML collection is used to transform data between database tables and XML documents. An XML collection achieves the goal of data interchange via XML. For applications that want to compose or decompose XML documents from/into a set of relational tables, the XML System offers a technique to enable an XML collection through a Document Access Definition (DAD). In the Document Access Definition, applications can make a custom mapping between database column data in new or existing tables to XML elements or attributes. The access to an XML collection is by calling XML System's stored procedures or directly querying to the tables of the collection.

The XML System also allows overrides of query conditions explicity or implicitly defined in the DAD, by parsing the SQL or XML XPath based override parameter to the composition stored procedures. In this way, it supports dynamic query for generating XML documents.

With the XML System, an application can:

Store entire XML documents as column data in an application table, either internally or externally as a local file or URL, while extracting desired XML element or attribute values into side tables for search.

Compose or decompose contents of XML documents from/into an XML collection which consists of one or more relational tables.

Perform fast search on XML elements or attributes of SQL general data types by converting character string in XML documents to SQL data types for indexing.

Update the content of an XML element, or the value of an XML attribute.

Extract XML elements or attributes dynamically in SQL query.

Validate XML documents during insertion and update.

The XML System also serves as an XML document type definition (DTD) repository. When a database is XML enabled, a DTD Reference Table (DTD_REF) is created. Each rots of this table represents a DTD, with additional metadata information. This table is accessible by users, and allows them to insert their own DTDs. The DTDs in the DTD_REF table are used to validate XML documents and to help applications to define a document access definition (DAD).

C.3 Terminology

This section clarifies some terminology used in this specification.

The XML System uses a subset of Extensive Stylesheet Language Transformation (XSLT) and XML Path Language (XPath), Version 1.0, the W3C working draft of Jun. 17, 1999, to identify XML elements or attributes. The content of the XPath is originally in the XSLT and now is referred by the XSLT, as a part of the stylesheet transformation language. Location path is used to define XML elements and attributes. The XSLT/XPath's abbreviated syntax of the absolute location path is used.

The following is not a formal data model, but a set of abbreviated syntax. The notation of the absolute location path with abbreviated syntax supported by the XML System is listed below.

This section clarifies some terminology used in this specification.

The XML System uses a subset of Extensive Stylesheet Language Transformation (XSLT) and XML Path Language (XPath), Version 1.0, the W3C working draft of Jun. 17, 1999, to identify XML elements or attributes. The content of the XPath is originally in the XSLT and now it is referred to by XSLT as a part of the stylesheet transformation language. Previously, the term "path expression" was used. Now, a subset of the term location path is used in XSLT and XPath to define XML elements and attributes. The XSLT XPath's abbreviated syntax of the absolute location path is used.

The following is not a formal data model, but a set of abbreviated syntax. An absolute location path with abbreviated syntax is listed below. This is supported by the XML System. Again, these are not formal definitions.

a. "/":
Represents the XML root element.

b. "/tag1":
Represents the element tag1 under root.

c. "/tag1/tag2/ . . . / tagn":
Represents an element with the name tagn as the child with the descending chain from root, tag1, tag2, . . . , tagn-1 d. "//tagn"
Represents any element with the name tagn, where "//" denotes zero or more arbitrary tags.

e. "/tag1//tagn"
Represents any element with the name tagn which is a child of element with the name tag1 under root, where "//" denotes zero or more arbitrary tags.

f. "/tag1/tag2/@attr1"
Represents the attribute attr1 of element with the name tag2 as a child of element tag1 under root.

g. "/tag1 /tag2/[@attr1="5"]"
Represents the element with the name tag2 whose attribute attr1 has the value '5' and it is a child of element with the name tag1 under root.

h. "/tag1/tag2/[@attr1="5"]/ . . . /tagn"
Represents the element with the name tagn which is a child of the descending chain from root, tag1, tag2, . . . where the attribute attr1 of tag2 has the value '5'.

i. "/tag1/tag2/tag3="Los Angeles"/ . . . /tagn"
Represents the element with the name tagn which is a child of the descending chain from root, tag1, tag2, . . . where tag3 has the value "Los Angeles".

j. "/tag1/tag2/*[@attr1="5"
Represents all elements as children of element "/tag1/tag2" with attr1 of value "5".

There are restrictions on the location path when used by the XML System, and these are listed in the table below.

TABLE

Restriction of Location Path Supported

| Use of the Location Path | Location Path Supported |
| --- | --- |
| Extracting UDFs | a–j |
| Text Extender's search UDF | a–j |
| DAD column definition | c, f (simple location path) |

Note that there is a restriction in the DAD column definition because there is a one-to-one mapping between an element or attribute to a column.

The term simple location path refers to the c and f notations in the table for Restriction of Location Path Supported. The simple location path is a sequence of element type names connected by the "/" notation. Each element type may be qualified by its attribute values.

TABLE

Simple Location Path of an Element and an Attribute

| Subject | location path | Description |
| --- | --- | --- |
| XML Element | /tag_1/tag_2/.../tag_n-1/tag_n | an element content identified by the tag_n and its parents |
| XML Attribute | /tag_1/tag_2/.../tag_n-1/tag_n/@attr1 | an attribute with name "attr1" of the element identified by tag_n and it parents |

The location path identifies the structure part that indicates the document context to be found. An empty path signals the structure to search or extract against is the whole document (same effect as if the location path is the root element).

The XML System provides users the ability to create SQL queries on XML documents. Based on the nature of XML documents and the functionality of the XML System, the following terminology is used:

| | |
| --- | --- |
| Document Access Definition(DAD): | The definition used to enable an XML System column or an XML collection, which is XML formatted. |

-continued

| | |
|---|---|
| Partition: | The term partition used means the full partition. In other words, the union of all partitioned parts forms the original document. |
| Location path: | A subset of the abbreviated syntax of the location path defined by XPath. A sequence of XML tags to identify an XML element or attribute. It is used in the extracting UDFs to identify the subject to be extracted. The terms of path expression and location path may be used interchangeably. |
| Side table: | Additional tables created by the XML System to store searchable elements/attributes for an enabled XML Column. |
| Valid Document: | An XML document that has an associated DTD. To be valid, the XML document cannot violate the syntactic rules specified in its DTD. |
| Well-formed document: | An XML document that does not contain a DTD. A document with a DTD (valid) must also be well-formed. |
| XML Attribute: | Any attribute specified by the ATTLIST under the XML element in the DTD. The XML System uses the location path to identify an attribute. |
| XML Column: | A column in the application table of the XML System UDT type. The term of XML enabled column and XML column will be used interchangeably. |
| XML Collection: | A collection of relational tables which present the data to compose XML documents or to be decomposed from XML documents. |
| XML Element: | Any XML tag or ELEMENT as specified in the XML DTD. The XML System uses the location path to identify an element. |
| XML Tag: | Any valid XML markup language tag, mainly the XML element. The term tag and element are used interchangeably. |
| XML Table: | An XML Table is an application table which includes XML System column(s). The terms XML enabled table and XML table are used interchangeably. |
| XML Object: | The terms XML Object and XML document are used interchangeably. |
| XML UDT: | User defined type provided by the XML System. |
| XML UDF: | User defined function provided by the XML System. |

C.4 Example of an XML DTD

The following DTD is provided as an example:

LineItem.dtd

```
<?xml encoding="US-ASCII"?>
<!ELEMENT Order (customer,Part–)>
<!ATTLIST Order Key CDATA #REQUIRED>
<!ELEMENT Customer #PCDATA>
<!ELEMENT Part(Quantity,ExtendedPrice,Tax,Shipment*)>
<!ATTLIST Part Key CDATA>
<!ELEMENT Quantity (#PCDATA)>
<!ELEMENT ExtendedPrice (#PCDATA)>
<!ELEMENT Tax (#PCDATA)>
<!ELEMENT Shipment (ShipDate,ShipMode,Comment)>
<!ELEMENT ShipDate (#PCDATA)>
<!ELEMENT ShipMode (#PCDATA)>
<!ELEMENT Comment (#PCDATA)>
```

In the above LineItem.dtd, the term LineItem.dtd is the title of the Document Type Definition. The term <?xml encoding="US-ASCII"?> indicates that encoding; is in US-ASCII. The terms beginning with ELEMENT refer to elements of an XML document, and the terms beginning with ATTLIST refer to attributes of an XML document. The DTD is used to verify a Document Access Definition.

C.5 Example of an XML Document

The following is an example of an XML formatted document:

order.xml

```
<?xml version="1.0"?>
<!DOCTYPE Litem_DTD SYSTEM "E:\dxx\test\dtd\LineItem.dtd">
<Order Key="1">
<Customer>General Motor</Customer>
<Part Key="156">
<Quantity>17</Quantity>
<ExtendedPrice>17954.55</ExtendedPrice>
<Tax>0.02</Tax>
<Shipment>
<ShipDate>Mar. 13, 1998</ShipDate>
<ShipMode>TRUCK</ShipMode>
<Comment>This is the first shipment to service of GM</Comment>
</Shipment>
<Shipment>
<ShipDate>Jan. 16, 1999</ShipDate>
<ShipMode>FEDEX</ShipMode>
<Comment>This the second shipment to service of GM.</Comment>
</Shipment>
</Part>
<Part Key="68">
<Quantity>36</Quantity>
<ExtendedPrice>34850.16</ExtendedPrice>
<Tax>0.06</Tax>
<Shipment>
<ShipDate>Apr. 12, 1996</ShipDate>
<ShipMode>BOAT</ShipMode>
<Comment>This shipment is requested by a call, from GM marketing.
<Comment>
</Shipment>
<shipment>
<ShipDate>Aug. 19, 1998</ShipDate>
<ShipMode>AIR</ShipMode>
<Comment>This shipment is ordered by an email.<Comment>
<Shipment>
</Part>
<Order>
```

In the above XML document, the term order.xml is the title of the XML document. The term <?xml version="1.0"?> indicates that this document is based on XML Version 1.0. The term <!DOCTYPE Litem_DTD SYSTEM "E:\dxx\test\dtd\LineItem.dtd"> is text for the XML document type definition and references the example Document Type Definition, entitled LineItem.dtd, in C.4, which is used for validation.

The remaining terms define the data in the XML document. For example, the term <Quantity>17<Quantity> indicates that quantity has a value of 17. Also, note that <Quantity> without a slash at the beginning defines a start tag and </Quantity> with a slash at the beginning defines an end tag. Similarly, other terms in the XML document use such tags.

C.6 The Document Access Definition (DAD)

A user decides how XML document data is to be accessed in a database. That is, the 150 user defines a DAD. With the help of a Graphical User Interface (GUI) tool, the user can create a DAD to define a mapping and indexing scheme.

A Document Access Definition(DAD) is defined by the following Document Type Definition (DTD):

dad.dtd

```
<?xml encoding="US-ASCII"?>
<!ELEMENT DAD (dtdid?, validation, (Xcolumn | Xcollection))>
<!ELEMENT dtdid (#PCDATA)>
<!ELEMENT validation (#PCDATA)>
<!ELEMENT Xcolumn (table*)>
<!ELEMENT table (column*)>
<!ATTLIST table name CDATA #REQUIRED
      key CDATA #IMPLIED
      orderBy CDATA #IMPLIED>
<!ELEMENT column EMPTY>
<!ATTLIST column
         name CDATA #REQUIRED
         type CDATA #IMPLIED
         path CDATA #IMPLIED
         multi_occurrence CDATA #IMPLIED>
<!ELEMENT Xcollection (SQL_stmt*, prolog, doctype, root_node)>
<!ELEMENT SQL_stmt (#PCDATA)>
<!ELEMENT prolog (#PCDATA)>
<!ELEMENT doctype (#PCDATA | RDB_node)">
<!ELEMENT root_node (element_node)>
<!ELEMENT element_node (RDB_node?,
         attribute_node*,
         text_node?,
         element_node*,
         namespace_node*,
         process_instruction_node*,
         comment_node*)>
<!ATTLIST element_node
      name          CDATA #REQUIRED
      ID            CDATA #IMPLIED
      multi_occurrence CDATA "NO"
      BASE_URI CDATA #IMPLIED>
<!ELEMENT attribute_node (column | RDB_node)>
<!ATTLIST attribute_node
      name CDATA #REQUIRED>
<!ELEMENT text_node (column | RDB_node)>
<!ELEMENT RDB_node (table+, column?, condition?)>
<!ELEMENT condition (#PCDATA)>
<!ELEMENT comment_node (#PCDATA)>
<!ELEMENT namespace_node EMPTY>
<!ATTLIST namespace_node
         name CDATA #IMPLIED
         value CDATA #IMPLIED>
<!ELEMENT process_instruction_node (#PCDATA)>
```

The XML System Administration GUI will provide an interface to create DAD files. The DAD itself is a tree structured XML document. The important elements and attributes of the DAD are:

DTDID:
  The identifier of the DTD stored in the dtd_ref table. It represents the DTD which validates the XML documents or guides the mapping between XML collection tables and XML documents. DTDID must be specified for XML collections. For XML columns, it is optional and is only needed if you want to create side tables for indexing on elements/attributes or validate nets XML documents. The DTDID must be the same as the SYSTEM ID specified in the "doctype" of the XML documents.

Validation
  For validating XML documents with the DTD, and "No" for no validation. If "Yes", then the DTDID must also be specified.

Xcolumn
  An Xcolumn defines the indexing scheme for an XML Column. It is composed by zero or more tables.
  table:
    The relational side table(s) created for indexing elements or attributes of documents stored in an XML column. You can have one or more tables. A table is specified by:
    name:
      name of the side table.
    column:
      The column of the side table, which contains the value of a location path of the specified type.
      name: name of the column. It is the alias name of the location path which identifies an element or attribute,
      type: the data type of the column. It can be any SQL data type.
      path: the location path of an XML element or attribute. Only a simple location path defined in Section C.3 is allowed here.
      multi_occurrence: "YES" or "NO" to specify whether this element or attribute will have in one XML document. For Xcolumn, if multi_occurrence is specified as "YES", the XML System will add another column "DXX_SEQNO" with type Integer in the side table which this column belong to. This DXX_SEQNO keeps track of the order of elements occurred for the path expression in each inserted XML documents. With DXX_SEQNO, the user can retrieve a list of the elements with the same order as the original XML document using "ORDER BY DXX_SEQNO" in SQL.

Xcollection
The Xcollection defines mapping between XML documents and an XML collection of relational tables. It is composed by the following elements:
SQL_stmt
  The SQL statement to specify the operation needed to achieve the mapping. It must be a valid SQL statement. It is only needed for composition, and only one SQL_stmt of query is allowed.
objids
  A list of identifiers, each of which conceptually identifies a row object in the database table, so that the row to be selected is ordered by this unique value. It is only needed when SQL_stmt is supplied. The ID can be a column name, or a value generated from the generate_unique( ) function or a UDF. It is recommended but not necessary to be the primary key of the table.
prolog
  Text for the XML prolog. The same prolog is supplied to all documents in the entire collection. It is a fixed text. This because only XML 1.0 is supported, and UDB® only supports UTF-8.
doctype
  Text for the XML document type definition. The doctype can be specified in one of the following two ways:
    The same doctype is supplied to all documents in the entire collection. In this case, it is a fixed text.
    When decomposing, the doctype can be stored as a column data of a table. In this case, the RDB_node should be specified.
root_node
  The virtual root node which must has one and only one element_node. The element_node under the root_node is actually the root_node of the XML document.
RDB_node:
  The node defines the mapping between an XML element or attribute and relational data. It consists of:
  table:
    name: the name of a relational table in which the data of an XML element or attribute reside.
    key: the primary single key of the table. It must be specified for decomposition.

For the root element_node, all tables storing its attribute or all child element data should be specified.

orderBy: names of columns that determine the sequence order of multiple-occurring element text or attribute value when generating XML documents.

column:

It must be specified for text_node or attribute_node, but not for the element_node.

name: name of the column which contains the value of an XML element or attribute. It must be specified for both composition and decomposition.

type: the data type of the column. It is needed only for decomposition.

path: the location path of the element or attribute. It is not needed for Xcollection, only for Xcolumn.

multi_occurrence: multiple occurrence of the element or attribute.

condition: the predicate to specify query condition. It serves two purposes:

In RDB_node of a text_node or attribute_node: if specified, it qualifies the condition to select the column data to be used to compose or decompose XML element text or attribute value. It is optional.

In RDB_node of the root element_node: if more than one tables are supplied, it must be specified as the condition to join tables.

element_node

Representing an XML element. It must be defined in the specified DTD. For the RDB_node mapping, the root element_node must have a RDB_node to specify all tables containing XML data for itself and all its children nodes. It can have zero or more attribute_nodes and child element_nodes, as well as zero or one text_node. In the next release, an element_node can also contain namespace_nodes, process_instruction_nodes and comment_node.

An element_node is defined by:

Attributes:
  name: The name of the XML element. It is the tag name.
  ID: The unique ID. This is adapted from XPTH.
  BASE_URI: The base URI for the name space. This is also adapted from XPTH.

Optional RDB_node:

The RDB_node is only needed for the root element_ node when using RDB_node mapping. In this case, all tables involved to generate or decompose XML documents must be specified. The column is not needed. The condition must be specified to show the join relationship among tables.

Optional child nodes:

An element_node can also have the following child nodes:
  element_node(s): representing child element(s) of this element,
  attribute_node(s): representing attribute(s) of this element;
  text_node: represent the CDATA text of this element,
  comment_node: representing the comment for this element,
  namespace_node: representing the namespace of this element,
  process_instruction_node: representing the process instruction, attribute_node:

Representing an XML attribute. It is the node defining the mapping between an XML attribute and the column data in a relational table. It must has a name, and a column or a RDB_node.

Attribute:
  name: the name of the attribute. It must be defined in the DTD.

Column or RDB_node:
  Column: needed for the SQL mapping. In this case, the column must be in the SQL_stmt's SELECT clause.
  RDB_node: needed for the RDB_node mapping. The node defines the mapping between this attribute and the column data in the relational table. The table and column must be specified. The condition is optional.

text_node:

Representing the text content of an XML element. It is the node defining the mapping between an XML element content and the column data in a relational table. It must be defined by a column or a RDB_node.

Column: needed for the SQL mapping. In this case, the column must be in the SQL_stmt's SELECT clause.

RDB_node: needed for the RDB_node mapping. The node defines the mapping between this text content and the column data in the relational table. The table and column must be specified. The condition is optional.

D. Creating Metadata for Fast Search of XML Documents Stored as Column Data

One embodiment of the invention provides an XML System which solves the problem of fast searching and indexing of XML element/attribute values of XML documents when they are stored inside a database as column data.

An XML document is a structured document. XML lets a user structure a document by elements or attributes (e.g., title or author). Once a document is structured in this manner, a structured search man be performed based on element or attribute values (or content).

The embodiment of the invention converts the characters of element/attribute values to any general SQL data type. Additionally, the embodiment of the invention provides a technique for performing a range search on the data. That means the element or attribute values are converted to SQL types (e.g., number of pages may be an integer). With this embodiment of the invention, indices can be created on XML element/attribute values, thus the search operation is scalable.

The embodiment of the invention permits application programmers to define a Data Access Definition (DAD) which identifies the XML elements or attributes that need to be indexed and defines the mapping between XML elements or attributes to columns in one or more side tables. The DAD is an XML formatted document that is used to specify within an XML document which elements or attributes are to be searched. The DAD also provides a location path or XPath. For example, if elements of a book are structured as follows:

|-----Book
  |-----Title
    |-----Author

The location path for the above structure would be: /Book/Title/Author.

Additionally, the embodiment of the invention stores XML document data in an application table, while storing particular elements or attributes in side tables. The data stored in the side tables is referred to as "metadata" and is used to search for elements or attributes in the XML documents stored as column data in the application table. During the enabling of a column which contains XML documents, side tables are created (based on the DAD) to store duplicate data of these elements or attributes. Several triggers are created so that values of these elements or attributes are extracted when operations are performed on XML documents in columns of an application table. The operations include, for example, insert operations on the application table, which trigger insert operations to also store the inserted XML data into the side tables. Triggers also manage the synchronization of XML data between the side table data during the deleting and updating operations on the column containing the XML documents in the application table.

D.1 Indexing for Searching XML Columns

The indexing mechanism is applied on XML columns. In particular, the indexing mechanism discussed here is a technique to create an index on XML element or attribute values when entire XML documents are stored in XML columns.

With a large collection of XML documents, search performance is a critical user requirement. Index support provides fast query performance at the cost of slower update performance due to index updates. The XML System provides an indexing mechanism that allows search predicates at query-time to be evaluated through indices, without reading document sources.

The XML column indexing mechanism allows frequently queried data of general data types, such as integer, decimal, or date, to be indexed using the native database index supports from the database engine. This is achieved by extracting the values of XML elements or attributes from XML documents, storing them in the side tables, then allowing application programmers to create indices on these side tables. In a DAD, a user can define Xcolumns by specifying each column of a side table with a location path that identifies an XML element or attribute and a desired SQL data type. The XML System then will populate these side tables when data is inserted into the application table. An application can create an index on these columns for fast search, using the database B-tree indexing technology. The technique and options for creating an index may vary across platforms. Application programmers have the freedom to create a desired index as they usually do with a database on their platform.

For elements/attributes in an XML document which occur multiple times, a separate table is created for each XML element/attribute with multiple occurrences, due to the complex structure of XML documents.

For example, a user may want to create an index on '/Order/Part/ExtendedPrice', and specify '/Order/Part/ExtendedPrice' to be of data type REAL. In this case, XML System will store the value of '/Order/Part/ExtendedPrice' in the specified column 'price' in a side table. Multiple indices on an XML column are allowed. In the example, a user can create two columns in two side tables, one for 'ExtendedPrice' and one for "ShipDate".

When side tables are created, they are tied together with the main (or application) table through the notion of root_id. A user can decide whether the primary key of the application table is to be the "root_id". If the primary key does not exist in the application table, or for some reason a user doesn't want to use the primary key, then XML System will alter application table to add a column DXXROOT_ID for storing a unique identifier created at insertion time (i.e., when data is inserted into the application or main table). All side tables will have a "DXXROOT_ID" column and have the unique identifiers stored. If the primary key is used as the root_id, then all side tables will have a column with the same name and type as the primary key column in the application table, and the values of the primary keys are stored.

D.2 Sample DAD for an XML Column

Assuming the XML documents need to be stored are like the one shown in C.5. Example of an XML Document, the following example DAD will store the XML documents in an XML column and create several side tables for indexing.

```
Litem_DAD1.dad
<?xml version="1.0"?>
<!DOCTYPE Order SYSTEM "E:\dtd\dxxdad.dtd">
<DAD>
    <dtdid>E:\dtd\lineItem.dtd</dtdid>
    <validation>YES</validation>
    <Xcolumn>
        <table name="order_tab">
            <column name="order_key"
                type="integer"
                path="/Order/@Key"
                multi_occurrence="NO"/>
            <column name="customer"
                type="varchar(50)"
                path="/Order/Customer"
                multi_occurrence="NO"/>
        </table>
        <table name="part_tab">
            <column name="part_key"
                type="integer"
                path="/Order/Part/@Key"
                multi_occurrence="YES"/>
        </table>
        <table name="price tab">
            <column name="price"
                type="double"
                path="/Order/Part/ExtendedPrice"
                multi_occurrence="YES"/>
        </table>
        <table name="ship_tab">
            <column name="date"
                type="date"
                path="/Order/Part/Shipment/ShipDate"
                multi_occurrence="YES"/>
        </table>
    </Xcolumn>
</DAD>
```

In the above DAD, Litem_DAD1.dad is the name of the DAD. The phrase <?xml version="1.0"?> identifies the version, and the phrase <!DOCTYPE Order SYSTEM "E:\dtd\dxxdad.dtd"> is text for the XML document type definition. The first DAD and the second DAD tags indicate that the information between these tags comprise the data access definition. The phrase <dtdid>E:\dtd\lineItem.dtd</dtdid> identifies the document type definition (DTD) to be used. The phrase <validation>YES</validation> indicates that this DAD is to be validated against the DTD. The four table name terms identify the four side tables to be created.

In this example, the four side tables created for indexing are as follows:

order_tab: with columns of order_key and customer; representing attribute "/Order/@Key" and element "/Order/Customer".

part_tab: with column of part_key, representing attribute "/Order/Part/@Key".

price_tab: with column of price, representing element "/Order/Part/Price"

ship_tab: with column of date, representing element "/Order/Part/Shipment/ShipDate".

For this example, it is assumed that the columns in the tables are the elements and attributes which need to be searched frequently.

Figure 3:
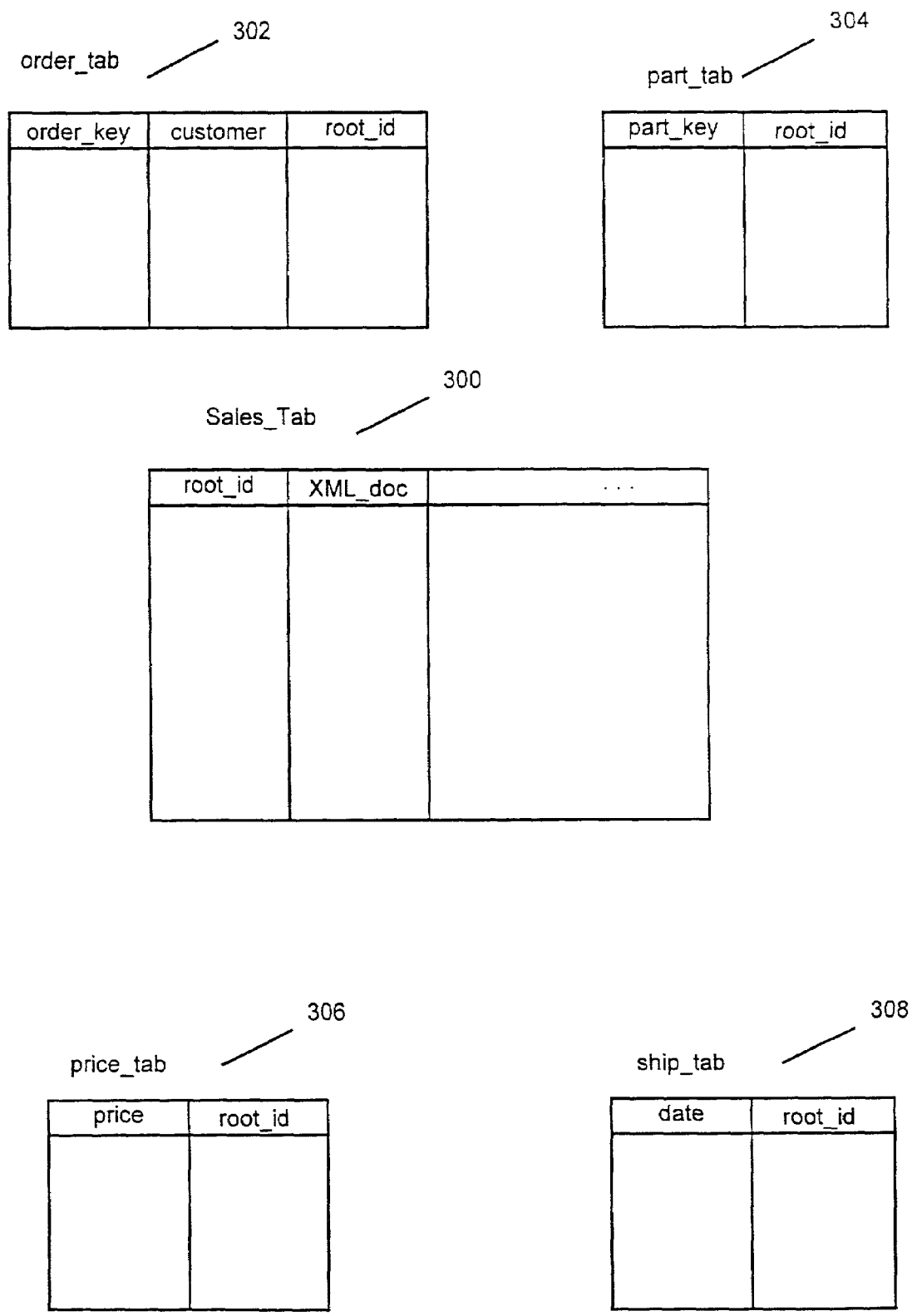
FIG. 3 illustrates an application or main table and its four side tables.

FIG. 3 illustrates an application or main table and its four side tables. The Application table 300 has a root_id in common with each side table 302, 304, 306, and 308. The side tables 302, 304, 306, and 308 correspond to the side tables defined in the DAD above.

D.3 XML Column/User Defined Types

An XML column is designed to store XML documents in their native format in the database as column data. After a database is enabled, the following user defined types (UDTs) are created:

XMLCLOB: XML document content stored as a CLOB inside the database,

XMLVarchar: XML document content stored as a VARCHAR inside the database,

XMLDBCLOB: XML document content stored as double byte CLOB inside the database,

XMLFile: XML document stored in a file on a local file system,

XMLURL: XML document stored as a uniform resource locator (URL) via Data Link.

A user can use these UDTs as the data type of an XML column. An XML column is created when a user creates or alters an application table.

D.4 Creating an XML Table

An XML table is a table that includes one or more columns created with the XML System UDT. To create such a table, an XML column is included in the column clause of the CREATE TABLE statement.

Consider a line item order book keeping application. The XML formatted line item order is to be stored in a column called "order" of an application table called "sales_tab". The sales_tab table also includes other columns of invoice_number and sales_person. Since the order is not very long, a user may decide to store it in the XMLVarchar type. The user may also decide to let the invoice_number be the primary key. The following create table statement can be used, where XMLVarchar is the XML System UDT:

```
CREATE TABLE sales_tab
    (invoice_number char(6) NOT NULL PRIMARY KEY,
    sales_person varchar(20),
    order     XMLVarchar);
```

D.5 Defining Xcolumn in DAD

In order to use an XML column, a DAD needs to be prepared and enabled. In DAD preparation, a user first needs to define an "Xcolumn". The following steps guide a user to define an 'Xcolumn", using the examples: XML document order.xml in C.5, DTD LineItem.dtd in C.4, and DAD Litem_DAD1.dad in D.2.

Identify the XML elements and attributes which will be frequently searched in the application.

In the above examples, the "/Order/@Key", "/Order/Customer", "/Order/Part/@Key", "/Order/Part/ExtendedPrice". "/Order/Part/Shipment/ShipDate" are mostly like to be searched and range search is needed for some of them.

Decide how many side tables will be created for indexing. This is based on the understanding of the DTD and XML documents.

In the above examples, since "/Order" has unique attribute "Key" and only one element "Customer", they are put in the same side table "order_tab". One "Order" can have one or more "Part" items (see DTD definition in C.4), and each "Part" will have unique attribute "Key" and element "ExtendedPrice", and so these are separates into two tables: "part_tab" and "price_tab". Now, since one "Part" can have multiple "Shipment" items and each "Shipment" has one "ShipDate", the "ShipDate" is put into another table "ship_tab".

Define the column of each side table by specifying the column name, the matching XML element or attribute by location path, and the data type.

In the examples, the ability to perform range search is desired on "ExtendedPrice" and "ShipDate", thus the data type is specified to be double and date respectively. Because there will be multiple occurrences of the /Order/Part/@key, /Order/Part/ExtendedPrice and /Order/Part/Shipment/ShipDate, specify the multi_occurrence="YES" for these elements or attributes. By doing so, the XML System will create an additional column DXX_SEQNO for side table price_tab and ship_tab so that a query can be performed using "order by DXX_SEQNO" to get the element or attribute with the same order as that in the original XML documents.

D.6 Enabling Parameters

A column can be enabled through the XML System administration GUI or using, a dxxadm command with the enable_column option. The syntax of the option is as follows:

dxxadm enable_column db_name tab_name column_name DAD_file

-t tablespace -v default_view -r root_id]

where:

db_name: the database name tab_name: table name in which the XML column resides.

column_name: name of the XML column.

DAD_file: name of the file that contains Data Access Definition (DAD).

tablespace: optional, but if specified, a previously created tablespace which will contain side tables created by the XML System.

default_view: optional, but if specified, it is the name of the default view created by XML System to join application table and all side tables.

root_id: optional, but recommended, and if specified, it is the column name of the primary key in the application table, and XML System will use it as the unique "root_id" to tie all side tables with the application table. If not specified, XML System will add the column of DXXROOT_ID in the application table. Note: if the application table happened to have a column name as "DXXROOT_ID", the primary key must be specified as the "root_id", otherwise, an error will be returned.

Here is an example for enabling the column order in the table sales_tab in database mydb with the DAD_file Litem_DAD1.dad in C.4, default view sales_order_view and root_id invoice_number.

/home/ul>dxxadm enable_column mydb sales_tab order Litem_DAD1.dad -v sales_order_view -r invoice_number DXXA007I XML Extender is enabling column order. Please wait.

DXXA008I XML Extender has successfully enabled the column order.

/home/u1>

D.7 Results of the Column Enabling

The enabling of an XML column mainly does the following things to a database:

Read the DAD_file and do the following:
  if DTDID is specified, retrieve the DTD from the dtd_ref table.
  process Xcolumn to create side tables
  create triggers for insert, update and delete on the XML column so that the side tables will be populated or updated.

Create a default_view if specified.

If root_id not specified, alter application table to add DXXROOT_ID column.

Update the XML_USAGE and dtd_ref table to reflect the enabling of this XML column.

Based on the above examples, the user table sales_tab has the following schema:

Based on the above examples, the user table sales_tab has the following schema:

User table sales_tab:

| Column Name | invoice_number | sales_person | order |
|---|---|---|---|
| Data Type | char(6) | varchar(20) | XMLVarchar |

The enabling column operation will create the following side tables based on the DAD:

Side_table order_tab:

| Column Name | order_key | customer | invoice_number |
|---|---|---|---|
| Data Type | integer | varchar(50) | char(6) |
| Location Path | /Order/@Key | /Order/Customer | N/A |

Side table part_tab:

| Column Name | part_key | invoice_number |
|---|---|---|
| Data Type | integer | char(6) |
| Location Path | /Order/Part/@Key | N/A |

Side table price_tab:

| Column Name | price | invoice_number |
|---|---|---|
| Data Type | double | char(6) |
| Location Path | /Order/Part/ExtendedPrice | N/A |

Side table ship_tab:

| Column Name | date | invoice-number |
|---|---|---|
| Data Type | date | char(6) |
| Location Path | /Order/Part/Shipment/ShipDate | N/A |

Note that because the root_id is specified by the primary key invoice_number in the application table sales_tab, all side tables have the column invoice_number of the same type. Also, the value of the invoice_number of each row in the sales_tab will be inserted into the side tables.

Since the default_view parameter is specified when enabling the XML column order, a default view sales_order_view is created by the XML System. It joins the above five tables by the following statement:

CREATE VIEW sales_order_view(invoice_number,sales_person,order,
  order_key,customer,part_key,price,date)
AS
SELECT sales_tab.invoice_number, sales_tab.sales_person,
  sales_tab.order,
  order_tab.order_key, order_tab.customer,
  part_tab.part_key, price_tab.price,
  ship_tab.date)
FROM sales_tab, order_tab, part_tab, price_tab, ship_tab
WHERE
  sales_tab.invoice_number=order_tab.invoice_number
  AND
    sales_tab.invoice_number=part_tab.invoice_number
  AND sales_tab.invoice_number=price tab.invoice_number
  AND
    sales_tab.invoice_number=ship_tab.invoice_number.

Because the tablespace in the enable_column command was not enabled. the default tablespace is used to create side tables. If the tablespace is specified and it does exist in the database, then the side tables will be created in the specified side tables.

D.8 Inserting XML Documents

For XML columns, an entire XML document is always stored as the column data. The insertion can be achieved in the following ways:

Using the default cast function:
  For each UDT, there is a default cast function to convert the SQL base type to the UDT. The following cast functions can be used in a VALUES clause.

| Default UDT Cast Function | Input Parameter Type | Return Type | Description |
|---|---|---|---|
| db2xml.XMLVarchar( ) | varchar | XMLVarchar | Input from memory buffer of varchar |
| db2xml.XMLCLOB( ) | clob | XMLCLOB | Input from memory buffer of clob |
| db2xml.XMLDBCLOB( ) | dbclob | XMLDBCLOB | Input from memory buffer of dbclob |
| db2xml.XMLFile( ) | varchar | XMLFile | Only store file name |
| db2xml.XMLURL( ) | datalink | XMLURL | data type |

The following SQL statement inserts the casted varchar type in the host variable xml_buff into the XMLVarchar.

INSERT INTO sales_tab
VALUES('123456', 'Sriram Srinivasan', db2xml.XML Varchar(:xml_buff))

Using the Storage UDF:
  For each XML System UDT, there is a storage(or import) UDF to import data from a resource other than its base type. For example, if to import an XML document in a file to the database as a XMLVarchar, then the function XMLVarcharFromFile( ) is used.

In the example below, a record is inserted into the sales_tab table. The function XMLVarcharFromFile( ) imports the XML document from a file into the database and stores it as a XML Varchar.

EXEC SQL INSERT INTO sales_tab VALUES('123456', 'Sriram Srinivasan' XMLVarcharFromFile('/home/ul/xml/order.xml'))

The above example imports the XML object from the file "/home/ul/xml/order.xml" to the column order in the table sales_tab.

D.9 Retrieving XML Documents

The XML table is ready to use when the XML column is enabled. Retrieving an XML column directly returns the UDT as the column type. A user can always use the default cast function provided by The database for distinct types to convert a UDT to an SQL base type, then operate on it. In addition to that, a user can also use overloaded UDF Content( ) to retrieve document content from a file or URL to a memory buffer.

Using the default cast function:

The following cast functions, which are automatically created by the database for the XML UDT, may be used in a SELECT statement.

| Default Cast Function | Input Parameter Type | Return Type | Description |
| --- | --- | --- | --- |
| db2xml.varchar( ) | XMLVarchar | varchar | XML document in variable length of char |
| db2xml.clob( ) | XMLCLOB | clob | XML document in CLOB |
| db2xml.dbclob( ) | XMLDBCLOB | dbclob | XML in double byte CLOB |
| db2xml.varchar( ) | XMLFile | varchar | XML filename in variable length of char |
| db2xml.datalink( ) | XMLURL | datalink | URL of XML document |

The following SQL statement shows how to use the default cast function in a simple query.

EXEC SQL SELECT db2xml.varchar(order)from sales_tab

Using the content( ) UDF:

Suppose XML documents are stored as XMLFile or XMLURL, to operate on these XML documents in memory, the UDF content( ), which takes XMLFile or XMLURL as input and returns a varchar or CLOB, is used.

In the example below, a small sqc program segment illustrates how an XML document is retrieved from a file to memory. This example assumes that the column order is of XMLFile type.

```
EXEC SQL BEGIN DECLARE SECTION;
    varchar(3k) xml_buff;
EXEC SQL END DECLARE SECTION;
EXEC SQL CONNECT TO mydb
EXEC SQL DECLARE cl CURSOR FOR
SELECT Content(order) from sales_tab
    WHERE sales_person = 'Sriram Srinivasan'
EXEC SQL OPEN cl;
do {
    EXEC SQL FETCH cl INTO :xml_buff;
    if(SQLCODE != 0) {
        break;
    }
    else {
        /* do whatever is needed to do with the XML doc in buffer */
    }
}
EXEC SQL CLOSE cl;
```

D.10 Updating XML Documents

With the XML System, an entire XML document can be updated by replacing the XML column data. The XML System provides two techniques for update:

Using cast functions or storage UDFs in the set clause of the SQL update statement:

In this case, a cast function or a UDF is used in the Set clause. Here is an example:

UPDATE sales_tab
 set order=XMLVarcharFromFile('/home/ul/xml/order2.xml')
WHERE sales_person='Sriram Srinivasan'

Using the Update( ) UDF:

The XML System provides a UDF Update( ) which allows a user to specify a location path and the value of the element or attribute represented by the location path to be replaced. In this case, a user does not need to retrieve the XML document and use an editor to change the content. The XML System will do it automatically.

Here is an example of using the UDF Update( ). In this example, the content of "/Order/Customer" is updated to NewMart".

UPDATE sales_tab
 set order=Update(order,'/Order/Customer','NewMart')
WHERE sales_person='Sriram Srinivasan'

For an XML Column, the XML System will update side tables of extracted data when the XML column is updated. However, a user should not update these side tables directly without updating original XML documents stored in the XML column by changing the corresponding XML element or attribute value. Otherwise, there may be data inconsistency problems.

D.11 Retrieving XML Element Contents and Attribute Values

For XML columns, the XML System provides a UDF to extract element or attribute values from entire XML documents. The retrieval is performed on an XML document. It is a single document search. The XML System provides extracting UDFs to retrieve XML elements or attributes in the SQL select clause. This is very useful after search filtering on a collection of XML documents to further obtain desired elements or attributes.

Suppose there are more than 1000 XML documents stored in the column order in the table sales_tab. To find all customers who have ordered items which have the ExtendedPrice greater than $2500.00, the following SQL statement with the extracting UDF in the select clause can be used:

SELECT extractVarchar(Order,'/Order/Customer') from sales_order_view
WHERE price>2500.00 where the UDF extractVarchar( ) takes the order as the input, and the location path "/Order/Customer" as the select identifier, and returns the names of the customer. Note, in this statement, only the orders with ExtendedPrice greater than $2500, say maybe 11 such orders, will be the input to the extracting function. The WHERE clause did the filtering on the collection of 1000 XML documents already. Again, the sales_order_view is the default view to join the application table sales_tab and all its side tables, where price is the part_tab.price, representing the "/Order/Part/ExtendedPrice".

D.12 Searching an XML Document

The above sections have described how the XML System may be used as a document repository for storage and retrieval, as well as for element or attribute selection. Here, searching using indices created on side table columns, which contain XML element contents or attribute values extracted from XML documents, is illustrated. Since the data type of an element or attribute can be specified, searches can be performed on SQL general data types and range searches can be performed.

D.13 Search from Join View

If desired and specified when an XML column is enabled, the XML System provides a default read-only view which joins the application table with all created side tables through the same unique identifier. With the default view, or any view created by the application, a user can search XML documents by a query on the side tables.

The above examples have referenced an application table sales_tab and side tables order_tab, part_tab and ship_tab. The name of a default view sales_order_view is specified at the enabling column time. XML System had created a default view sales_order_view which joins these tables by the statement shown in the previous section.

The following example SQL statement will return the sales_persons of the sales_tab who have line item orders stored in the column order where the ExtendedPrice is greater than $2500.00.

SELECT sales_person FROM sales_order_view
WHERE price>2500.00

The advantage of a query on the join view is that it provides a virtual single view of the application table and side tables. However, when more side tables are created, the more expensive the query will be. Therefore, it is only recommended when the total number of side table columns is small. An application can create a desired view by joining important side table columns for optimization. Note that the root_id, which can be the specified primary key in the application table or the DXXROOT_ID created by the XML System. provides the way to join tables.

D.14 Direct Query on Side Tables

Since the DAD is specified by the application, the side tables created by the XML System are known to the application programmer. For better performance. an application can do query or sub-query on side tables directly. The following example shows how to do so for the same query stated above:

SELECT sales_person from sales_tab
WHERE invoice_number in
    (SELECT invoice_number from part_tab
    WHERE price>2500.00)

Note that the invoice_number is the primary key in the application table sales_tab. The advantage of direct query with sub-query is better performance. When side tables have parent-children relationships, direct query with sub-query often make more sense.

D.15 Query Using UDF

In one embodiment, the side tables are created by the DAD, and indices are created for columns in the side tables. Therefore, the search will be fast with indexing.

In another embodiment, it is not required that a user create side tables or indices on columns of side tables. The application still can use the extracting UDFs to do the query. Since each extracting UDF will do the source scan, it is very expensive. It should be used when other restrictions are applied to the WHERE clause so that the source scan is performed to a limited number of XML documents.

Here is an example:
SELECT sales_person from sales_tab
    WHERE extractVarchar(order,'/Order:Customer')
        like '%NewMart%' AND invoice_number>100

D.16 Search on an Element or Attribute with Multiple Occurrences

In XML documents, one element name type may occur multiple times. Since attributes belong to elements. the same location path of an attribute may often refer to multiple values. The term "multiple occurrence" will be used to specify this case.

In the DAD, a user can specify whether the location path will have multiple occurrence. In the above DAD example, the "/Order/Part/price" has multiple occurrence, and the side table price_tab was crated for it. It is possible to have multiple rows in the part_tab table containing the same invoice_number. Therefore, a user should only select the distinct values. The following provides an example of how to do query for this case:

SELECT sales_person from sales_tab
    WHERE invoice_number in
        (SELECT DISTINCT invoice_number from price_tab
            WHERE price>2500.00)

On the other hand, since XML System provides additional column DXX_SEQNO in the price_tab, a user can select a price and pair it with the corresponding ShipDate. The following is an example:

SELECT price_tab.price, ship_tab.date from price_tab, ship_tab
WHERE
    price_tab.invoice_number=ship_tab.invoice_number
    AND
    price_tab.DXX_SEQNO=ship_tab.DXX_SEQNO A user can also select the price ordered by the sequence number, as illustrated in the following example:
SELECT price price_tab ORDER by DXX_SEQNO

D.17 Structural-text Search

In one embodiment of the invention, the structural-text or full text search is performed after enabling XML columns with Text Extender, a product from International Business Machines, Corporation.

In the examples discussed herein, to perform structural-text on the column order, a user can enable the column with the Text Extender, by specifying a text handle name, say "orderHandle". Then with the Text Extender's section search support, the XML document with the word "XYZ" in the section "/Order/Customer" can be found. The following example shows how:

SELECT order FROM sales_tab
WHERE Contains(orderHandle, 'model Order section(/Order/Customer)\"XYZ\")=1

Where Order is the model name and Order/Customer is the section name.

D.18 Deleting XML Documents

Deleting a row from an XML table is done with a SQL DELETE statement. A user can use the search technique discussed above to specify the WHERE clause.

The following is a simple example:
DELETE from sales_tab
    WHERE invoice_number in
        (SELECT invoice_number from part_tab
        WHERE price>2500.00)

D.19 Disable Columns

The disable_column option disables the XML enabled column. The following is the syntax for disabling a column:
dxxadm disable_column db_name tab_name column_name
    The following are the arguments for disable_column:
    db_name: the database name,
    tab_name: the table name in which the XML column resides.
    column_name: the name of XML column.

The following actions are performed by disable_column:
Delete the entry from the XML_USAGE table.
Decrement the USAGE_COUNT in the DTD_REF table.
Drop all triggers created with this column.
Drop side table associated with this column.

In one embodiment, a user must disable an XML column before dropping an XML table. If an XML table is dropped, but its XML column is not disabled, then all side tables created by the XML System will not be dropped. This may cause problems for the XML system to keep track of the number of enabled XML columns.

D.20 Detailed Techniques

The server code is the core of XML System. It has several major components, and each one performs a unique role in the product.

The admin stored procedures are used to "xmlally" enable and disable the database, columns and indices. For performance and simplicy, these stored procedures were written in the embedded SQL.

The XML System provides a number of functions in the server code. The functions are: dxxEnableDB, dxxDisableDB( ), dxxEnableColumn( ), dxxDisableColumn( ), and dxxEnableCollection( ).

The dxxEnableDB stored procedure enables a database for XML document access. It uses the DDL statements to create XML System UDTs, a set of external UDFs, a set of internal UDFs, the DTD reference table, and the XML_USAGE table. The implementation of these UDFs are in the UDFs component.

The dxxDisableDB( ) stored procedure drops everything created by the dxxEnabeDB( ). It does error checking on DTD_REF and XML_USAGE tables.

The dxxEnableColumn( ) stored procedure enables an XML column of the XML System UDT. It parses the input DAD, create side tables, and triggers according to the DAD. It also updates the XML_USAGE table.

The dxxDisableColumn( ) stored procedure disables an XML column. It deletes all side tables created by the XML System and updates the XML_USAGE table.

The dxxEnableCollection( ) stored procedure enables an XML collection. It inserts a new row in the XML_USAGE table and stores the input DAD there. It checks or creates collection tables according to the DAD.

The design description comprises program functions that implement the stored procedures in the source. These are listed below:
dxxdb.sqc
1. dxxEnableDB( )

| function name | caller | input | output |
| --- | --- | --- | --- |
| dxxEnableDB( ) (enable_db) | main( ) in dxxadm.sqc | dbName | errCode, errMsg |

The following is a Functional Description:
1. Initialize input and output parameters form sqlda, and sqlca.
2. Loop through enable statement array to execute each DDL.
3. Check whether database is DBCS enabled.
4. If DBCS enabled, loop to execute each DBCS enable DDL statement
5. error check.
6. Set output parameter.
2. dxxDisableDB( )

| function name | caller | input | output |
| --- | --- | --- | --- |
| dxxDisableDB( ) (disable_db) | main( ) in dxxadm.sqc | dbName | errCode, errMsg |

The following is a Functional Description:
1) Loop through disable statement array to execute each DDL.
2) Check whether database is DBCS enabled.
3) If DBCS enabled, loop to execute each DBCS disable DDL statement.
4) Error initialize input and output parameters form sqlda, and sqlca check.
5) Set output parameter.
3. IsDBCS_DB( )

| function name | caller | input | output |
| --- | --- | --- | --- |
| isDBCS_DB( ) | dxxEnableDB( ), dxxDisableDB( ) | dbName | TRUE or FALSE |

The following is a Functional Description:
Check whether database is DBCS enabled, if so, return TRUE, otherwise return FALSE.
dxxcol.sqc
1. dxxEnableColumn( )

| function name | caller | input | output |
| --- | --- | --- | --- |
| dxxEnableColumn | main() in dxxadm.sqc | 2. dbName.<br>3. tabName.<br>4. colName.<br>5. dadBuf.<br>6. tablespace.<br>7. defaultView.<br>8. rootID. | 1. errCode<br>2. errMsg |

The following is a Functional Description:
1. Initialize host variables.
2. Initialize output parameters.
3. Call getParameter( ) to get input parameters,
   Call check_table( ) to check table name.
   Call check_column( ) to check input column name, and
   Check rootID.
4. Initialize XML4C parser.
5. Parse DAD.
6. Call dad_popu( ) to populate DAD into internal data structure.
7. Error checking on DAD:
   access_mode,
   DTDID
8. Get colno of this column from syscat, used as suffix of triggers.
9. Call createSideTables( ) to create side tables.
10. Create triggers on user tables:
    1. rootidTrigger_BIT,
    2. insertTrigger_AIT,
    3. deleteTrigger_ADT,
    4. updateTrigger_AUT,
    5. validateTrigger_VIT,
    6. validateTrigger_VUT 11. Create default view.
12. Insert a row into XML_USAGE table.
13. Update DTD_REF table.
14. Set output error message.
15. Error check on commit.
16. Free DAD structure.
2. dxxDisableColumn( )
function name caller input output
dxxDisableColumn main( ) in dxxadm.sqc
  1. dbName,
  2. tabName,
  3. colName,
  1. errCode
  2. errMsg
The following is a Functional Description:
  1. Initialize host variables.
  2. Initialize output parameters.
  3. Call getParameter( ) to get input parameters.
  4. Check input parameters:
    1. call check_table( ) to check table name, and
    2. call check_column( ) to check input column name.
  5. Get column name, DAD, DTDID, defaultView, Trigger suffix from XML_USAGE table.
  6. Check whether column is XML enabled and trigger suffix exists.
  7. Drop default view.
  8. Parse DAD and populate DAD data structure.
  9. Using DAD structure to delete all side tables.
  10. Call createSideTables( ) to create side tables.
  11. Drop triggers on user tables:
    1. reset DXXROOT_ID, drop rootidTrigger_BIT,
    2. insertTrigger_AIT,
    3. deleteTrigger_ADT,
    4. updateTrigger_AUT,
    5. validateTrigger_VIT, and
    6. validateTrigger_VUT.
  12. Update DTD_REF table.
  13. Delete the row into XML_USAGE table.
  14. Set output error message.
  15. Error check on commit.
  16. Free DAD structure.
3. check_table( )

| function name | caller | input | output |
|---|---|---|---|
| check_table | dxxEnableColumn(), dxxDisableColumn() | 1. dbName, | 1. errCode 2. errMsg |

The following is a Functional Description:
Check whether the table exists in the database by looking at the syscat.columns.
  4. check_column( )

| function name | caller | input | output |
|---|---|---|---|
| check_column | dxxEnableColumn(), dxxDisableColumn() | 1. table name, 2. column name | 1. errCode 2. errMsg |

The following is a Functional Description:
Check whether the column exists in the right table by looking at the syscat columns.
  5. getParameter( )
function name caller input output
getParameter dxxEnableColumn( ), dxxDisableColumn( )
  1. in_sqlvar
  1. data,
  2. errCode
  3. errMsg
The following is a Functional Description:
Extract parameter data from in_sqlvar, according to SQL_TYPE.
  6. createSideTable( )

| function name | caller | input | output |
|---|---|---|---|
| createSide Table() | dxxEnableColumn() | 1. pDAD, 2. rootid, 3. rootid definition 4. tablespace, | 1. errCode 2. errMsg |

The following is a Functional Description:
This routine creates all side tables specified in the DAD. It takes the pDAD (pointer to DAD) data structure, looping the list of side tables, and generates the "CREATE TABLE" statement.
  1. If the rootid is not specified,
    then add DXXROOT_ID as a not-null column,
    else add the primary key in user table as a not-null column.
  2. If the tablespace is specified, add "IN" tablespace to the CREATE TABLE statement.
  7. rootidTrigger_BIT

| function name | caller | input | output |
|---|---|---|---|
| rootidTrigger_BIT | dxxEnableColumn() | 1. pDAD | 1. errCode 2. errMsg |

The following is a Functional Description:
This routine creates the Before Insert Trigger (BIT) to add the value of DXXROOT_ID, which is generated from the generate_unique( ) function.
  1. Check syscat.triggers to see whether the BIT exists or not, if exist, return error.
  2. Execute the create trigger statement as:
    CREATE TRIGGER user_table.BIT BEFORE INSERT ON user_table
    REFERENCING NEW AS NEW
    FOR EACH ROW MODE DB2SQL
    WHEN (xmlcolumn IS NOT NULL)
    BEGIN ATOMIC SET
NEWROW.DXXROOT_ID=generate_unique( ) END
    where user_table and xmlcolumn are taken from pDAD.
  8. insertTrigger_AIT

| function name | caller | input | output |
|---|---|---|---|
| insertTrigger_AIT | dxxEnable Column(), | 1. pDAD 2. trigger_suffix, 3. rootid, | 1. errCode, 2. errMsg |

The following is a Functional Description:
This routine creates the After Insert Trigger (AIT) to populate the side tables after a row is inserted into the user table with an XML column.

```
Loop through pDAD->s_table. for each s_table, pDADst do:
For each column in the pDADst do:
1.   If (pDADst->col is not multiple occurred)
         then set the trigger_stmt to:
             INSERT INTO side_tab VALUES
                 (NEWROW.rootid,
                  db2xml.extractDataType(xmlcolumn,path))
         else set the trigger_stmt to:
             INSERT INTO side_tab
             SELECT NEWROW.rootid,db2xml.seqno( ).
             RETURNED DataType FROM
             TABLE(db2xml.extractDataTypes(xmlcolumn.path)) x
2.   Execute the statement:
         "CREATE TRIGGER user_tab.AITtrigger_suffix
         AFTER INSERT ON user_tab
         REFERENCING NEW AS NEWROW
         FOR EACH ROW MODE DB2SQL
         WHEN (xmlcolumn IS NOT NULL)
         BEGIN ATOMIC
             trigger_stmt;
         END"
     where user_tab, side_tab, xmlcolumn and path are getting from pDADst, and
     DataType is getting from the call of mapType(pDADst->col->type}
Note: the db2xml.seqno( ) is a UDF to generate a sequence number of multiple
occurrence.
```

9. delete trigger_ADT

| function name | caller | input | output |
|---|---|---|---|
| deleteTrigger_ADT | dxxEnableColumn() | 1. pDAD<br>2. trigger_suffix,<br>3. rootid, | 1. errCode<br>2. errMsg |

The following, is a Functional Description:

This routine creates the After Delete Trigger (ADT) to delete rows in side tables after a row is deleted from the user table with an XML column.

Loop through pDAD->s_table, for each s_table, pDADst do:

execute the statement:

```
"CREATE TRIGGER user_tab.ADTtrigger_suffix
AFTER DELETE ON user_tab
REFERENCING OLD AS OLDROW
```

-continued

```
FOR EACH ROW MODE DB2SQL
BEGIN ATOMIC
    DELETE FROM side_tab WHERE
    OLDROW.rootid = side_tab.rootid
END"
``` where user_tab, side_tab, xmlcolumn and path are getting from pDADst 10. updateTrigger_AUT

| function name | caller | input | output |
|---|---|---|---|
| updateTrigger_AUT | dxxEnableColumn() | 1. pDAD,<br>2. trigger_suffix,<br>3. rootid | 1. data.<br>2. errCode<br>3. errMsg |

The following is a Functional Description:

This routine creates the After Update Trigger (AUT) to update rows in side tables after a row is updated in the user table with an XML column.

```
Loop through pDAD->s_table, for each s_table. pDADst do:
    For each column in the pDADst do:
        If (pDADst->col is not multiple occurred)
            then set the trigger_stmt to:
                UPDATE side_tab SET set_stmt WHERE
                NEWROW.rootid = side_tab.rootid
            else set the trigger_stmt to:
                DELETE FROM side_tab WHERE NEWROW.rootid = side_tab.rootid;
                INSERT INTO side_tab
                SELECT NEWROW.rootid, db2xml.seqno( ).
                RETURNED DataType FROM
                TABLE(db2xml.extractDataTypes(xmlcolumn.path)) x
        Execute the statement:
            "CREATE TRIGGER user_tab.AUTtrigger_suffix
            AFTER UPDATE ON user_tab
            REFERENCING NEW AS NEWROW
            FOR EACH ROW MODE DB2SQL
```

-continued

```
WHEN (xmlcolumn IS NOT NULL)
BEGIN ATOMIC
    trigger_stmt:
END"
where user_tab, side_tab, xmlcolumn and path are getting from pDADst, and
    Data Type are getting from the call of mapType(pDADst->col->type)
```

11. validationTrigger_VBIT

| function name | caller | input | output |
|---|---|---|---|
| validationTrigger_VBIT | dxxEnableColumn() | 1. pDAD, 2. trigger_suffix | 1. errCode, 2. errMsg |

The following is a Functional Description:
This routine create a Validation Before Insert Trigger (VBIT) to validate an input XML document before inserting it into a user table. Due to the use of XML4C parser, it retrieves the DTD from dtd_ref table and puts it in an external file, then calls the UDF db2xml.validate in the trigger.
It executes the following statement:

```
"CREATE TRIGGER user_tab.VBITtrigger_suffix
BEFORE INSERT ON user_tab
REFERENCING NEW AS NEWROW
FOR EACH ROW MODE DB2SQL
WHEN validation != 0
SIGNAL SQLSTATE 'DXX_SQLSTATE_INVALID_DOC'
(DXX_0000E)
where validation=
SELECT db2xml.validate(NEWROW.xmlcolumn,
        db2xml.content(content,tmpfileName), pDAD->dtdid)
    FROM db2xml.dtd_ref WHERE dtdid=pDAD->dtdid)
``` where user_tab, xmlcolumn are getting from pDAD, tmpefileName is set by this routine, and the "content" is the column name in dtd_ref for DTD. db2xml.content( ) is a UDF.

12. validationTrigger_VBUT

| function name | caller | input | output |
|---|---|---|---|
| validationTrigger_VBUT | dxxEnableColumn() | 1. pDAD, 2. trigger_suffix | 1. errCode, 2. errMsg |

The following is a Functional Description:
This routine create a Validation Before Update Trigger (VBUT) to validate an input XML document before updating it in user table. Due to the use of XML4C parser, it retrieves the DTD from dtd_ref table, puts it to an external file, then calls the UDF db2xml.validate in the trigger.
It executes the following statement:

```
"CREATE TRIGGER user_tab.VBUTtrigger_suffix
BEFORE UPDATE ON user_tab
REFERENCING NEW AS NEWROW
FOR EACH ROW MODE DB2SQL
WHEN validation != 0
```

-continued

```
SIGNAL SQLSTATE 'DXX_SQLSTATE_INVALID_DOC'
(DXX_0000E)
where validation=
SELECT db2xml.validate(NEWROW.xmlcolumn,
        db2xml.content(content,tmpfileName), pDAD->dtdid)
    FROM db2xml.dtd_ref WHERE dtdid=pDAD->dtdid)
``` where user_tab, xmlcolumn are getting from pDAD, tmpefileName is set by this routine, and the "content" is the column name in dtd_ref for DTD. db2xml.content( ) is a UDF.

13. createDefaultView

| function name | caller | input | output |
|---|---|---|---|
| createDefaultView | dxxEnableColumn() | 1. pDAD, 2. rootid, 3. tablename, 4. default_view | 1. errCode, 2. errMsg |

Figure 4:
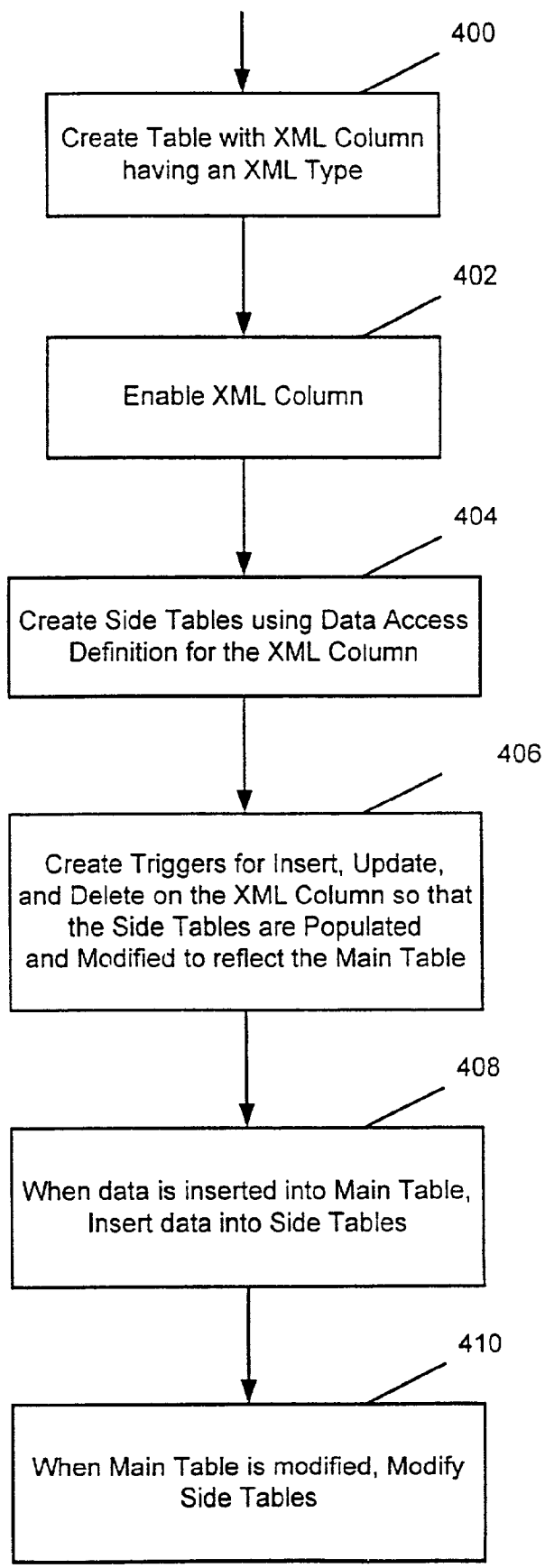
FIG. 4 is a flow diagram illustrating steps performed by the XML System in creating and maintaining XML document data as column data.

The following is a Functional Description:
This routine creates a default view which joins the user table and XML column side tables together with the name specified as the input parameter default_view. The key here is to join by the rootid, which can be the DXXROOT_ID or the primary key of user table. As the input to this routine, the rootid is used as the column name for join.
1. Declare a cursor on the statement:
   SELECT colname FROM syscat.column WHERE tabname=tablename execute the statement, open the cursor and tetch on the cursor, while (! end of fetch ){
   get column and append user_tab.colunm to string userTableColumns append tablename to string alltablenames,
2. Looping through the pDAD structure,
   for each side table pDADst do:
      append side table name pDADst->stbname to alltablenames,
      append to string join_condition with
         "tablename.rootid=pDADst->stbname.rootid";
      loop through the pDADst->col list,
      for each column in the side table do:
         append the pDADst->stbname.pDAdst->scolname
            to the string
            sideTableColumns;
3. execute the create view statement:
   CREATE VIEW default_view AS
   SELECT usertableColumns sideTableColumns FROM
      alltablenames
      WHERE join_condition D.21 Flow Diagrams
FIG. 4 is a flow diagram illustrating steps performed by the XML System in creating and maintaining XML document data as column data. In Block 400, the XML System creates a table with an XML column having a XML column type. The table is created in response to a CREATE TABLE statement that specifies the XML column. In Block 402, the XML System enables the XML column. Next, the XML System, in Block 404, creates side tables using a Data Access Definition for the XML column. In Block 406, the XML System creates triggers for Insert, Update, and Delete on the XML column, so that the side tables are populated when the main table is populated and the side tables are modified when the main table is modified. Thus, the main table and side tables are synchronized. In Block 408, when data is inserted into the main table, the XML System inserts data into the side tables. In Block 410, when the main table is modified (i.e., data is updated or deleted), the XML System modifies the side tables.

Figure 5:
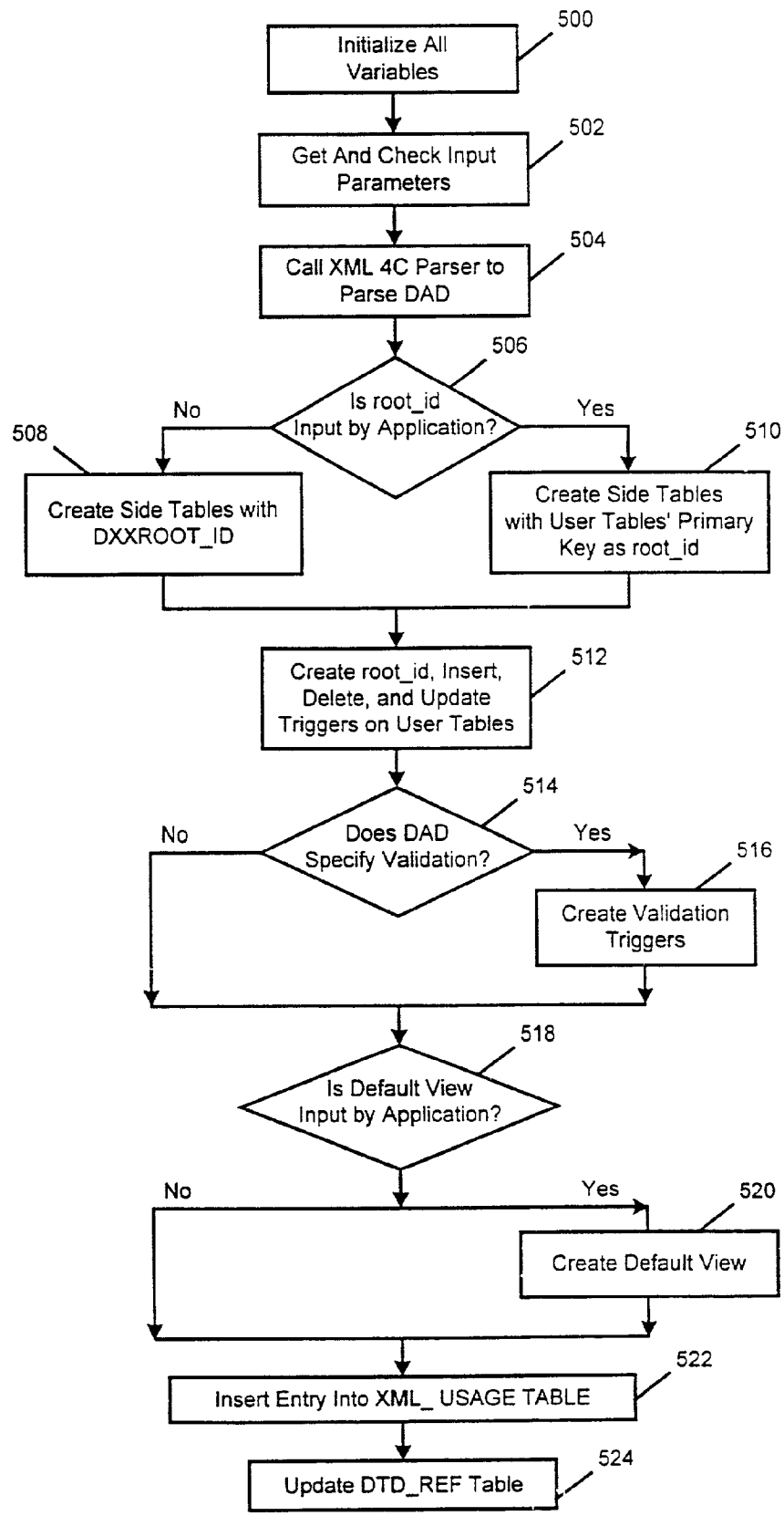
FIG. 5 is a flow diagram of steps performed by the XML System to enable a column.
Figure 6:
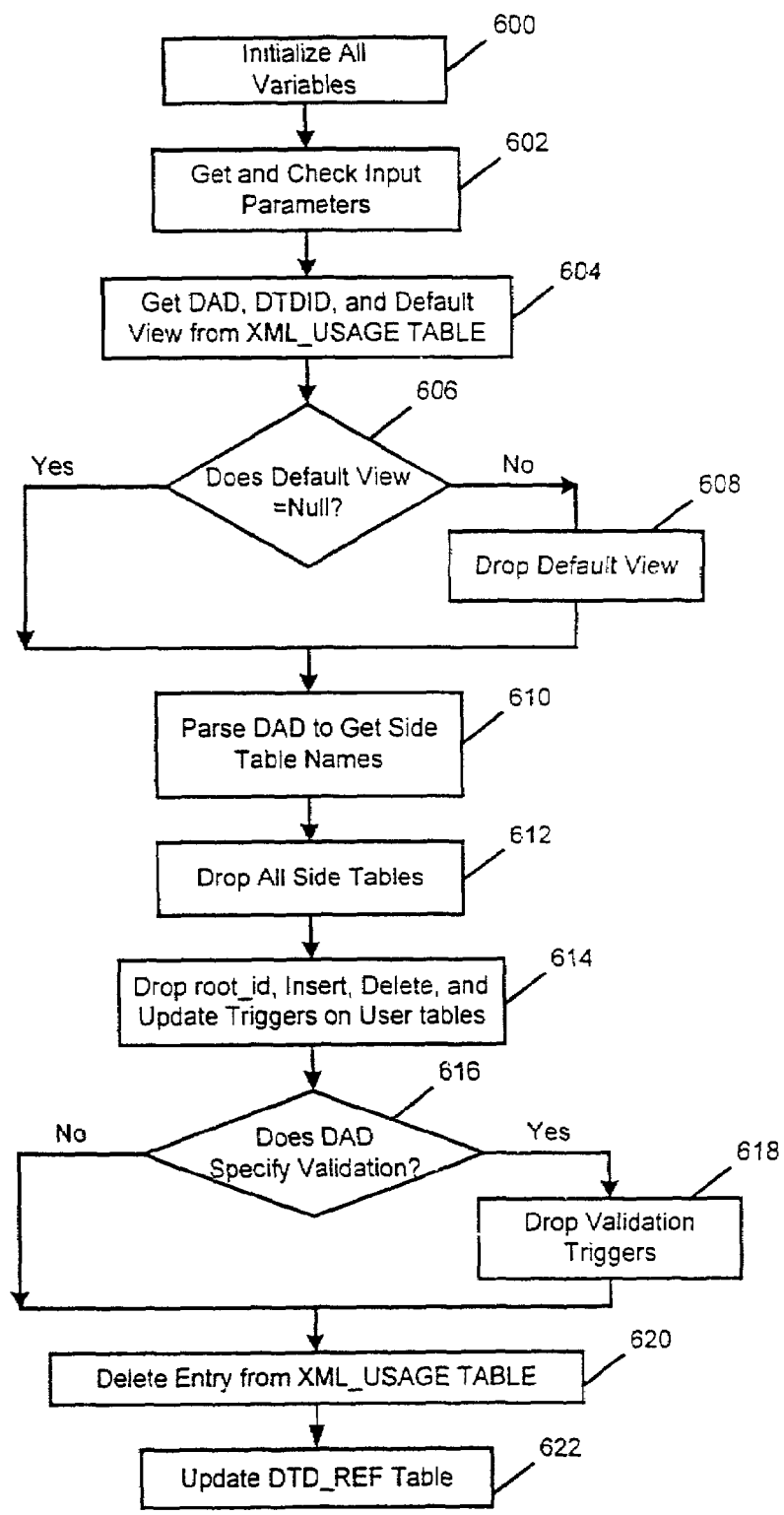
FIG. 6 is a flow diagram of steps performed by the XML System to disable a column.

FIGS. 5 and 6 illustrate key aspects of an embodiment of the invention. In particular, these figures illustrate enabling a column and disabling a column.

FIG. 5 is a flow diagram of steps performed by the XML System to enable a column. In block 500, the XML System initializes all variables. In block 502, the XML System gets and checks input parameters. In block 504, the XML System calls a XML4C parser to parse a DAD. In block 506, the XML System determines whether the root_id is input by an application. If not, the XML System continues to block 508, otherwise, the XML system continues to block 510. In block 508, the XML System creates side tables with DXXROOT_ID. In block 510, the XML System creates side tables with the user table's primary key as the root_id. In block 512, the XML System creates the root_id, insert, delete, and update triggers on user tables.

In block 514, the XML System determines whether the DAD specifies validation. If so, the XML System continues to block 516, otherwise, the XML System continues to block 518. In block 516, the XML System creates validation triggers. In block 518, the XML System determines whether a default view is input by the application. If so, the XML System continues to block 520, otherwise, the XML System continues to block 522. In block 520, the XML System creates a default view. In block 522, the XML System inserts an entry into XML_USAGE TABLE. In block 524, the XML System updates the DTD_REF.

FIG. 6 is a flow diagram of steps performed by the XML System to disable a column. In block 600, the XML System initializes all variables. In block 602, the XML System gets and checks input parameters. In block 604, the XML System gets the DAD, DTDID, and default view from the XML_USAGE TABLE. In block 606, the XML System determines whether the default view is null. If si, the XML System continues to block 610, otherwise, the XML system continues to block 608. In block 608, the XML System drops the default view.

In block 610, the XML System parses the DAD to get side table names. In block 612, the XML System drops all side tables. In block 614, the XML System drops the root_id, insert, delete, and update triggers on user tables. In block 616, the XML System determines whether the DAD specifies validation. If so, the XML System continues to block 618, otherwise, the XML System continues to block 620. In block 616, the XML System creates validation triggers. In block 620, the XML System deletes the entry from the XML_USAGE TABLE. In block 622, the XML System updates the DTD_REF table.

E. Generating One or More XML Documents from a Single SQL Query

In one embodiment of the invention, an XML System is provided that generates one or more XML documents from a single SQL query. This technique is referred to as "SQL mapping". The XML System retrieves data in existing relational database tables and forms a set of one or more XML documents. Using the XML System, application programs can turn existing business data into one or more new XML documents to be interchanged from business to business via a network, such as the internet or an intranet.

The XML System takes a single SQL query, along with a definition of the data model from which one or more XML documents are to be generated (i.e., a DAD), and forms one or more XML documents using the data in existing database tables which meet the query condition.

The XML System is implemented by stored procedures which can be called from the database client code. The stored procedures take a Data Access Definition (DAD), which consists of the SQL query, the Extensible Markup Language Path (XPath) data model based definition of the document structure to be generated, and a table name which will contain the generated one or more XML documents as its row data. The stored procedures use a heuristic technique to eliminate duplication from the SQL query. Additionally, the stored procedure identifies the relational hierarchy of the SQL query and maps the data obtained from the SQL query into elements and attributes of generated one or more XML documents.

An Xcollection defines how to compose one or more XML documents from a collection of relational tables. An XML collection is a virtual name of a set of relational tables. Applications can enable an XML collection of any user tables. These user tables can be existing tables of legacy business data or ones newly created by the XML System. A user can access XML collection data through the stored procedures provided by the XML System.

An XML collection is used to transform data between database tables and one or more XML documents. An XML collection achieves the goal of data interchange via XML. For applications that want to compose one or more XML documents from a set of relational tables, the XML System offers a technique to enable an XML collection through a Document Access Definition (DAD). In the Document Access Definition, applications can make a custom mapping between database column data in new or existing tables to XML elements or attributes. The access to an XML collection is by calling the XML System's stored procedures or directly querying the tables of the collection.

E.1 Example

The following discussion provides an example of generating one or more XML documents from a relational database using an SQL query and a simple DAD. In particular, a relational database is illustrated. Then, an SQL query is illustrated that is used to retrieve data from the relational database. Next, the results of the SQL query are illustrated. Moreover, the Document Access Definition (DAD), which contains the SQL query is illustrated, along with a Document Type Definition (DTD). After this, one XML document that is generated to contain the data retrieved by the SQL query is illustrated.

Relational Database:

| order_key | customer_name | customer_email | customer_phone |
|---|---|---|---|
| 1 | General Motor | parts@gm.com | 800-GM-PARTS |

| part_key | color | qty | price | tax | order_key |
|---|---|---|---|---|---|
| 156 | red | 17 | 17954.55 | 0.02 | 1 |
| 68 | black | 36 | 34850.16 | 0.06 | 1 |
| 128 | red | 28 | 38000.00 | 0.07 | 1 |

| date | mode | comment | part_key |
|---|---|---|---|
| Mar. 13, 1998 | TRUCK | This is the first shipment to service of GM. | 156 |
| Jan. 16, 1999 | FEDEX | This the second shipment to service of GM. | 156 |
| Aug. 19, 1998 | BOAT | This shipment is requested by a call. from GM marketing. | 68 |
| Aug. 19, 1998 | AIR | This shipment is ordered by an email. | 68 |
| Dec. 30, 1998 | TRUCK | NULL | 128 |

The following is an SQL query. The SELECT term selects columns. The FROM term indicates the tables from which data is to be selected. The WHERE term indicates the conditions for selecting data. This SQL query is defined in a Document Access Definition, which is illustrated below.

```
SELECT o.order_key, customer_name, customer_email,
    p.part_key, color, qty, price,
    tax, ship_id, date, mode
FROM order_tab o, part_tab p, table(select
    substr(char(timestamp(generate_unique( ))), 16)
    as ship_id, date, mode, part_key from ship_tab)
WHERE order_key=1 and p.price>20000 and
    p.order_key=o.order_key and s.part_key=p.part_key
```

The following is a table holding the results of executing the SQL query:

| order_key | customer_name | customer_email | part_key | color | qty | price | tax | ship_id | date | mode |
|---|---|---|---|---|---|---|---|---|---|---|
| 1 | General Motor | parts@gm com | 68 | red | 36 | 34850 16 | 0.06 | 4 58 825484 | Aug. 19, 1998 | BOAT |
| 1 | General Motor | parts@gm com | 68 | red | 36 | 34850 16 | 0.06 | 4 58 825537 | Aug. 19, 1998 | AIR |
| 1 | General Motor | parts@gm com | 128 | red | 28 | 38000 00 | 0.07 | 4 58 825589 | Dec. 30, 1998 | TRUCK |

The data in order_key, customer_name, customer_email, part_key, qty, price, and tax are duplicated for each shipment. The data in order_key, customer_name, and customer_email are duplicated for each part. This issue is addressed by partitioning the columns into equivalence classes that reflect the semantics of the relational data: {order_key, customer_name, customer email}, {part_key, color, qty, price, tax}, and {ship_id, date, mode}. The XML System opens a new cursor only when it crosses a boundary between classes.

A user can decide how structured XML documents are to be stored or created through a Document Access Definition (DAD). The DAD itself is an XML formatted document. The DAD associates XML documents to a database by defining an Xcollection. The SQL_stmt in the DAD is an SQL query that specifies how columns of a table are to be mapped to XML elements and attributes. The columns in the SELECT clause are mapped to XML elements or attributes. They will be used to define the value of attribute_nodes or content of text_nodes. The FROM clause defines the tables containing the data, and the WHERE clause specifies the join and search conditions.

Assuming the following structure of an XML document will be generated from the data selected by a SQL_stmt, how to use an XML collection to specify the DAD will be illustrated below.

```
<?xml version="1.0"?>
<!DOCTYPE Order SYSTEM "E:\dxx\test\dtd\litem.dtd">
<Order key="1">
  <Customer>General Motor</Customer>
  <Part key="68">
    <Quantity>36</Quantity>
    <ExtendedPrice>34850.16</ExtendedPrice>
    <Tax>0.06</Tax>
    <Shipment>
      <ShipDate>Dec. 04, 1998</ShipDate>
      <ShipMode>BOAT</ShipMode>
      <Comment>This shipment is requested by a
          call from GM marketing</Comment>
    </Shipment>
    <Shipment>
      <ShipDate>Aug. 19, 1998</ShipDate>
      <ShipMode>AIR</ShipMode>
      <Comment>This shipment is ordered by an
          email</Comment>
    </Shipment>
  </Part>="128">
    <Quantity>28</Quantity>
    <ExtendedPrice>38000.00</ExtendedPrice>
    <Tax>0.07</Tax>
    <Shipment>
      <ShipDate>Dec. 30, 1998</ShipDate>
      <ShipMode>TRUCK</ShipMode>
      <Comment>This is the first shipment to
          service of GM</Comment>
```

-continued

```
    </Shipment>
  </Part>
</Order>
```

The following sample DAD shows how to define the mapping from relational tables to one or more XML documents using SQL mapping. The following sample DAD shows how to specify an SQL query to compose a set of one or more XML documents from data in three relational tables.

```
Litem_DAD2.dad
<?xml version="1.0"?>
<!DOCTYPE Order SYSTEM "E:\dtd\dxxdad.dtd">
<DAD>
<dtdid>E:\dtd\lineItem.dtd</dtdid>
<validation>YES</validation>
<Xcollection>
<SQL_stmt>
SELECT o.order_key, customer, p.part_key, qty, price, tax, ship_id,
date,mode,comment
FROM order_tab o, part_tab p,
    table(select substr(char(timestamp(generate_unique())),16) as
        ship_id,date,mode,comments from ship_tab) as s
WHERE p.price > 2500.00 and s.date > "Jun. 01, 1996" AND
    p.order_key = o.order_key and s.part_key = p.part_key
</SQL_stmt>
<objids>
  <column name="order_key"/>
  <column name="part_key"/>
  <column name="ship_id"/>
</objids>
<prolog>?xml version="1.0"?</prolog>
<doctype>!DOCTYPE Order SYSTEM "E:\dtd\lineItem.dtd"</doctype>
<root_node>
  <element_node name="Order">
   <attribute_node name="Key">
    <column name="order_key"/>
   </attribute_node>
   <element_node name="Customer">
    <text_node>
     <column name="customer"/>
    </text_node>
   </element_node>
   <element_node name="Part">
    <attribute_node name="Key">
     <column name="part_key"/>
    </attribute_node>
    <element_node name="Quantity">
     <text_node>
      <column name="qty"/>
     </text_node>
    </element_node>
    <element_node name="ExtendedPrice">
     <text_node>
      <column name="price"/>
     </text_node>
    </element_node>
    <element_node name="Tax">
     <text_node>
      <column name="tax"/>
     </text_node>
    </element_node>
    <element_node name="Shipment">
    <element_node name="ShipDate">
     <text_node>
      <column name="date">
     </text_node>
    </element_node>
    <element_node name="ShipMode">
     <text_node>
      <column name="mode"/>
     </text_node>
    </element_node>
    <element_node name="Comments">
     <text_node>
      <column name="comment"/>
     </text_node>
    </element_node>
   </element_node> <!-- end Shipment -->
  </element_node> <!-- end Part -->
 </element_node> <!-- end Order -->
</root_node>
</Xcollection>
</DAD>
```

The SQL query should be in a top-down order of the relational hierarchy. In the example, it is required to specify the selected columns in the order of 3 levels: order, part and shipment. Within each level, the objid must be the first column. If the order described is not preserved, the generated XML documents may not be correct.

E.2 How to Use an XML Collection

An XML collection is a set of relational tables which contain XML data. These tables can be new tables generated by the XML System or existing tables which have data to be used by the XML System to generate one or more XML documents. Stored procedures provided by the XML System serve as the access methods. Unlike the XML column, an XML collection does not have to be enabled. The enablement is based on the operations performed.

A composition operation of an XML collection is to generate one or more XML documents from data existing in the collection tables. Therefore, for this operation, an XML collection does not need to be enabled, providing all tables already exist in the database. The DAD will be passed to stored procedures. The DAD can be overridden by other XML query parameters as the stored procedure input parameters. This kind of parameter can be obtained from various sources (e.g., dynamically from the web).

In the DAD preparation, first "Xcollection" is defined. An Xcollection can be defined for composition or decomposition, in the way of either SQL mapping or RDB_node mapping. In both cases, the following steps should apply:

1. Specify the DTDID. The DTDID must be the same as the system ID in the doctype.
2. Specify the validation. When using DTDID, the validation should be always be "YES".
3. Specify the prolog and doctype. For composition, the same prolog and doctype are allowed.

E.2.1 Enabling an XML Collection

The purpose of enabling an XML Collection for decomposition is to parse a DAD, create new tables or check the mapping against existing tables. The DAD is stored into the XML_USAGE table when the XML Collection is enabled.

When a user prefers to have the XML System create collection tables, the user should enable the XML collection. Additionally, the enablement depends on the stored procedure the user chooses to use. The stored procedure dxyInsertXML( ) will take XML Collection name as the input parameter. In order to use the stored procedure dxxInsertXML( ), the user must enable an XML collection before calling it. The user can call stored procedure dxxShredXML( ) without the enabling of an XML collection by passing a DAD. In the later caPse, all tables specified must exist in the database.

E.2.1.1 Enabling XML Collection Option

For composition, an XML collection is not required to be enabled. The assumption is that all collection tables already exist in the database. The stored procedure can take a DAD as an input parameter and generate XML documents based on the DAD. On the other hand, the composition is the opposite of the decomposition. For XML collections enabled during the decomposition process, the DAD is likely to be used to compose XML documents again. If the same DAD is used, then the collection can be enabled for both composition and decomposition.

An XML Collection can be enabled through the XML System administration GUI (graphical user interface) or using the dxxadm command with the Enable_collection option. The syntax of the option on a DB2 server is as follows:

dxxadm  enable_collection  db_name  collection_name
    DAD_file [-t tablespace]

where
a. db_name: name of the database.
b. collection_name: name of the XML collection, which will be used as the parameter to the stored procedures.
c. DAD_file: Data Access Definition(DAD) file.
d. tablespace: Optional. The tablespace contains tables in the XML collection. If new tables need to be created for decomposition, then new tables will be created in the specified tablespace.

The following is an example of enabling the XML collection called sales_order in database mydb with the DAD_file Litem_DAD3.dad.
/home/ul>dxxadm enable_collection mydb sales_order Litem_DAD3.dad
DXXA009I XML System is enabling collection sales_order. Please wait.
DXXA010I XML System has successfully enabled the collection sales_order.
/home/u1>

The enable_collection option mainly does the following things to a database:
e. Read the DAD_file, call XML parser to parse DAD, and save internal information for mapping.
f. Store internal information into the XML_USAGE table.

The option is good for performance and is usually helpful to perform composition and decomposition using one DAD.

E.2.1.2 Enable_collection Option

The enable_collection option enables an XML collection associated with an application table. The association between the application table and the side table specified by the DAD is through the root_id.

Syntax
dxxadm enable_collection db_name collection DAD_File [-t tablespace] [-l login] [-p password]

Argument
g. db_name: the database name.
h. collection: the name of an XML collection.
i. DAD_File: the file containing the DAD.
j. tablespace: Optional. The tablespace containing a user table specified in the DAD or side table created by the XML System.
k. login: Optional. The user ID, which is only needed if the command is invoked from a DB2 client.
l. password: Optional. The password, which is only needed if the command is invoked from a DB2 client.

The enable_collection option will enable an XML collection. The enablement process is to parse the DAD and prepare tables for XML collection access. It takes the database name, a name of the XML collection, a DAD_File and an optional tablespace. The XML collection will be enabled based on the DAD in the DAD_File. It checks whether the tables specified in the DAD exist. If the tables do not exist, the XML System will create the tables according to the specification in the DAD. The column name and data type is taken from the RDB_node of an attribute_node or text_node. If the tables exist, the XML System will check whether the columns were specified with the right name and data types in the corresponding tables. If a mismatch is found, an error will be returned. The tablespace is optional, but it is specified if the collection tables are to be created in a tablespace other than the default tablespace of the specified database.

The enable_collection is required for decomposition stored procedure dxxInsertXML( ), and its pairing dxxRetrieveXML( ), and the dxxUpdateXML( ). For stored procedure dxxGenXML( ) and dxxShredXML( ) which take a DAD as input. the enablement of an XML collection is not required. For the latter stored procedures, it is assumed that all tables specified in the DAD exist in the database already. If they don't exist, an error will be returned. The enable_collection does have a pairing disable_collection option. But the operation of disable_collection is much simpler. It just deletes the collection from XML_USAGE table.

Figure 7:
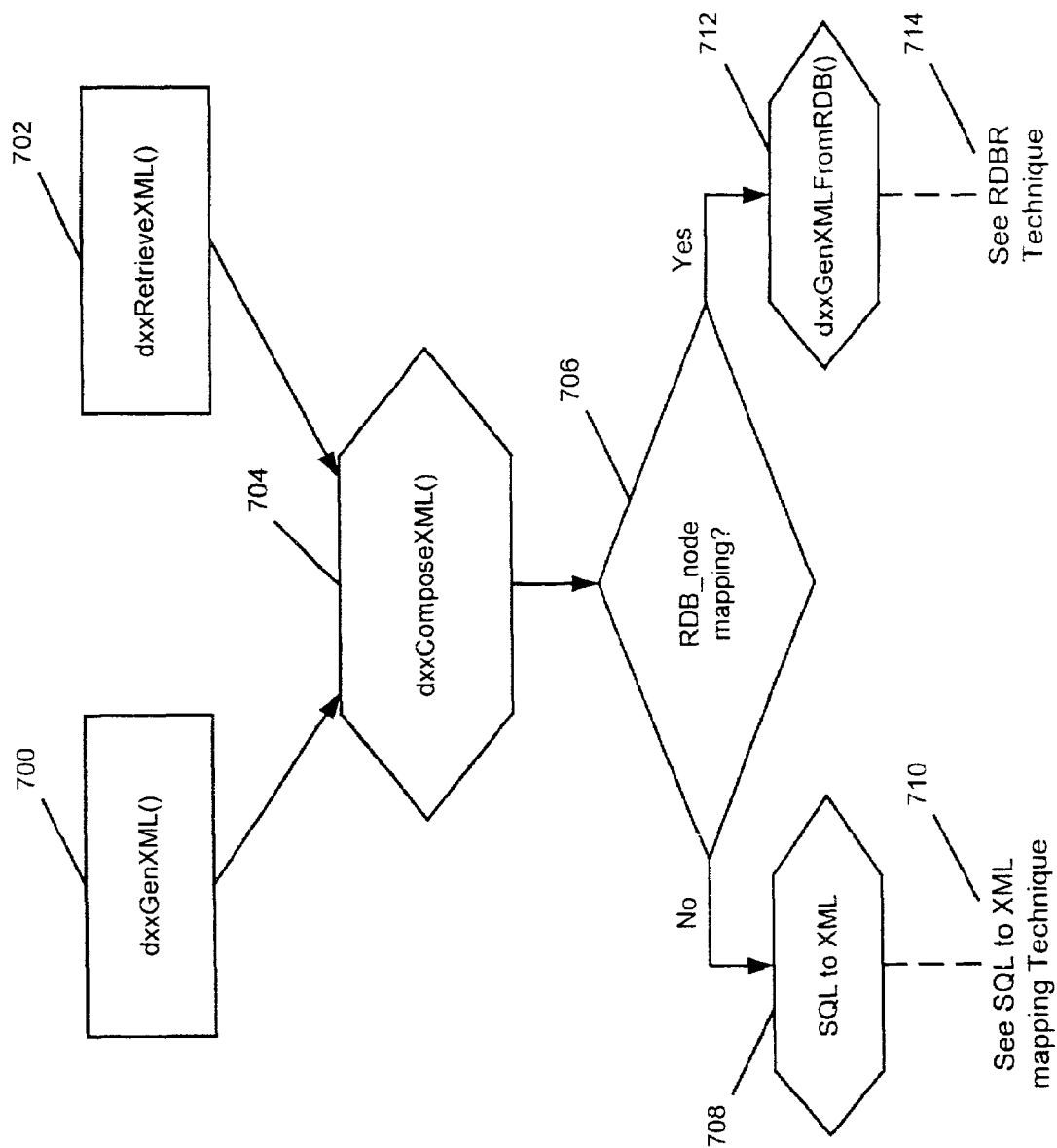
FIG. 7 is a diagram illustrating code organization to compose XML documents.

FIG. 7 is a diagram illustrating code organization to compose XML documents. The dxxGenXML( ) stored procedure 700 and the dxxRetrieveXML( ) stored procedure 702 each invoke the dxxComposeXML( ) module 704. Decision block 706 determines whether RDB_node mapping is to be performed. If RDB_node mapping is not to be performed, processing continues with SQL to XML module 708 and the SQL to XML mapping is performed by the SQL to XML mapping technique 710. If RDB_node mapping is to be performed, processing continues with the dxxGenXMLFrom RDB( ) module 712 and RDB_node mapping is performed by the RDBR technique.

E.3 Using SQL Mapping Scheme

The mapping between composed XML documents and an XML collection is specified in the Xcollection of a DAD. The XML System adapts the notation used in XPath and uses a subset of it to define the XML document structure. In order to facilitate the mapping, the XML System introduces the element SQL_stmt to the Xcollection.

The DAD defines the XML document tree structure using seven kinds of nodes defined by XPath:
root_node
element_node
text_node
attribute_node
namespace_node
processing_instruction_node
comment_node The element SQL_stmt is designed to allow simple and direct mapping from relational data to one or more XML documents through a single SQL statement. It is useful for the composition when application programmers know exactly what data they want to select from a database and compose the one or more XML documents. The content of the SQL_stmt must be a valid SQL select statement. The columns in the SELECT clause are mapped to XML elements or attributes. They will be used to define the value of attribute_nodes or content of text_nodes. The FROM clause defines the tables containing the data, and the WHERE clause specifies the join and search conditions.

In the definition of an Xcollection, for this embodiment of the invention, the following approach is used to define the SQL mapping:
Provide direct SQL statement in one optional SQL_stmt, then specify the mapping between the columns in the SQL statement and text_nodes or attribute_nodes in the XML data model. In this case, the XML System will use the SQL statement to select the data for composition or insert data for decomposition.

The text_node and attribute_node will have a one-to-one mapping to/from a column in a relational table. Therefore, each of them will have a column to define the mapping, where the column is needed for SQL mapping. It is possible that an element_node has no text_node but only child element_node(s).

The SQL mapping is simple and powerful. For SQL mapping, a user may join all tables in one select statement to form a query.

The SQL mapping requires a user to supply an SQL_stmt in a DAD. To simplify the demonstration, the following steps guide a user to define an 'Xcollection' for composition, using SQL mapping. The composed XML document order.xml is in C.5, the given DTD LineItem.dtd is in C.4, and Litem_DAD2.dad in E.1.

Define only one SQL_stmt in the Xcollection. In the SQL_stmt, supply an SQL query which joins all tables of the XML collection and select desired columns from these tables. The predicate as the query condition should be specified in the WHERE clause. In the SELECT clause, the column name to be selected should be unique. In case of two columns of different tables having the same name, use the AS to make them different. This is because the column name specified in the select clause will be used to identify the value of an attribute_node or text_node.

Note, in the examples of this section, three tables: order_tab, part_tab and ship_tab are joined through the order_key and part_key, and order_key, part_key, price, qty, tax, date, mode and comment are selected. The query condition is price>2500.00 and date>"1996-06-01".

Define the "ORDER BY" clause at the end of SQL_stmt. For each table, define a column or a unique identifier so that the one or more XML documents generated will be ordered by it. In the example, the primary key column is used for order_tab and part_tab. However, it is not necessary to use the primary key as long as it is unique and identifies a row object in the table. It can be generated by using the generate_unique( ) function or a user defined function (UDF) and does not need to be a real column name. However, "AS" followed by a conceptual column name in the SQL_stmt must be used, first, then that name is used in the "ORDER BY" clause. Ship_id is used in the example for ship_tab in this way.

Define the tree data structure of the XML documents by specifying the root_node. The root_node should have only one child element_node, in the example, the element_node for "Order".

Specify column name of each attribute_node and text_node in the document tree structure. It must be specified, and the column name must be in the select clause of the SQL_stmt. A user can also specify an optional condition to qualify the documents to be generated.

E.4 Detailed Techniques

E.4.1 Levels

In the relational data model, entities may have one-to-many relationships. For example, one order may have many parts, and one part may have many shipments. If these relationships are visualized in the form of a tree, order could be regarded as the root, which has parts as its children, and each part has shipments as its children. For this discussion, the different levels of this tree are called "relational levels."

An XML document also has a tree structure that consists of elements at different levels in the tree. Unfortunately, these levels do not necessarily match the levels in the relational model. For example, although Customer and Part are at the same level in the XML tree (since both are immediate children of Order), an Order may have multiple Parts and it can have only one Customer. Therefore, the element Part needs to be generated in a way which is different from the way in which Customer is generated. To generate Parts, the XML System opens a new cursor and loops through parts. To generate Customer, the XML System retrieves data from the same descriptor (SQLDA) as Order, and no new cursor or loop is required.

In one embodiment, the implicit stack of recursion keeps track of the XML levels only. An additional data structure (a level map) is used to keep track of the relational levels in order to make the technique behave properly.

To generate a level map, the columns of the SQL query result are partitioned into equivalence classes, such that the columns in each class are at the same relational level. Because the notion of relational levels are in the semantics of the data, it is generally impossible to deduce this partition information from the SQL query alone, especially in legacy databases where tables have been created without proper declarations of primary keys and foreign keys.

In one embodiment, the user specifies the partition in a DAD by deciding which pieces of data should "come together as a class conceptually." In the example, order_key, customer_name, and customer_email come together to form the conceptual class Order. Similarly, date and mode should come together to form the notion of a shipment.

In another embodiment, the partition is generated automatically using some heuristics. One heuristic technique assumes that the columns in the result of the SQL query are in a top-down order of the relational hierarchy. It also requires a single-column candidate key to begin each level. If such a key is not available in a table, the query generates one for that table using a table expression and the built-in function generate_unique( ). For further illustration, refer to the query in the example to see how it handle ship_tab, which does not have a single-column candidate key.

The technique selects distinct counts from the result of the SQL query on the first column, the first and the second, the first and the second and the third and so on. It starts a new partition whenever it detects a change in the distinct counts. Because of a restriction of the "select distinct" feature of DB2®, any character data longer than 254 bytes will be truncated.

The following data structures are used:

levelmap
  Levelmap is an associative array that maps column names to their equivalence class numbers or "relational level." The equivalence classes in ascending order of relational levels should have one-to-many relationship between each adjacent classes with the "many" side at the upper level. In the example, "order_key" maps to 0; "part_key" maps to 1; and "date" maps to 2. The associative array can be implemented in memory, for example, as a hash table, a sorted array, or a binary search tree.

The following are methods of levelmap:

acquire( )
  It uses some heuristics to determine the partition to initialize the level map. This method requires SQL access to dxxcache.

int getLevel(column)
  It retrieves the relational level of the column.

char *[ ] getcolumns(int level)
  It retrieves the column names of the specified level.

releases
  It deallocates the memory that was allocated in acquires.

outbuf
  It is an automatically expandable buffer for holding an XML document during construction. At the end of the construction, outbuf holds the entire XML document.

The following are methods of outbuf:

acquire(int estimated_size, location)
  It allocates the buffer using the estimated size as the initial size. The location parameter specifies whether the buffer will be based on main memory or a disk file.

append(string)

It appends the string into the buffer, and expands the buffer if necessary.
char *getContent( )
It retrieves the content of the buffer if it is in memory or the filename if it is in a file.
release( )
It deallocates the buffer.

E.4.2 Pseudocode for Implementation

The following is a set of pseudocode for implementing a stored procedure to generate an XML document from a single SQL query in an embodiment of the invention:
dxxGenXML(dadbuf, result_tabname, m, n, sqlstate, msgtext)
  dadbuf------------a memory buffer containing a document access definition
  result_tabname----the name of the table into which the resulting XML documents
  will be stored
  m------------------the maximum number of documents/rows to return; 0 if none.
  n------------------OUT: the actual number of documents/rows generated
  sqlstate------------OUT: the SQL state in case of errors
  msgtext------------OUT: message text in case of errors

```
dxxGenXML(dadbuf, result_tabname, m, n, sqlstate, msgtext) {
/* Parse the DAD and prepare the SQL query */
dad = the DOM tree of dadbuf;
Perform the query and save the result into cache table,
    db2xml.dxxcache;
Initialize levelmap by a heuristic technique.
    top_columns = levelmap->getColumns(0);
    top_query = "select distinct top_columns from dxxcache";
PREPARE q INTO :sqlda FROM :top_query;
DESCRIBE q INTO :sqlda
DECLARE cur CURSOR FOR q;
OPEN cur;
for i = (1..n) {
    FETCH cur USING DESCRIPTOR sqlda;
    if(SQLCODE == +100) /* no more data */
        goto exit;
    outbuf->acquire(estimated_size);
    genXMLDoc(sqlda, levelmap, dad,
        &outbuf, rc, msgtext);
    /* outbuf now contains an XML document */
    INSERT INTO result_tabname VALUES outbuf;
    outbuf->release();
}
msgtext = "Result exceeds maximum."
    "Only the first n documents are returned.";
exit:
    CLOSE cur;
    Drop table dxxcache;
}
genXMLDoc(sqlda, levelmap, dad, outbuf, rc, msgtext) {
/* Generate an XML document */
/* Retrieve the header information.*/
Get the prolog and doctype from dad by DOM API.
    and write them to outbuf;
/* Get the root element from DAD.*/
Get the element node under the root node from dad by DOM API.
genXMLElement(root_element_node, sqlda, 0, levelmap,
    outbuf, rc, msgtext);
}
genXMLElement(node, sqlda, currentlevel, levelmap, outbuf, rc,
msgtext) {
Add the opening of the element start-tag to outbuf;
    Get all attribute children of this element from dad by DOM API.
    For each attribute,
        genXMLAttribute(attrnode, sqlda,
            outbuf, rc, msgtext);
    Add the closing of the element start-tag to outbuf;
    Get all other children of this element from dad by DOM API.
    For each child, do {
```

```
        if the child is a text node {
            genXMLText(node, sqlda, outbuf, rc, msgtext);
        } else {
            Get the level of the first column of this child by DOM
                API.
            if(childlevel < currentlevel)
                handle the error:
            if(childlevel == currentlevel) {
                genXMLElement(childnode, sqlda, currentlevel,
                    levelmap, outbuf, rc, msgtext)
            } else {
    /* Open another cursor to generate
    possible multiple occurrences at
    this level.*/
    Get the columns of the child's level by
        levelmap->getColumns(childlevel).
    Construct a where-clause from sqlda by equating
        all pairs of column names and values.
    query = "select distinct columns from dxxcache"
        "where where_clause_from_sqlda";
    PREPARE q INTO :childsqlda FROM :query;
    DESCRIBE q INTO :childsqlda
    DECLARE childcur CURSOR FOR q;
    OPEN childcur;
    while (1) {
        FETCH childcur USING DESCRIPTOR childsqlda;
        if(SQLCODE == +100) /* no more data */
            goto done;
        genXMLElement(childnode, childsqlda, childlevel,
            levelmap,
            &outbuf, rc, msgtext);
            }
        }
done:
    CLOSE childcur;
}
Add element end-tag to outbuf;
}
genXMLAttribute(node, sqlda, outbuf, rc, msgtext) {
Get the value of the attribute from its column in sqlda.
Append to outbuf: "name = \"value\"";
}
genXMLText(node, sqlda, outbuf, rc, msgtext) {
Get the text of node from its column in sqlda.
Append the text to outbuf.
}
```

Given the approach taken for the formulation of a query, there is a problem of duplicated data in certain higher-level columns, such as customer_name in the example, to be tackled. A solution to this problem is to group or "aggregate" the columns that have one-to-one mapping, into an equivalence class. An advantage of this solution is that the XML System does not need to parse the user's SQL query.

To eliminate the duplicates in higher-level columns, the result of the SQL query is traversed at least once for each level. By saving, the result into a cache, such as a temporary table, executing the query multiple times is avoided. The size of this cache table is usually smaller than some of the original user tables and no join is needed for querying, the cache.

To return a result set, the stored procedure opens a cursor and leaves it open. The stored procedure still needs a table for the query for which the cursor is declared.

In DB2®, a result set is available only to client programs that are written using Call Level Interface (CLI) and not using static SQL. On the other hand, any SQL client can have access to a result table.

E.4.3 Code Organization

As for code organization, the XML System code consists of a stored procedure, dxxGenXML, some SQL C functions called by the stored procedure, and a few C++ classes or C structs for defining the necessary data structures. The data structures are defined as C structs because of the rules of DB2® Extenders. The module can be linked into the db2xml DLL with other stored procedures. It interacts with an XML4C parser using the single document interface functions: dxxInitializeParser and dxxDOM, which have already been implemented and used by enable_column.

FIG. 7 is a diagram illustrating code organization to compose XML documents. The dxxGenXML( ) stored procedure 700 and the dxxRetrieveXML( ) stored procedure 702 each invoke the dxxComposeXML( ) module 704. Decision block 706 determines whether RDB_node mapping is to be performed. If RDB_node mapping is not to be performed, processing continues with SQL to XML module 708 and the SQL to XML mapping is performed by the SQL to XML mapping technique 710. If RDB_node mapping) is to be performed, processing continues with the dxxGenXMLFrom RDB( ) module 712 and RDB_node mapping is performed by the RDBR technique.

E.5 Components and Flow Diagram

Figure 8:
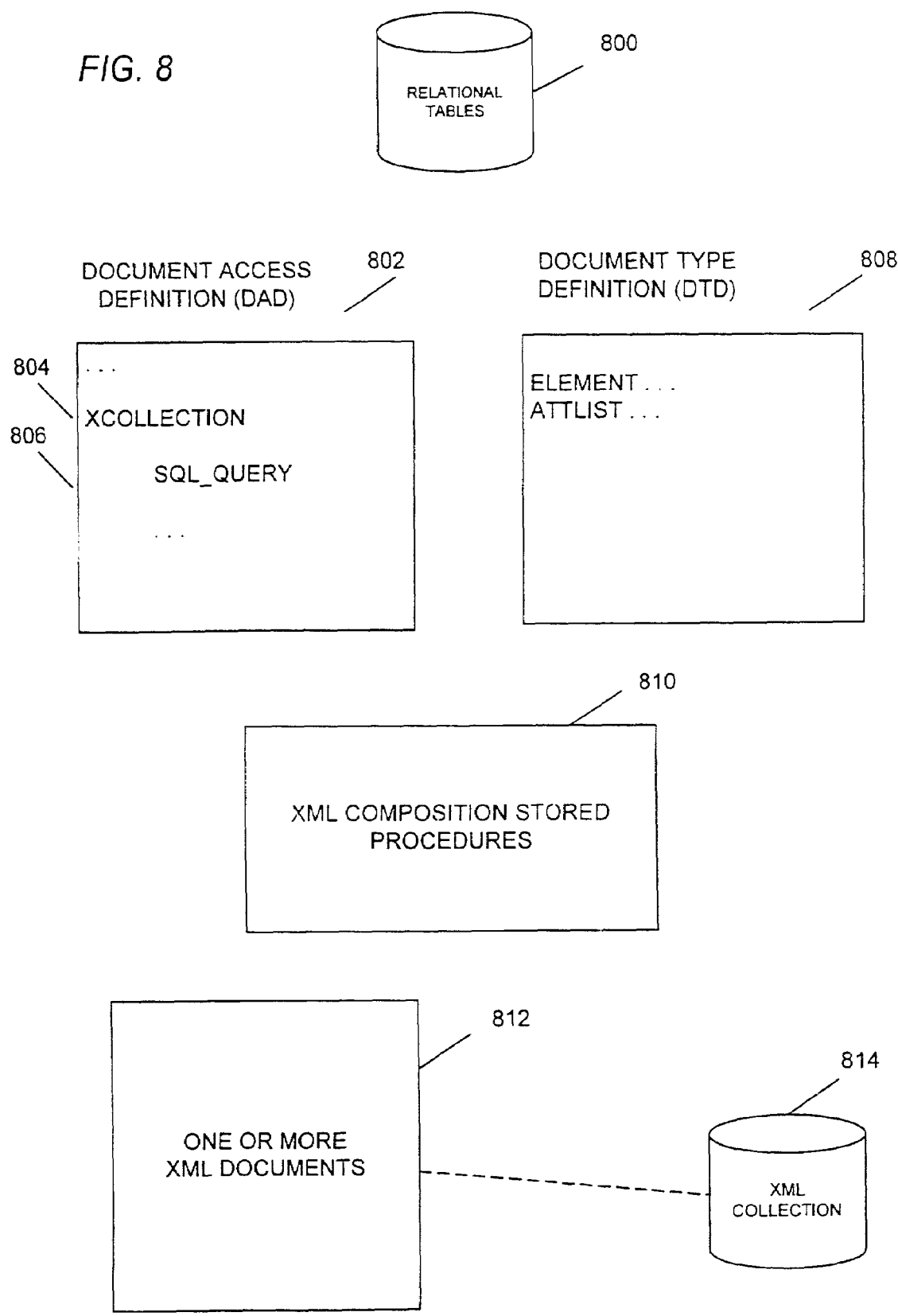
FIG. 8 is a block diagram illustrating components of the XML System in one embodiment of the invention.

FIG. 8 is a block diagram illustrating components of the XML System in one embodiment of the invention. Relational tables 800 store relational data. A Document Access Definition (DAD) 802 defines an Xcollection 804 and a SQL query 806. A Document Type Definition (DTD) 808 is used to validate and define the DAD 802. The SQL query is used to retrieve data from the relational tables 800. Using the DAD 802, the SQL query 806, and the XML composition stored procedures 810, the XML system generates one or more XML documents 812. The XML system stores the data used to generate the one or more XML documents in an XML Collection table 814. Although the relational tables and XML Collection tables are shown in different data storage devices 800 and 814, both types of tables could reside at one data storage device.

Figure 9:
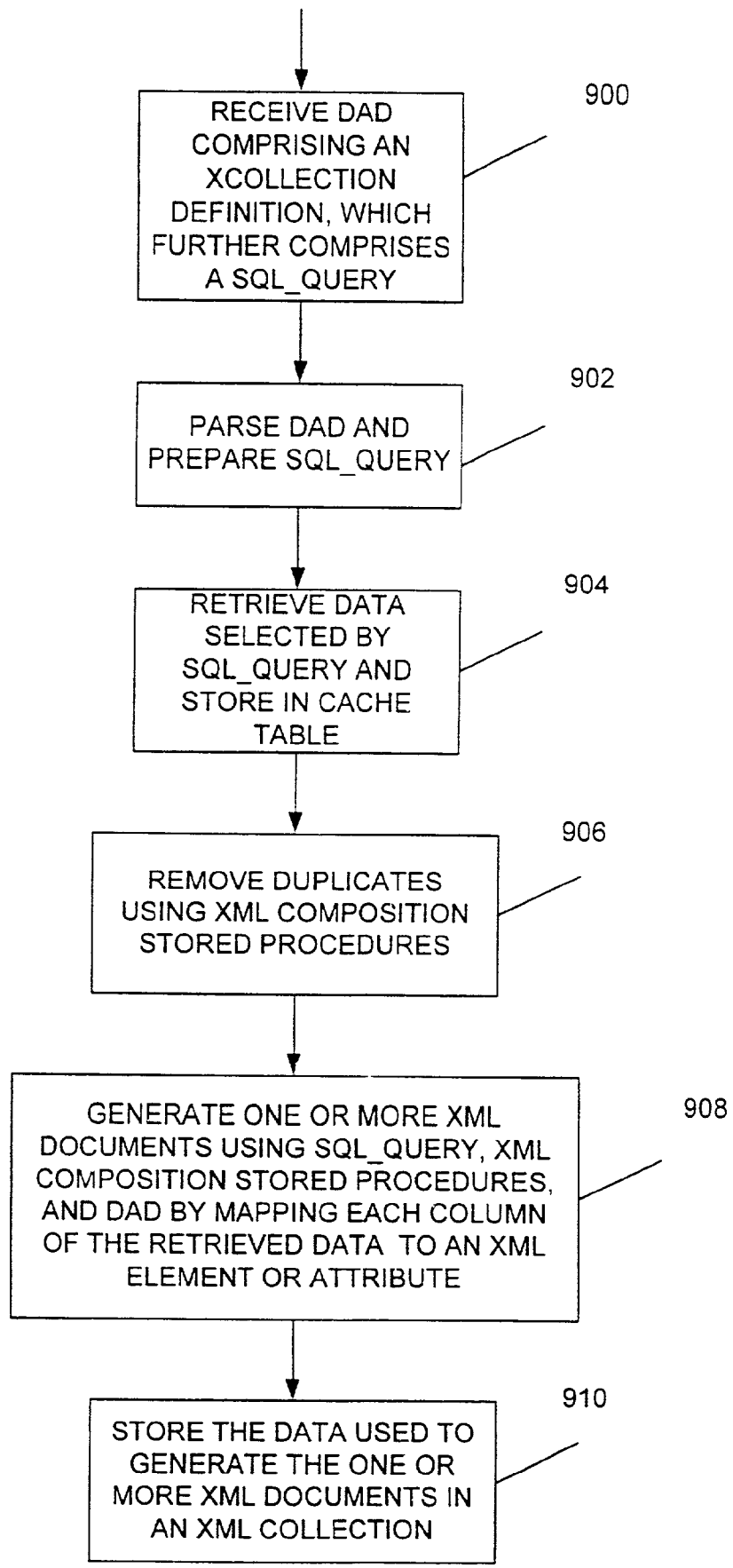
FIG. 9 is a flow diagram illustrating the steps performed by the XML System to transform relational data into one or more XML documents using SQL mapping.

FIG. 9 is a flow diagram illustrating the steps performed by the XML System to transform relational data into one or more XML documents using SQL mapping. In block 900, the XML System receives a DAD comprising an Xcollection definition. The Xcollection definition includes a SQL_query element, which is a valid SQL query. In block 902, the XML System parses the DAD and prepares the SQL_query. In block 904. the XML System retrieves data selected by the SQL_query and stores the data in a cache table. In block 906, the XML System removes duplicates using XML composition stored procedures. In block 908, the XML System generates one or more XML documents using the SQL_query, the XML composition stored procedures, and the DAD. In particular, the XML System uses these components to map each column of the retrieved data to an XML element or attribute. Then, the XML System stores the data used to generate the one or more XML documents in an XML Collection. One skilled in the art would recognize that the one or more XML documents could be stored in another manner, for example, in other types of tables or as a file.

F. Generating One or More XML Documents from a Relational Database using the XPATH Data Model This invention presents a technique for generating one or more XML documents from relational database tables using the XML Path Language (Xpath) data model. XPath models an XML document as a tree of nodes, including element nodes, attribute nodes and text nodes. These nodes form a Document Object Model (DOM) tree.

In particular, the technique of the invention traverses a Document Object Model (DOM) tree generated from an XML formatted Data Access Definition (DAD), generates hierarchical SQL statements to query data from relational tables, then generates one or more structured XML documents. Using this invention, a user can directly map data in an existing database to one or more XML documents, without requiring the transformation from data in a relational database to data in an intermediate XML format.

This invention implements a stored procedure that takes a Data Access Definition (DAD) and a name of a result table and returns a result table that is populated with the one or more generated XML documents. The DAD defines the mapping from the relational tables to the one or more generated XML documents. In a preparation stage, the technique traverses a DOM tree to gather information of each database table to be used in generating one or more XML documents. Then, the technique will generate SQL statements, query relational data, and write XML document tree contents in a recursive manner. During the recursive processing, the SQL statements are generated by using the previously prepared information and passing join values down from a higher level SQL query to a lower level WHERE clause. The result of each query will be taken as the XML attribute value and element text to be written to the output XML documents.

Figure 10:
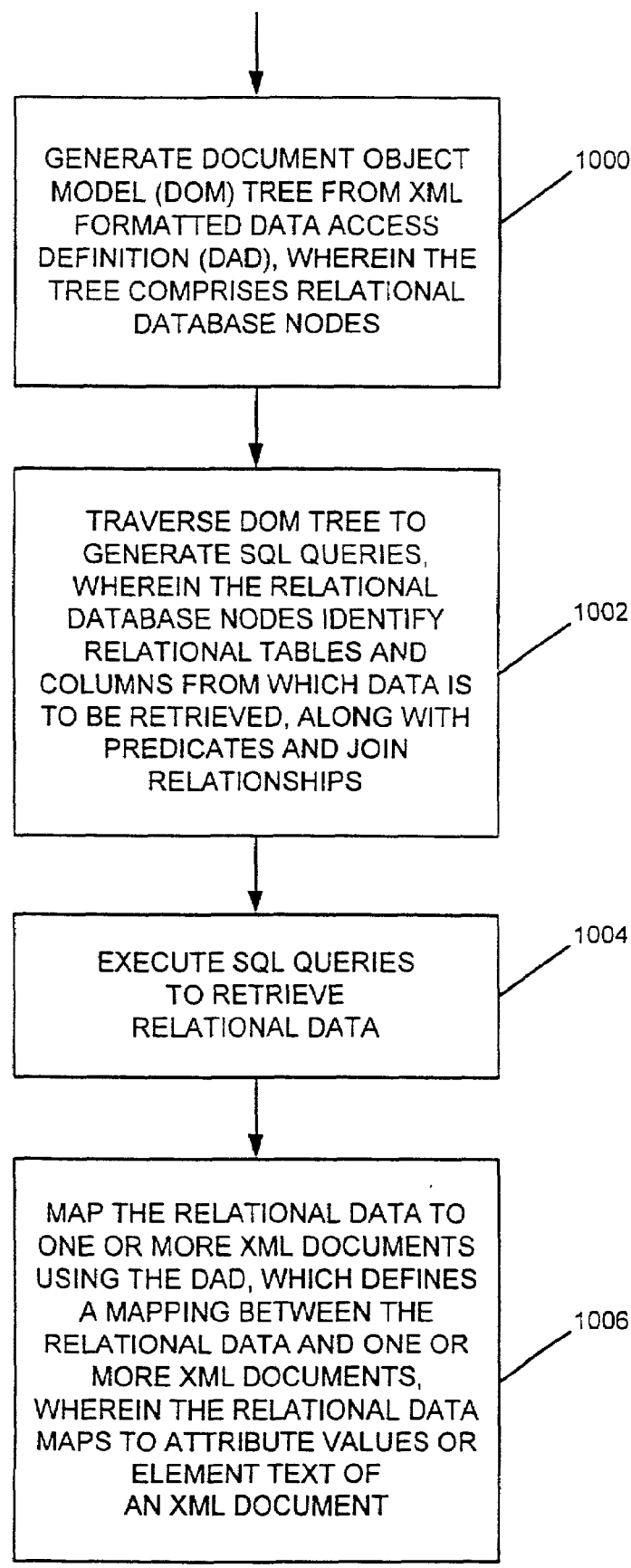
FIG. 10 is a flow diagram illustrating the process performed by the XML system using RDB_node mapping to compose XML documents.

FIG. 10 is a flow diagram illustrating the process performed by the XML system using RDB_node mapping to compose XML documents. In block 1000, the XML system generates a document object model (DOM) tree from an XML formatted data access definition (DAD). The tree comprises relational database nodes (i.e., element nodes, attribute nodes, and text nodes). In block 1002, the XML system traverses the DOM tree to generate SQL queries. In particular, the relational database nodes identify relational tables and columns from which relational data is to be retrieved, along with predicates and join relationships between tables. In block 1004, the XML system executes SQL queries to retrieve relational data. In block 1006, the XML system maps the relational data to one or more XML documents using the DAD. The DAD defines a mapping between the relational data and one or more XML documents. Furthermore, the relational data maps to attribute values or element text of an XML document.

F. 1 Example

The following is an example of generating an XML document from a relational database using an RDB_node (which defines the mapping between an XML element or attribute and relational data) in the DAD. In particular, a relational database is illustrated. Then, the results of performing SQL queries against the relational database are illustrated. Moreover, the Document Type Definition (DTD) and Document Access Definition (DAD) are provided. After this, one XML document that is generated to contain the data retrieved by the SQL query is illustrated.

Relational Database:

order_tab:

| order_key | customer_name | customer_email | customer_phone |
|---|---|---|---|
| 1 | General Motor | parts@gm.com | 800-GM-PARTS | part_tab:

| part_key | color | qty | price | tax | order_key |
|----------|-------|-----|----------|------|-----------|
| 156 | red | 17 | 17954.55 | 0.02 | 1 |
| 68 | black | 36 | 34850.16 | 0.06 | 1 |
| 128 | red | 28 | 38000.00 | 0.07 | 1 | ship_tab:

| date | mode | comment | part_key |
|------|------|---------|----------|
| Mar. 13, 1998 | TRUCK | This is the first shipment to service of GM. | 156 |
| Jan. 16, 1999 | FEDEX | This the second shipment to service of GM. | 156 |
| Aug. 19, 1998 | BOAT | This shipment is requested by a call from GM marketing. | 68 |
| Aug. 19, 1998 | AIR | This shipment is ordered by an email. | 68 |
| Dec. 30, 1998 | TRUCK | NULL | 128 |

The following is an XML Document that is to be generated from the above relational data:

```
<?xml version="1.0"?>
<!DOCTYPE Order SYSTEM "E:\dxx\test\dtd\litem.dtd">
<Order key="1">
    <Customer>
        <Name>General Motor</Name>
        <Email>parts@gm.com</Email>
    </Customer>
    <Part color="red">
        <key>68</key>
        <Quantity>36</Quantity>
        <ExtendedPrice>34850.16</ExtendedPrice>
        <Tax>0.06</Tax>
        <Shipment>
            <ShipDate>Apr. 12, 1996<ShipDate>
            <ShipMode>BOAT</ShipMode>
        </Shipment>
        <Shipment>
            <ShipDate>Aug. 19, 1998</ShipDate>
            <ShipMode>AIR</ShipMode>
        </Shipment>
    </Part>
    <Part color="red">
        <key>128</key>
        <Quantity>28</Quantity>
        <ExtendedPrice>38000.00</ExtendedPrice>
        <Tax>0.07</Tax>
        <Shipment>
            <ShipDate>Dec. 30, 1998</ShipDate>
            <ShipMode>TRUCK</ShipMode>
        </Shipment>
    </Part>
</Order>
```

Assuming the following structure of an XML document will be generated from the data selected by a SQL_stmt, how to use an XML collection to specify the DAD will be illustrated below.

```
<?xml version="1.0"?>
<!DOCTYPE Order SYSTEM "E:\dtd\dxxdad.dtd">
<DAD>
  <dtdid>E:\dtd\lineItem.dtd</dtdid>
  <validation>YES</validation>
```

-continued

```
<Xcollection>
  <prolog><?xml version="1.0"?></prolog>
  <doctype>!DOCTYPE Order SYSTEM "E:\dtd\lineItem.dtd"</doctype>
  <root_node>
    <element_node name="Order">
      <RDB_node>
        <table name="order_tab"/>
        <table name="part_tab"/>
        <table name="ship_tab"/>
        <condition>
          order_tab.order_key = part_tab.order_key AND
          part_tab.part_key = ship_tab.part_key
        </condition>
      </RDB_node>
      <attribute_node name="Key">
        <RDB_node>
          <table name="order_tab"/>
          <column name="order_key"/>
        </RDB_node>
      </attribute_node>
      <element_node name="Customer">
        <element_node name="Name">
          <text_node>
            <RDB_node>
              <table name="order_tab"/>
              <column name="customer_name">
            </RDB_node>
          </text_node>
        </element_node>
        <element_node name="Email">
          <text_node>
            <RDB_node>
              <table name="order_tab"/>
              <column name="customer_email"/>
            </RDB_node>
          </text_node>
        </element_node>
      </element_node>
      <element_node name="Part">
        <attribute_node name="Key">
          <RDB_node>
            <table name="part_tab">
            <column name="part_key">
          </RDB_node>
        </attribute-node>
        <element_node name="ExtendedPrice">
          <text_node>
            <RDB_node>
              <table name="part_tab"/>
              <column name="price"/>
              <condition>
                price > 2500.00
              </condition>
            </RDB_node>
          </text_node>
        </element_node>
        <element_node name="Tax">
          <text_node>
            <RDB_node>
              <table name="part_tab">
              <column name="tax"/>
            </RDB_node>
          </text_node>
        <element_node name="Part">
          <attribute_node name="Key">
            <RDB_node>
              <table name="part_tab"/>
              <column name="part_key"/>
            </RDB_node>
          </attribute_node>
          <element_node name="Quantity">
            <text_node>
              <RDB_node>
                <table name="part_tab"/>
                <column name="qty"/>
              </RDB_node>
            </text_node>
          </element_node>
        </element_node>
```

```
        <element_node name="shipment">
         <element_node name="ShipDate">
          <text_node>
           <RDB_node>
            <table name="ship_tab"/>
            <column name="date"/>
            <condition>
              date > "Jan. 01, 1966"
            </condition>
           </RDB_node>
          </text_node>
         </element_node>
         <element_node name="ShipMode">
          <text_node>
           <RDB_node>
            <table name="ship_tab"/>
            <column name="mode"/>
           </RDB_node>
          </text_node>
         </element_node>
         <element_node name="Comment">
          <text_node>
           <RDB_node>
            <table name="ship_tab"/>
            <column name="comment"/>
           </RDB_node>
          </text_node>
         </element_node>
        </element_node> <!-- end of element Shipment>
      </element_node> <!-- end of element Part --->
    </element_node> <!-- end of element Order --->
</root_node>
</Xcollection>
</DAD>
```

Assuming the XML documents need to be composed or decomposed are like the one shown in the example in Section F.1, the following sample DAD shows how to define the mapping from relational tables using RDB_node Mapping. In particular, the following example DAD shows how to compose/decompose a set of XML documents from/into three relational tables while using the RDB_node to specify the mapping.

```
Litem_DAD3.dad
<?xml version="1.0"?>
<!DOCTYPE Order SYSTEM "E:\dtd\dad.dtd">
<DAD>
<dtdid>E:\dtd\lineItem.dtd</dtdid>
<validation>YES</validation>
<Xcollection>
<prolog>?xml version="1.0"?</prolog>
<doctype>!DOCTYPE Order SYSTEM "E:\dtd\lineItem.dtd"</doctype>
<root_node>
<element_node name="Order">
<RDB_node>
<table name="order_tab" key="order_key"/>
<table name="part_tab" key="part_key"/>
<table name="ship_tab" key="date"/>
<condition>
order_tab.order_key = part_tab.order_key AND
part_tab.part_key = ship_tab.part_key
</condition>
</RDB_node>
<attribute_node name="Key">
<RDB_node>
<table name="order_tab"/>
<column name="order_key" type="integer"/>
</RDB_node>
</attribute_node>
<element_node name="Customer">
<text_node>
<RDB_node>
<table name="order_tab"/>
<column name="customer" type="char(128)"/>
</RDB_node>
</text_node>
</element_node>
<element_node name="Part">
<attribute_node name="Key">
<RDB_node>
<table name="part_tab"/>
<column name="part_key" type="integer"/>
</RDB_node>
</attribute_node>
<element_node name="Quantity">
<text_node>
<RDB_node>
<table name="part_tab"/>
<column name="qty" type="integer"/>
</RDB_node>
</text_node>
</element_node>
<element_node name="ExtendedPrice">
<text_node>
<RDB_node>
<table name="part_tab"/>
<column name="price" type="real"/>
<condition>
price > 2500.00
</condition>
</RDB_node>
</text_node>
</element_node>
<element_node name="Tax">
<text_node>
<RDB_node>
<table name="part_tab"/>
<column name="tax" type="real"/>
</RDB_node>
</text_node>
</element_node>
<element_node name="shipment">
<element_node name="ShipDate">
<text_node>
<RDB_node>
<table name="ship_tab"/>
<column name="date" type="date"/>
<condition>
date > "1966-01-01"
</condition>
</RDB_node>
</text_node>
</element_node>
<element_node name="ShipMode">
<text_node>
<RDB_node>
<table name="ship_tab"/>
<column name="mode" type=char(120)"/>
</RDB_node>
</text_node>
</element_node>
<element_node name="Comment">
<text_node>
<RDB_node>
<table name="ship_tab"/>
<column name="comment" type="varchar(2k)"/>
</RDB_node>
</text_node>
</element_node>
</element_node> <! -- end of element Shipment>
</element_node> <! -- end of element Part --->
</element_node> <! -- end of element Order --->
</root_node>
</Xcollection>
</DAD>
```

F.2 How to Use an XML Collection

An XML collection is a set of relational tables which contain XML data. These tables can be new tables generated by the XML System when decomposing XML documents or existing tables which have data to be used by the XML System to generate XML documents. Stored procedures provided by the XML System serve as the access methods. Unlike the XML column, an XML collection does not have to be enabled. The enablement is based on the operations performed.

A composition operation of an XML collection generates one or more XML documents from data existing in the collection tables. Therefore, for this operation, an XML collection does not need to be enabled, providing all tables already exist in the database. The DAD will be passed to a stored procedure. The DAD can be overridden by other XML query parameters as the stored procedure input parameters. This kind of parameter can be obtained from the Web dynamically.

In the DAD preparation, "Xcollection" is defined first. An Xcollection can be defined for composition with RDB_node mapping. The following steps apply:
  Specify the DTDID. The DTDID must be the same as the system ID in the doctype.
  Specify the validation. When using DTDID, the validation should be "YES".
  Specify the prolog and doctype. For composition, the same prolog and doctype are allowed.
  Specify RDB_node mapping, which will be described in Section F.5 below.

When using the RDB_node mapping, the RDB_node should be defined for a root element_node and each text_node and attribute_node. The RDB_node defines the table and column in the relational database which is to be mapped to an XML element or attribute.

The following illustrates the mapping with RDB_nodes by the sample DAD Litem_DAD3dad. This basically describes how to specify the RDB_node.
  Define the tables and the predicate to join these tables for the root element_node (the element_node under the root_node). All tables which contribute data for the root element should be included, and the condition to join these tables should be stated. The primary and foreign key relationship for join is strongly recommended, but not required. In the example, the root element_node Order's RDB_node has three tables: order_tab, part_tab and ship_tab as shown below.
  For each attribute_node or text_node, the table and column which contains its data are specified. If a user has a select condition, the predicate in the condition of the RDB_node is specified. In the example, for text_node "ExtendedPrice", the table is specified as part_tab, column as price, and the condition as "price>2500.00".

In the RDB_node mapping, the XML System will traverse the document tree structure to generate the XML documents.

```
<element_node name="Order">
  <RDB_node>
    <table name="order_tab" key="order_key"/>
    <table name="part_tab" key="part_key"/>
    <table name="ship_tab" key="date" orderBy="date"/>
    <condition>
      order_tab.order_key = part_tab.order_key AND
      part_tab.part_key = ship_tab.part_key
    </condition>
  </RDB_node>
  . . .
```

F.2.1 Enabling an XML Collection

The purpose of enabling an XML Collection for decomposition is to parse a DAD, create new tables or check the mapping against existing tables. The DAD is stored into the XML_USAGE table when the XML Collection is enabled.

When a user prefers to have the XML System create collection tables, the user should enable the XML collection. Additionally, the enablement depends on the stored procedure the user chooses to use. The stored procedure dxxInsertXML( ) will take XML Collection name as the input parameter. In order to use the stored procedure dxxInsertXML( ), the user must enable an XML collection before calling it. The user can call stored procedure dxxShredXML( ) without the enabling of an XML collection by passing a DAD. In the later case, all tables specified must exist in the database.

F.2.1.1 Enabling XML Collection Option

For composition, an XML collection is not required to be enabled. The assumption is that all collection tables already exist in the database. The stored procedure can take a DAD as an input parameter and generate XML documents based on the DAD. On the other hand, the composition is the opposite of the decomposition. For XML collections enabled during the decomposition process, the DAD is likely to be used to compose XML documents again. If the same DAD is used, then the collection can be enabled for both composition and decomposition.

An XML Collection can be enabled through the XML System administration GUI (graphical user interface) or using the dxxadm command with the Enable_collection option. The syntax of the option on a DB2 server is as follows:
dxxadm    enable_collection    db_name    collection_name
    DAD_file [-t tablespace]

where
  a. db_name: name of the database.
  b. collection_name: name of the XML collection, which will be used as the parameter to the stored procedures.
  c. DAD_file: Data Access Definition(DAD) file.
  d. tablespace: Optional. The tablespace contains tables in the XML collection. If new tables need to be created for decomposition, then new tables will be created in the specified tablespace.

The following is an example of enabling the XML collection called sales_order in database mydb with the DAD_file Litem_DAD3.dad.
/home/u1>dxxadm enable_collection mydb sales_order Litem_DAD3.dad
DXXA009I XML System is enabling collection sales_order. Please wait.
DXXA010I XML System has successfully enabled the collection sales_order.
/home/u1>

The enable_collection option mainly does the following things to a database:
  e. Read the DAD_file, call XML parser to parse DAD, and save internal information for mapping.
  f. Store internal information into the XML_USAGE table.

The option is good for performance and is usually helpful to perform composition and decomposition using one DAD.

F.2.1.2 Enable collection Option

The enable_collection option enables an XML collection associated with an application table. The association between the application table and the side table specified by the DAD is through the root_id.

Syntax
dxxadm enable_collection db_name collection DAD_File
    [-t tablespace] [-l login] [-p password]

Argument
- g. db_name: the database name.
- h. collection: the name of an XML collection.
- l. DAD_File: the file containing the DAD.
- j. tablespace: Optional. The tablespace containing a user table specified in the DAD or side table created by the XML System.
- k. login: Optional. The user ID, which is only needed if the command is invoked from a DB2 client.
- l. password: Optional. The password, which is only needed if the command is invoked from a DB2 client.

The enable_collection option will enable an XML collection. The enablement process is to parse the DAD and prepare tables for XML collection access. It takes the database name, a name of the XML collection, a DAD_File and an optional tablespace. The XML collection will be enabled based on the DAD in the DAD_File. It checks whether the tables specified in the DAD exist. If the tables do not exist, the XML System will create the tables according to the specification in the DAD. The column name and data type is taken from the RDB_node of an attribute_node or text_node. If the tables exist, the XML System will check whether the columns were specified with the right name and data types in the corresponding tables. If a mismatch is found, an error will be returned. The tablespace is optional, but it is specified if the collection tables are to be created in a tablespace other than the default tablespace of the specified database.

The enable_collection is required for decomposition stored procedure dxxInsertXML( ), and its pairing dxxRetrieveXML( ), and the dxxUpdateXML( ). For stored procedure dxxGenXML( ) and dxxShredXML( ) which take a DAD as input, the enablement of an XML collection is not required. For the latter stored procedures, it is assumed that all tables specified in the DAD exist in the database already. If they don't exist, an error will be returned. The enable_collection does have a pairing disable_collection option. But the operation of disable_collection is much simpler. It just deletes the collection from XML_USAGE table.

As discussed in Section E, FIG. 7 is a diagram illustrating code organization to compose XML documents. The dxxGenXML( ) stored procedure 700 and the dxxRetrieveXML( ) stored procedure 702 each invoke the dxxComposeXML( ) module 704. Decision block 706 determines whether RDB_node mapping is to be performed. If RDB_node mapping is not to be performed, processing continues with SQL to XML module 708 and the SQL to XML mapping is performed by the SQL to XML mapping technique 710. If RDB_node mapping is to be performed, processing continues with the dxxGenXMLFrom RDB( ) module 712 and RDB_node mapping is performed by the RDBR technique.

F.3 Using RDB Node Mapping Scheme

The mapping between composed/decomposed XML documents and an XML collection is specified in the Xcollection of a DAD. The XML System adapts the notation used in XSLT and uses a subset of it to define the XML document structure. In order to facilitate the mapping, the XML System introduces the element Relational DataBase node (RDB_node) to the Xcollection.

The DAD defines the XML document tree structure using seven kinds of nodes defined by XSLT/XPath:
- root_node
- element_node
- text_node
- attribute_node
- namespace_node
- processing_instruction_node
- comment_node For simple and complex compositions, the RDB_Node is used to define where the content of an XML element or value of an XML attribute is to be stored or retrieved.

The RDB_Node has the following components:
- Table: the name of the relational table or updateable view, in which the XML element content or attribute value is to be stored.
- Column: the name of the column which contains the element content or attribute value.
- Condition: the predicates in the WHERE clause to select the desired column data.

In the definition of an Xcollection, for this embodiment of the invention the following approach is used to define the mapping:
- RDB_node Mapping: Specify RDB_node for each text_node and attribute_node, and the root element_node in the XML data model. In this case, the XML System will generate SQL statements based on the RDB_nodes and document tree structure.

The text_node and attribute_node will have a one-to-one mapping to/from a column in a relational table. Therefore, each of them will have a RDB_node to define the mapping, where the RDB_node is needed for the RDB_node mapping. It is possible that an element_node has no text_node but only child element_node(s).

Using a RDB_node to specify each text_node and attribute_node is more general. Only the root element_node needs to have a RDB_node. In this RDB_node, the user is required to specify all tables used to compose decompose data, as well as a join condition among these tables. The condition predicate in this RDB_node will be pushed down from the root element_node to all child nodes. Ideally, the way to tie all tables together within an XML collection is the primary-foreign key relationship. However, it often happens that some existing user tables do not have such a relationship. Therefore, requiring the foreign key relationship for composition is too restrictive. However, in the case of decomposition, if new tables are created for storing the decomposed XML data, then the DAD requires a user to specify the primary key of each table, as well as the primary-foreign key relationship among tables.

F.4 Detailed Techniques

The following discussion focuses on the technique for one embodiment of the invention. There are two major phases of the technique: the preparation phase and the generating phase.

F.4.1 Preparation Phase

In this phase, the relational structure is generated by processing the RDB_node of the root element_node. It is required that in this RDB_node, all tables contribute data to the XML document to be listed, as well as the join conditions between these tables.

In this phase, a mapping is added between a relational column and an XML attribute value or element text to the relational table structure, so that the technique tracks where the relational data is from.

F.4.2 Generating Phase

From the root element_node, the technique traverses the DAD DOM Tree, using the relational information recorded in a REL data structure prepared in the first phase to generate a SQL statement. Then the data selected is used to fulfill the XML attribute value or text of an element.

F.4.3 Data Structures

The following data structures are used by the invention:

The following data structures are used for decomposition of XML documents using RDB-nodes.

```
/*---------------------------------
* Column to XML node pair
*---------------------------------*/
typedef struct col2xml {
char col[DB2_TAB_COL_VIEW_LEN];
char dataType[DB2_TAB_COL_VIEW_LEN+8];/* data type of the
column */
char xml[DXX_XML_FIELD_SIZE]; /* xml can be attribute or element
name */
int xmlType; /* DXX_ATTRIBUTE or DXX_TEXT */
int xmlLevel; /* for determining if a column
    needs to be copies to the
    next row */
int indexInSQLDA;
} DXX_COL2XML;
/*---------------------------------
* Table and Column pair
*---------------------------------*/
typedef struct tabcol {
char tab[DB2_TAB_COL_VIEW_LEN];
char col[DB2_TAB_COL_VIEW_LEN];
int indexInSQLDA;
} DXX_TAB_COL;
/*---------------------------------
* Join information
*---------------------------------*/
typedef struct join_info {
char col[DB2_TAB_COL_VIEW_LEN];
    /* column used in the join condition */
int num_join; /* number of foreign columns to be joined */
DXX_TAB_COL foreign[DXX_NUM_FOREIGN];
    /* foreign column and its table to be joined */
} DXX_JOIN_INFO;
/*---------------------------------
* Primary key Information:
*---------------------------------*/
typedef struct pri_key {
int num_col; /* number of columns in the key */
char name[DXX_NUM_MAPPING][DB2_TAB_COL_VIEW_LEN];
    /* the column names of the primary key */
} DXX_PRIKEY;
/*---------------------------------
* Foreign key Information:
*---------------------------------*/
typedef struct for_key {
int num_col; /* number of columns in the key */
DXX_COL2XML col[DXX_NUM_MAPPING];
    /* the columns of the foreign key */
} DXX_FORKEY;
/*---------------------------------
* Table Information:
*---------------------------------*/
typedef struct tab {
char name[DB2_TAB_COL_VIEW_LEN]; /* name of the table */
DXX_PRIKEY pri_key; /* primary key */
DXX_FORKEY for_key; /* foreign key */
int level; /* relational level of the table */
char top_element[DXX_XML_FIELD_SIZE];
    /* the highest level of XML element using
    * column data of this table */
char sql_stmt[MAX_STMT_LEN]; /* SQL statement */
SQLHSTMT hstmt; /* CLI statement handle */
struct sqlda *sqldaPtr; /* pointer of selected data */
int num_col; /* number of columns whic data used in the
    * XML document */
DXX_COL2XML col2xml[DXX_NUM_MAPPING];
    /* mapping between column in this table to
    * XML attribute or element text */
int num_join; /* number of columns in this table which
    * will form join conditions */
DXX_JOIN_INFO join_info[DXX_NUM_JOIN_IN_TABLE]; /* join
information */
char condition[DXX_CONDITION_IN_REL];
    /* condition of select for columns in this
    * table */
} DXX_TAB;
/*---------------------------------
* Relation Information for entire XML documents
*---------------------------------*/
typedef struct rel {
int current_level; /* the current XML level during treversal */
int num_tables; /* number tables to generate/decompose XML doc*/
DXX_TAB *tab[DXX_NUMTAB_IN_REL]; /* details of each table */
char **top_elements; /* index to tab[i]->top_element for fast search. */
SQLHDBC hdbc; /* CLI connection handle */
} DXX_REL;
/*---------------------------------
* Data structure to store a row
*---------------------------------*/
def struct row {
int num_col;
char **coldata; /* Array of pointers */
} DXX_ROW;
/*---------------------------------
* Data structure to store the rows
*---------------------------------*/
typedef struct rows {
int num_rows;
DXX_ROW *row[DXX_MAX_ROWS];
} DXX_ROWS;
```

F.4.4 Pseudocode

The following is sample pseudocode for one embodiment of the invention:

dxxGenXMLFromRDB(hdbc,dad, result_tabname, orverrideType,override,m,n)

hdbc------------odbc handle dad------------DOM tree of document access definition (DAD)

result_tabname----the name of the table into which the resulting XML documents will be stored overrideType-----type of override override-----------string containing the override conditions m------------------the maximum number of documents/rows to return; 0 if none n------------------OUT: the actual number of documents/rows generated Note that in the following technique, m and n are ignored in one embodiment.

```
dxxGenXMLFromRDB(hdbc,dad, result_tabname,overrideType,override
m, n.)
{
 working variable:
  char[] heading_buf;
    DOMtree dad;
    DOMNode top_element_node;
    DXX_REL relation_info;
    DXX_REL *rel = &relation_info;
    DXX_OVERRIDE dxx_override;
    DXX_OVERRIDE_COND *dxx_override_ptr =
    (DXX_OVERRIDE_COND*) &dxx_override;
  /* initialize override data sturcture */
  dxxInitOverride(overrideType.override.dxx_override);
  /* set relational structure */
  setRel(rel,dad);
  root_element_node = get first element_node from dad:
  /* process relational information */
  process_rel(rel.root_element_node,dxx_override);
  /* Retrieve the header information. */
  Get the prolog and doctype from dad by DOM API,
    and write them to heading_buf;
  /* process element_node and generate XML */
  process_root_element(hdbc,rel,root_element_node,result_tabname.
    heading_buf);
}
```

Initialize Override Data Structure

This is used for XML_OVERRIDE. Parse the input override parameter according to the overrideType, then break the conditions into an array structure, where each entry has a path and predicate.

```
dxxInitOverride(overrideType,override,dxx_override)
{
Check overrideType;
if (overrideType == XML_OVERRIDE) {
    loop through input override string {
        parse override path expression and fill into dxx_override
            array entry:
        store path in dxx_override entry's path:
        store predicate in dxx_override entry's predicate;
    }
}
}
```

Setup Relational Structure

This routine will process the RDB_node of the top element code and initialize the REL structure of entire XML documents. After the process, all tables involved in composing/decomposing XML. Documents should be included in the REL structure, and relationship between tables should also be recorded in the REL.

```
setRel(rel,dad dxx_type) {
    working variable:
        DXX_TAB *current_tab;
    get the RDB_node of the top_element_node;
    if no RBD_node
        return error;
    for each table in RDB_node do {
        allocate space for current_tab;
        current_tab->name = RDB_node's table name:
        if (dxx_type == DXX_DECOMPOSE)
            current_tab->primary_key_name = RDB_node's table key;
        current_tab->top_element = NULL;
        current_tab->level = 0;
        current_tab->num_col = 0;
        current_tab->selectDaPtr = NULL;
        current_tab->condition = NULL;
        if (RDB_node's condition != NULL)
            scan the condition of RDB_node,
            current_tab->num_join = 0;
            for each current_tab.column in the predicate do{
                i = current_tab->num_join;
                current_tab->join_info[i].col = curent_tab.column;
                current_tab->join_info[i].num_join = 0;
                for each other_tab.col = current_tab.column do{
                    j = current_tab->join_info[i].num_join;
                    current_tab->join_info[i].foreign[j].col = col in other_tab
                    current_tab->join_info[i].foreign[j].tab = other_tab
                    current_tab->join_info[i].foreign[j].indexInSQLDA = DXX_NONE
                    current_tab->join_info[i].num_join++;
                }
                current_tab->num_join++;
            }
        rel->tab[i]= current_tab;
        rel->num_tables++;
    }
}
Example:
    rel->tab[0].name = "order_tab";
    rel->tab[0].primary_key_name = "order_-key";
    rel->tab[0].level = 0;
    rel->tab[0].top_element = NULL;
    rel->tab[0].selectDaPtr = NULL;
    rel->tab[0].num_col = 0;
    rel->tab[0].num_join = 1;
    rel->tab[0]->join_info[0]->col = "order_key";
    rel->tab[0]->join_info[0]->num_join = 1;
    rel->tab[0]->join_info[0]->foreign[0].col = "o_key";
    rel->tab[0]->join_info[0]->foreign[0].tab = "part_tab";
    rel->tab[0]->join_info[0]->foreign[0].indexInSQLDA = DXX_NONE;
    rel->tab[0]->condition = NULL;
    rel->tab[1].name = "part_tab";
    rel->tab[1].primary_key_name = "part_key";
    rel->tab[1].level = 0;
    rel->tab[1].top_element = NULL;
    rel->tab[1].selectDaPtr = NULL;
    rel->tab[1].num_col = 0;
    rel->tab[1].num_join 2;
    rel->tab[1]->join_info[0]->col = "o_key"
    rel->tab[1]->join_info[0]->num_join = 1;
    rel->tab[1]->join_info[0]->foreign[0].col = "order_key";
    rel->tab[1]->join_info[0]->foreign[0].tab = "order_tab";
    rel->tab[1]->join_info[0]->foreign[0].indexInSQLDA = DXX_NONE;
    rel->tab[1]->join_info[1]->col = "part_key";
    rel->tab[1]->join_info[1]->num_join = 1;
    rel->tab[1]->join_info[1]->foreign[0].col = "p_key";
    rel->tab[1]->join_info[1]->foreign[0].tab = "ship_tab";
    rel->tab[1]->join_info[1]->foreign[0].indexInSQLDA = DXX_NONE;
    rel->tab[1]->condition = NULL;
    rel->tab[2].name = "ship_tab";
    rel->tab[2].primary_key_name = "ship date";
    rel->tab[2].top_element = NULL;
    rel->tab[2].level = 0;
    rel->tab[2].selectDaPtr = NULL;
    rel->tab[2].num_col = 0;
    rel->tab[2].num_join = 1;
    rel->tab[2]->join_info[0]->col = "p_key";
    rel->tab[2]->join_info[0]->num_join = 1;
    rel->tab[2]->join_info[0]->forign[0].col = "part_key"
    rel->tab[2]->join_info[0]->forign[0].tab = "part_tab":
    rel->tab[2]->join_info[0]->foreign[0].indexInSQLDA = DXX_NONE;
    rel->tab[2]->condition = NULL;
    rel->num_tables = 3;
```

Process Relational Information

This is the second phase of the preparation process together all information to generate SQL statements. It recursively processes each RDB_node for each attribute, text, and element node of DAD, and records the mapping relationship into the REL data structure.

```
process_rel(rel, dom_node,current_level, dxx_type)
{
/* The first pass fills in everything in rel,
    except foreign_key. */
process_rel1(rel, dom_node,current_level, dxx_type):
if (dxx_type == DXX_DECOMPOSE) {
    /* The second pass fills in the foreign_key of each table
        in rel and update num_col. */
    process_rel2(rel);
}
findTopElements(rel, dom_node. dxx_type);
Create a hash table or sorted array of all top_elements
rel->top_elements for fast search.
}
process_rel1(rel, dom_node, dxx_type)
{
if (dom_node type == element_node) {
    rel->current_level++;
    child = DOMGetFirstChild;
    while ( child != NULL) {
        process_rel1(rel,child,dxx_type);
        child = DOMGetNextchild;
    }
}
if (type == attribute_node ||
    type == text_node ||
    (dom_node is a leaf element node && DXX_DECOMPOSE)) {
    call DOMgetChild to get the RDB_node of dom_node;
    if (there is no RDB_node)
        return error;
    call process_RDB_node(rel,dom_node, RDB_node.dxx_type);
```

```
        }
        if (dom_node type == element_node)
            rel->current_Level--;
    }
    /* Fill in the foreign_key of each table in rel. */
    process_rel2 (rel)
    {
        /* Working variables: */
        DXX_TAB *foreignTab;
        for (tabIndex = 0; tabIndex < rel->num_tables; tabIndex++) {
            current_tab = rel->tab[tabIndex];
            for (i = 0; i < current_tab->num_join; i++)
                for (j =0; j< current_tab>join_info[i].num_join; j++) {
                    foreignTab = findTabByName(rel,
                            current_tab->join_info[i].foreign[j].tab);
                    if (foreignTab->level < current_tab->level) {
                        strcpy(current_tab->foreign_key.col,
                            current_tab->join_info[i].foreign[j].col);
                        Find k such that foreignTab->col2xml[k].col
                            equals current_tab[]>foreign_key.col;
                        current_tab->foreign_key.xml =
                            foreignTab->col2xml [k].xml;
                        current_tab->foreign_key.xmlType =
                            foreignTab->col2xml[k].xmlType;
                        current_tab->foreign_key.dataType =
                            foreignTab->col2xml[k].dataType:
                    }
                }
        }
    }
    findTopElements(rel, dom_node, dxx_type)
    {
    /* findTopElements finds the top-element for each table in rel. */
    /* findTopElements assumes that process_rel1 has been called. */
        if (dom_node type == element_node) {
            rel->current_level++
            child = DOMGetFirstChild;
            while (child != NULL) {
                findTopElements(rel,child,dxx_type);
                child = DOMGetNextchild;
            }
        }
        if (type == attribute_node ||
                type == text_node
                (dom_node is a leaf element node && DXX_DECOMPOSE)) {
            call DOMgetChild to get the RDB_node of dom_node:
            if (there is no RDB_node)
                return error;
            call findTopElement(rel.dom_node.RDB_node.dxx_type):
        }
        if (dom_node type == element node)
            rel->current_level--;
    }
    Example:
        rel->tab[0].name = "order_tab";
        rel->tab[0].primary key name = "order_key";
        rel->tab[0].foreign_key.col = " ";
        rel->tab[0].top_element = "Order":
        rel->tab[0].selectDaPtr = NULL;
        rel->tab[0].num_col = 3;
        rel->tab[0]->col2xml[0].xml= "Key";
        rel->tab[0]->col2xml[0].col="order_key";
        rel->tab[0]->col2xml[0].dataType="integer";
        rel->tab[0]->col2xml[0].xmlType=DXX_ATTRIBUTE;
        rel->tab[0]->col2xml[0].xmlLevel=0;
        rel->tab[0]->col2xml[1].xml= "name";
        rel->tab[0]->col2xml[1].col="customer_name";
        rel->tab[0]->col2xml[1].dataType="char(128)";
        rel->tab[0]->col2xml[1].xmlType=DXX_TEXT;
        rel->tab[0]->col2xml[1].xmlLevel=2;
        rel->tab[0]->col2xml[2].xml= "email";
        rel->tab[0]->col2xml[2].col="customer_email";
        rel->tab[0]->col2xml[2].dataType="char(128)";
        rel->tab[0]->col2xml[2].xmlType=DXX_TEXT;
        rel->tab[0]->col2xml[2].xmlLevel=2;
        rel->tab[0].num_join = 1;
        rel->tab[0]->join_info[0]->col = "order_key";
        rel->tab[0]->join_info[0]->num_join = 1
        rel->tab[0]->join_info[0]->foreign[0].col = "o_key"
        rel->tab[0]->join_info[0]->foreign[0].tab = "part_tab";
        rel->tab[0]->join_info[0]->foreign[0].indexInSQLDA =
            DXX_NONE;
        rel->tab[0]->condition = NULL;
        rel->tab[1].name = "part_tab";
        rel->tab[1].primary_key_name = "part_key";
        rel->tab[1].foreign_key.col = "order_key";
        rel->tab[1].foreign_key.dataType = "integer";
        rel->tab[1].foreign_key.xml = "Key";
        rel->tab[1].foreign_key.xmlType = DXX_ATTRIBUTE;
        rel->tab[1].top_element = "Part";
        rel->tab[1].selectDaPtr = NULL;
        rel->tab[1].num_col = 5;
        rel->tab[1]->col2xml[0].xml = "Color";
        rel->tab[1]->col2xml[0].col = "Color";
        rel->tab[1]->col2xml[0].dataType="char(5)";
        rel->tab[1]->col2xml[0].xmlType=DXX_ATTRIBUTE;
        rel->tab[1]->col2xml[0].xmlLevel=1;
        rel->tab[1]->col2xml[1].xml = "Key";
        rel->tab[1]->col2xml[1].col= 'part_key';
        rel->tab[1]->col2xml[1].dataType="integer";
        rel->tab[1]->col2xml[1].xmlType=DXX_TEXT;
        rel->tab[1]->col2xml[1].xmlLevel=2;
        rel->tab[1]->col2xml[2].xm1= "Quantity";
        rel->tab[1]->col2xml[2].col="qty";
        rel->tab[1]->col2xml[2].dataType="integer";
        rel->tab[1]->col2xml[2].xmlType=DXX_TEXT;
        rel->tab[1]->col2xml[2].xmlLevel=2;
        rel->tab[1]->col2xml[3].xml= "ExtendedPrice";
        rel->tab[1]->col2xml[3].col="price";
        rel->tab[1]->col2xml[3].dataType="real";
        rel->tab[1]->col2xml[3].xmlType=DXX_TEXT;
        rel->tab[1]->col2xml[3].xmlLevel=2
        rel->tab[1]->col2xml[4].xml= "Tax";
        rel->tab[1]->col2xml[4].col="Tax";
        rel->tab[1]->col2xml[4].dataType="real";
        rel->tab[1]->col2xml[4].xmlType=DXX_TEXT;
        rel->tab[1]->col2xml[4].xmlLevel=2;
        rel->tab[1].num_join = 2;
        rel->tab[1]->join_info[0]->col = "o_key";
        rel->tab[1]->join_info[0]->type = "integer";
        rel->tab[1]->join_info[0]->num_join = 1;
        rel->tab[1]->join_info[0]->foreign[0].col = "order_key"
        rel->tab[1]->join_info[0]->foreign[0].tab = "order_tab";
        rel->tab[1]->join_info[0]->foreign[0].indexInSQLDA =
            DXX_NONE
        rel->tab[1]->join_info[1]->col = "part_key"
        rel->tab[1]->join_info[1]->type = "integer";
        rel->tab[1]->join_info[1]->num_join = 1;
        rel->tab[1]->join_info[1]->foreign[0].col = "p_key";
        rel->tab[1]->join_info[1]->foreign[0].tab = "ship_tab";
        rel->tab[1]->join_info[1]->foreign[0].indexInSQLDA =
            DXX_NONE:
        rel->tab[1]->condition = "price > 2500.00";
        rel->tab[2].name = "ship_tab";
        rel->tab[2].primary_key_name = "ship_date";
        rel->tab[2].foreign_key.col = "part_key";
        rel->tab[2].foreign_key.dataType = "integer";
        rel->tab[2].foreign_key.xml = "Key";
        rel->tab[2].foreign_key.xmlType = DXX_TEXT;
        rel->tab[2].top_element = "Shipment";
        rel->tab[2].selectDaPtr = NULL;
        rel->tab[2].num_col = 2;
        rel->tab[2]->col2xml[0].xml = "ShipDate";
        rel->tab[2]->col2xml[0].col="date";
        rel->tab[2]->col2xml[0].dataType="date";
        rel->tab[2]->col2xml[0].xmlType=DXX_TEXT;
        rel->tab[2]->col2xml[0].xmlLevel=3;
        rel->tab[2]->col2xml[1].xml= "ShipMode";
        rel->tab[2]->col2xml[1].col = "mode";
        rel->tab[2]->col2xml[1].dataType="char(128)";
        rel->tab[2]->col2xml[1].xmlType=DXX_TEXT;
        rel->tab[2]->col2xml[1].xmlLevel=3;
        rel->tab[2].num_join = 1;
        rel->tab[2]->join_info[0]->col = "p_key"
        rel->tab[2]->join_info[0]->type = "integer";
        rel->tab[2]->join_info[0]->num_join = 1;
        rel->tab[2]->join_info[0]->forign[0].col = "part_key";
```

```
        rel->tab[2]->join_info[0]->forign[0].tab = "part_tab";
        rel->tab[2]->join_info[0]->foreign[0].indexInSQLDA =
            DXX_NONE;
        rel->tab[2]->condition = "date > 'Jan. 01, 1966' ";
        rel->num_tables = 3;
process_RDB_node(rel,dom_node, rdb_node, dxx_type)
{
    working variables:
        DXX_TAB   *mytab;
        int   i;
        /* It is attribute_node, text_node, or a Leaf element_node
            in DAD. */
        /* Note: table must be specified in RDB_node *
        mytab = rel->tab[?] such that mytab.name = table of RDB_node
        if no mytab found
            return error;
        i = mytab->num_col;
        mytab->col2xml[i].col=column of RDB_node;
        mytab->col2xml[i].xmlLevel = current_level;
        if (dxx_type == DXX_DECOMPOSE) {
            mytab->col2xml[i].dataType= type of RDB_node;
        }
        if (it is an attribute_node) {
            mytab->col2xml[i].xml=name of the attribute
            if (dxx_type == DXX_DECOMPOSE)
                mytab->col2xml[i].xmlType = DXX_ATTRIBUTE;
        }
        else if (it is a text_node) {
            mytab->col2xml[i].xml=name of the parent element_node;
            if (dxx_type == DXX_DECOMPOSE)
                mytab->col2xml[i].xmlType = DXX_TEXT;
        } else { /* It is a leaf element_node in DAD. */
            mytab->col2xml[i].xml=name of element_node;
            if (dxx_type == DXX_DECOMPOSE)
                mytab->col2xml[i].xmlType = DXX_ELEMENT;
        }
        mytab->num_col++;
        if (condition != NULL)
            add condition to mytab->condition;
}
```

Definition of a Qualifying Parent:
 The parent p of an element qualifies for a table t if all of the following four conditions are met;
1. p exists.
2. p is intermediate.
3. p has multi_occurrence==YES
 4. p does not have any child mapped to a table other than t.
 Intuitively, if a parent qualifies for a table, it is a candidate to be chosen as the top-element of the table.

Definition of Top-element:
Let e be the highest element in DAD that belongs to a table t.
If e does not have a parent qualifying for t, then e is the top-element of t.
Otherwise, the top-element of t is the highest element in the parent chain of e that does not have a parent qualifying for t.

```
findTopElement(rel,dom_node, rdb_node, dxx_type)
{
    working variables:
        DXX_TAB   *mytab;
        int   i;
    /* It is attribute_node, text_node, or a leaf element_node in DAD. */
    /* Note: table must be specified in RDB_node */
        mytab = rel->tab[?] such that mytab.name = table of RDB_node
        if no mytab found
            return error;
        if ( mytab->top_element == NULL ) {
            parent_node = parent element_node of this dom_node;
            grandparent_node = parent of the parent_node;
            while ( grandparent_node exists &&
                grandparent_node is intermediate &&
                grandparent_node has multiple occurrence &&
                grandparent_node does not have children mapped to
                    other tables ) {
                parent node = grandparent node;
                grandparent_node = parent of the grandparent_node:
            }
            mytab->top_element = name of the parent_node;
        }
}
```

Process Root Element
 This is the second phase which will traverse the DOM tree to generate XML document.

```
process_Root_element(SQLHDBC hdbc,
            DXX_REL *rel,
            DOMnode root_element_node,
            char   *result_tabname.
            char   *heading_buf,
            int    m,
            int    *n) {
working variables: char[] element_stmt; /* temp stmt for element */
    DxxBUf outbuf;
    char[] element_name;
    char{} top_sql_stmt;
    SQLDA *selectPtr;
    DXX_TAB *current_tab;
/* A node is trivial if it is intermediate with multi_occur == NO. */
/* Being trivial is the only case when current_tab is not needed. */
if(root_element is trivial){
    prepare outbuf,
    append heading_buf to outbuf;
    process_element_node(hdbc,rel,NULL,root_element_node.outbuf);
    insert outbuff into result_table;
    release outbuf;
} else {
    Get element_name;
    Find current_tab such that
        rel->table[i].top_element == element_name
    if (current_tab is not found)
        dxxFindTabForIntermediate(root_element_node.rel.&current_
        tab);
    current_tab->level = 0;
    rel->current_level = 0;
    Call generate_SQL(rel,current_tab,top_sql_stmt);
        execute top_sql_stmt by hstmt, get data into selectPtr;
        for (i =0; i<m; i++){
            fetch on hstmt;
            current_tab->sqldaPtr = selectDaPtr;
        current_tab->hstmt = hstmt;
            prepare outbuf;
            append heading_buf to outbuf;
            process_element_node(hdbc.rel.current_tab.root_element_
            node.outbuf);
            insert outbuff into result_table;
            release outbuf;
        } /* end of while loop */
} /* endif intermediate element with multi_occurrence == NO */
Free hstmt, all allocated space, etc.
}
```

Find the Table for an Intermediate Element with multi_occurrence YES

```
dxxFindTabForIntermediate(DOM_Node elementNode,  /* input */
            DXX_REL  *rel,   /* input */;
            DXX_TAB  **current_tab) /* output */
```

```
{
    Find the first current_tab by
        traversing down elementNode breadth-first such that
            rel->table[i].top_element == sub_element_name
    if (current_tab not found)
        Error: no way to generate the multiple occurrences
        because there is no table to fetch from.
}
```

Generate SQL Statement
Generate SQL statement using the rel sturcture during the first phase. Two keys there:
1. How to add additional columns to be selected in order to pass their values down to low level SQL statements;
2. How to add additional predicates to the where clause by setting the join value.

```
generate_SQL_stmt(rel,   /* relational info */
        dxx_tab,         /* input */
        sql_stmt)        /* output */
{
    working variables:
        char[] select_stmt;
        char[] fromwhere_stmt;
        int    indexInSQLDA;
        char[] jValue;
    init sql_stmt;
    /* generate select clause */
    sprintf(select_stmt."select ");
    for ( i=0; i< dxx_tab->num_col; i++ ) {
        sprintf(select_stmt, " %s,",dxx_tab->col2xml[i].col);
        dxx_tab->col2xml[i].indexInSQLDA = i;
    }
    /* identify column values need to be passed down */
    indexInSQLDA = dxx_tab->num_col;
    for (i = 0; i < dxx_tab->num_join; i++ ){
        check whether dxx_tab->join_info[i].col is in the
            dxx_tab->col2xml[ ] array;
        if not {
            then /* code may need to select it */
            for ( j=0; j< dxx_tab->join_info[i].num_join; j++ ){
                check whether the dxx_tab->join_info[i].foreign[j].tab' level is
                    less than current_tab->level;
                if yes:
                    strcat(select_stmt, dxx_tab->join_info[i].col);
                    dxx_tab->join_inf[i]->indexInSQLDA = indexInSQLDA;
                    indexInSQLSA++;
                    break; /* out from inner loop */
            }
        }
    } /* end of for */
    /* generate from and where clause */
    sprintf(fromwhere_stmt," from %s where %s\n",
            dxx_table->name dxx_table->condition);
    /* identify values got from parent query to be put in the condition
       This is the join condition */
    for (i = 0; i < dxx_tab->num_join: i++) {
        for (j = 0; j< dxx_tab>join_info[i].num_join: j++ ) {
            check whether the dxx_tab->join_info[i].foreign[j].tab's level is
                greater than current_tab->level;
            if yes then {
                getJvalue(rel,& dxx_tab->join_info[i].foreign[j],
                        dxx_tab->name, dxx_tab->join_info[i].col.& jValue);
            }
            add "AND dxx_tab->join_info[i].col = jValue" to
                fromwhere_stmt;
        }
    }
    strcat(sql_stmt, select_stmt);
    strcat(sql_stmt, fromwhere_stmt);
    strcpy(dxx_tab->sql_stmt, sql_stmt);
}
```

Example:

1. select order_key, customer_name, customer_name
   from order_tab
2. select part_key, price, qty, tax from
   part_tab where price > 2500.00 AND order_key = jValue
3. select date, mode, comments from ship_tab
   where date > 1996-0601 AND part_key = jValue Get Join Value
Get the value from higher level query to from the
```
getJvalue(DXX_REL    *rel,
         DXX_TAB_COL *join_col,
         char        *current_tabname,
         char        *current_colname,
         char        **jValue){
working variables:
    DXX_TAB      *foregn_tab;
    DXX_TAB_COL  *foreign_col;
    int          indexInSQLDA;
```
1. find foreign_tab = rel->table[?]such that its name = join_col->tab;
2. find foreign_col=foreign_tab->col2xml[?].col.
   such that foreign_tab-col2xm[?]=join_col.col;
3. if foreign_col is not found
   then find foreign_col=foreign_tab->join_info[i].foreign[j].col such that
       foreign_tab->join_info[i].foreign[j].col=current_colname AND
       foreign_tab->join info[i].foreign[j].tab=current_tabname
4. indexInSQLDA = foreign_col.indexInSQLDA;
5. get the jValue from parent_tab->selectDaPtr using indexInSQLDA;
6. return jValue
}
Example:
1. For the 2nd Sql_stmt:
       0.join_col->col = "order_key"
         join_col->tab = "order_tab"
       1. parent_tab->name = "order_tab"

-continued

```
    2. parent_col = parent_tab->join_info[0].foreign[0]
        parent_col->tab = "order_tab"
        parent_col->col = "order_key"
    3. parent_col->indexInSQLDA = 0;
    4. jValue can be "1".
```

Process Element Node        10
Process element node and generate the element_stmt

```
process element_node(hdbc,
                     rel,
                     current_tab,
                     element_node,
                     outbuf)
{
    working variable:
        SQLDA selectDaPtr;
        int  isTableNew = FALSE;
        int  hasNotSeenNonAttr = TRUE;
        int  isLastChildElement = FALSE;
        int  isChildNewTopElement = FALSE;
        int  isChildAttrNode = FALSE;
        int  isChildInCurrentTab = FALSE;
        int  isChildIntermediate = FALSE;
        int  isChildTrivial = FALSE;
    rel->current_level++;
    get element_name for element_node;
    append "<" and element_name to outbuf;
    call DOMgetChildNodes to get a list of all children
    of this element_node.
    for each child_node, do {
        /* Set the boolean variables for determining
           if this child should be generated from
           a table different from the current one. */
        Set isChildIntermediate to TRUE if child_node does not have any text or attribute child.
        /* A child is trivial iff it is intermediate with multi_occur == NO. */
        /* Being trivial is the only case when current_tab is not needed. */
        Set isChildTrivial to TRUE if the child_node is trivial.
        if (current_tab != NULL) {
            set isChildInCurrentTab to TRUE, if the child_node's name equals to
                    current_tab's top_element or in its col2xml[];
        } else {
            if (isChildTrivial)
                isChildInCurrentTab = TRUE:
            else
                isChildInCurrentTab = FALSE;
        }
    set isChildAttrNode to TRUE if the child_node is the attribute_node:
    if( !isChiidInCurrentTab ) {
        looping rel->tab[]to see whether the child_node is the
                top_element of some rel->tab[?];
        if found such rel-tab[?]and rel->tab[?]->sqldaPtr=NULL
            set isChildNewTopELement to TRUE;
            current_tab = rel->tab[?];
        }
    }
    /* Check if this child should be generated from
       a new table. */
    /* - An element node does not need a new table
         unless (it is a new top element ||
         (current_tab==NULL && child is not trivial)) */
    /* - An attribute node needs a new table
         only if its value can not be retrieved
         from the current table. */
    /* - A text node never needs a new table. */
    if (isChildNewTopElement ||
        (current_tab==NULL && !isChildTrivial) ||
        ((isChildAttrNode) &&
        (!isChildInCurrentTab))) /* Handle new table. */ {
        isTableNew = DXX_TRUE;
        /* Find the right table. */
        if ( ! childNewTopElement) {
            current_tab = rel->table[1]such that
```

```
            current_tab->col2xml[?].xml = child_node's name
        if (current_tab is not found && isChildIntermediate)
            dxxFindTabForIntermediate(child_node, rel, & current_tab);
    }
    if (current_tab->sql_stmt[0] == '[0]') {
        /* Generate, prepare, and execute an SQL query. */
        current_tab->level rel->current_level
        call generate_SQL(current_tab,sql_stmt);
        prepare and execute the sql_stmt with hstmt and selectDaPtr;
    }
    current_tab->sqldaPtr = selectDaPtr;
    current_tab->hsmt = hsmt;
    fetch hstmt;
    } /* End of handling the new table */
    if the child_node is an attribute_node, do {
        call
process_att_text_node(rel,& child_node.current_tab,DXX_ATTRIBUTE.outbuf);
        if not last one
            append outbuf with ",";
        else
            append outbuf with ">";
    }
    if the child_node is a text_node,
        call
process_att_text_node(rel.&child_node,current_tab,DXX_TEXT,outbuf);
    if the child_node is an element_node {
        if (isTableNew } {
            /* Loop */
            /* Generate possible multiple occurrences of child_node. */
            /* The number of occurrences equals the number of rows to be fetched. */
            while ( fetch ok ) {
                process_element_node(hdbc,rel,current_tab.&child_node,outbuf); {
                fetch on current_tab->hstmt;
                /* NOTE: current_tab->selectDaPtr has new stuff */
            } /* end of while loop */
            clean/free current_tab->sqldaPtr and current_tab->hstmt:
        }
        else { /* same old table */
            /* Generate a single occurrence of child_node. */
            call process_element_node(hdbc.rel.current_tab,&child_node.outbuf):
        }
    } /* End of child_node is element */
} /* End of loop "for each child" */ rel->current_level--;
append outbuf with ("</%s>\n".element_name);
}
```

Process Attribute/Text Node

A process attribute or text node which has no other child node other RDB_node, generate the XML content for attribute and text.

```
process_att_text_node(DXX_REL *rel;
        DXX_TAB *current_tab;
            DOMElement*node:
        int type;
            DXXOutBuf*outbuf)
{
working variables:
    char[] attname;
    char[] eleName;
    char[] xmlname;
    char[] value;
    char[] tabname;
1. if (type = DXX ATTRIBUTE) {
    call DOMgetAttribute to get the attname.
    xmlname = attname;
    }
else { /*text node */
    find the name of its parent element_node, call it eleName;
    xmlname = eleName;
    }
2. call DOMgetChild to get the RDB_node
    tabname = RDB_nodes' table name
```

```
    colname = RDB_nodes' column name
4. if ( tabname = current_tab->name)
        call getValue(current_tab ,xmlname.&value);
    else {
        loop rel to find rel->tab[?] such rel->tab[?]->name=tabname;
        if found,
            call getValue(rel->tab[?],xmlname,&value);
        else{
        internal error;
        }
    }
5. if( type == DXX_ATTRIBUTE) {
append outbuf with ("%s=%s",attname,value);
    else
        append outbuf with ("%s", value);
}
```

Get Value

Get the value as the column value from relational table.

```
getValue(DXX_TAB *current_tab,
        char *nodename,
        char *attr_value)
{
```

-continued

```
working variable:
    int indexINSQLDA;
    for ( i = 0; i < current_tab->num_col; i++)
        if( current_tab->col2xml[i].xml = nodename) {
            indexInSQLDA=current_col2xml[i].indexInSQLDA;
            get attr_value from current_tab->selectDaPtr
                using indexInSQLDA;
            break;
        }
    }
}
```

G. A Technique to Store Fragmented XML Data into a Relational Database by Decomposing XML Documents with Application Specific Mappings This invention presents a technique which stores fragmented XML data into relational database tables by decomposing XML documents with application specific mappings. The mapping is based on the XML Path Language (Xpath) data model. Using this invention, a user can shred XML documents into new or existing database tables. This makes a relational database a repository of fragmented XML data.

The technique parses an incoming XML document to be decomposed and parses an XML formatted Data Access Definition (DAD) with application specific mapping based on the XPath data model, generating two Document Object Model (DOM) trees. The DAD identifies relational tables and columns. One DOM tree is an XML document DOM tree and the other is a DAD DOM tree. The technique then works on both DOM trees to map data in the incoming XML document DOM tree to columns in relational tables, according to the DAD DOM tree.

Additionally, the technique identifies different relational levels and XML levels. Next, the technique generates SQL insertion statements based on the relational level, while taking data from a list of multiple occurrence XML element trees in the same XML level. Additionally, optimization and recursion techniques are used.

Figure 11:
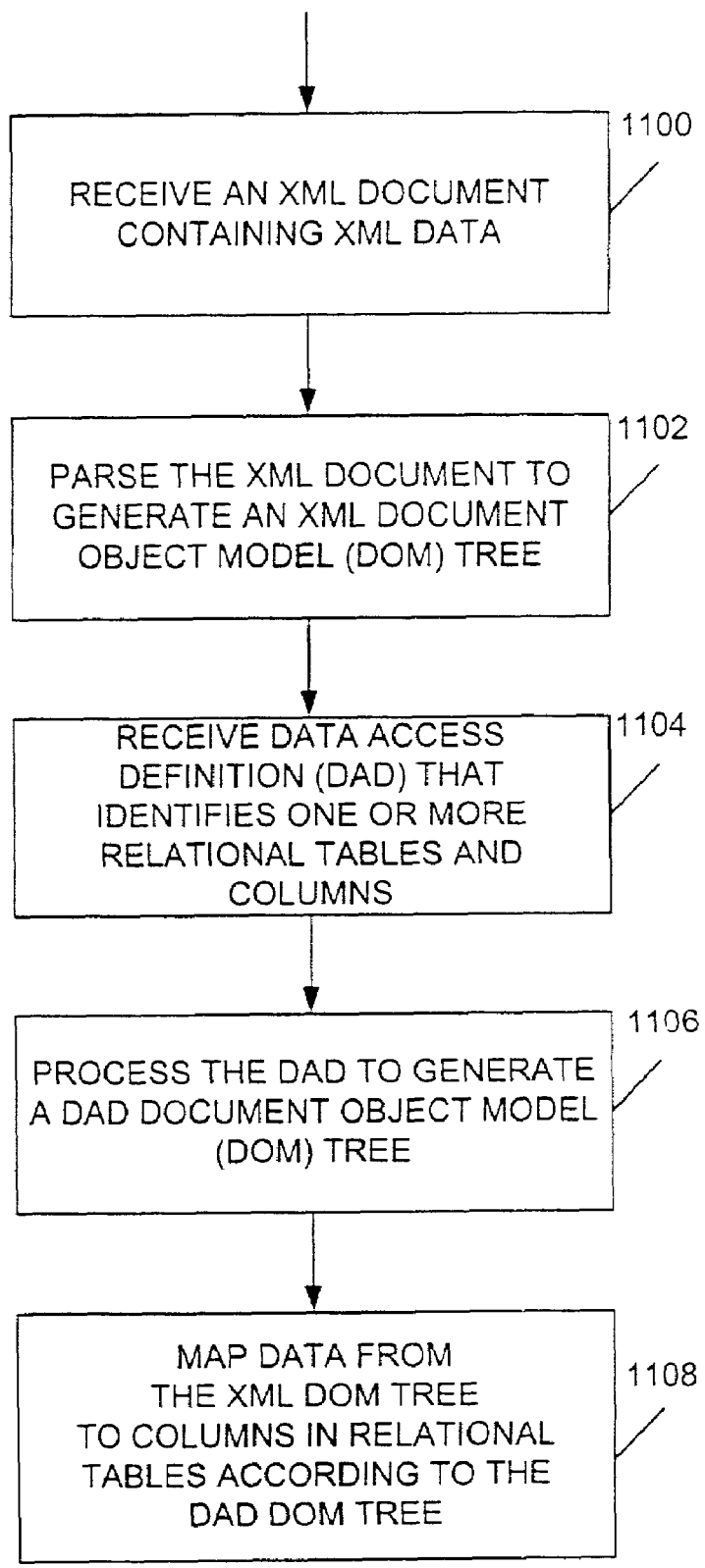
FIG. 11 is a flow diagram illustrating the steps performed by the XML System to decompose XML documents with application specific mappings.

FIG. 11 is a flow diagram illustrating the steps performed by the XML System to decompose XML documents with application specific mappings. In block 1100, the XML System receives an XML document containing XML data. In block 1102, the XML System parses the XML document to generate an XML Document Object Model (DOM) tree. In block 1104, the XML System receives a data access definition (DAD) that identifies one or more relational tables and columns. In block 1106, the XML System processes the DAD to generate a DAD Document Object Model (DOM) tree. In block 1108, the XML System maps data from the XML DOM tree to columns in relational tables according to the DAD DOM tree.

G.1 Decomposing an XML Document into an XML Collection

Decomposition refers to breaking down the data inside of an XML document and storing it into one or more relational tables. The data stored is basically un-tagged. The XML System provides stored procedures to decompose XML data from an XML document. A user always needs to define a DAD for the decomposition. The user may enable an XML collection with a DAD first, then use the stored procedures. For example, when decomposing XML documents into new tables, an XML collection must be enabled so that all tables in the XML collection can be created by the XML System. For some reason, a user may want to use existing tables to add additional data from incoming XML documents. In this case, the user needs to alter the tables to make sure the columns specified in the DAD exist in the tables. The enable collection operation will check this. If the user does not enable the XML collection, the user must pass the DAD to the stored procedure. The sequence order of element or attribute of multiple occurrence will be reserved, only for tables created by the XML System.

G.1.1 Specifying an Xcollection

In the DAD, a user still needs to specify the Xcollection.

G.1.1.1 Mapping Scheme in XML Collections

The mapping between composed/decomposed XML documents and an XML collection is specified in the Xcollection of a DAD. The XML System adapts the notation used in XSLT and uses a subset of it to define the XML document structure. In order to facilitate the mapping, the XML System introduces the element Relational DataBase node (RDB_node) to the Xcollection.

The DAD defines the XML document tree structure using seven kinds of nodes defined by XSLT/XPath:
- root_node
- element_node
- text_node
- attribute_node
- namespace_node
- processing_instruction_node
- comment_node For simple and complex compositions, the RDB_Node is used to define where the content of an XML element or value of an XML attribute is to be stored or retrieved.

The RDB_Node has the following components:
- Table: the name of the relational table or updateable view, in which the XML element content or attribute value is to be stored.
- Column: the name of the column which contains the element content or attribute value.
- Condition: the predicates in the WHERE clause to select the desired column data.

In the definition of an Xcollection, for this embodiment of the invention, the following approach is used to define the mapping:
- RDB_node Mapping: Specify RDB_node for element_node, text_node and attribute_node in the XML data model. In this case, the XML System will generate SQL statements based on the RDB_nodes and document tree structure.

The text_node and attribute_node will have a one-to-one mapping to/from a column in a relational table. Therefore, each of them will have a RDB_node to define the mapping, where the RDB_node is needed for the RDB_node mapping. It is possible that an element_node has no text_node but only child element_node(s).

Using a RDB_node to specify an element_node, text_node and attribute_node is more general. For an element_node, only the root element_node needs to have a RDB_node. In this RDB_node, the user is required to specify all tables used to compose/decompose data, as well as a join condition among these tables. The condition predicate in this RDB_node will be pushed down from the root element_node to all child nodes. Ideally, the way to tie all tables together within an XML collection is the primary-foreign key relationship. However, it often happens that some existing user tables do not have such a relationship. Therefore, requiring the foreign key relationship for composition is too restrictive. However, in the case of decomposition, if new tables are created for storing the decomposed XML data, then the DAD requires a user to specify the primary key of each table, as well as the primary-foreign key relationship among tables.

G.1.1.2 Sample DADs for XML Collections

Assuming the XML documents need to be composed or decomposed are like the one shown in the example above, the following sample DAD shows how to define the mapping from relational tables using RDB_node Mapping. In particular, the following example DAD shows how to compose/decompose a set of XML documents from/into three relational tables while using the RDB_node to specify the mapping.

```
Litem_DAD3.dad
<?xml version="1.0"?>
<!DOCTYPE Order SYSTEM "E:\dtd\dad.dtd">
<DAD>
<dtdid>E:\dtd\lineItem.dtd</dtdid>
<validation>YES</validation>
<Xcollection>
<prolog>?xml version="1.0"?</prolog>
<doctype>!DOCTYPE Order SYSTEM "E:\dtd\lineItem.dtd"</doctype>
<root_node>
<element_node name="Order">
<RDB_node>
<table name="order_tab" key="order_key"/>
<table name="part_tab" key="part_key"/>
<table name="ship_tab" key="date"/>
<condition>
order_tab.order_key = part_tab.order_key AND
part_tab.part_key = ship_tab.part_key
</condition>
</RDB_node>
<attribute_node name="Key">
<RDB_node>
<table name="order_tab"/>
<column name="order_key" type="integer"/>
</RDB_node>
</attribute_node>
<attribute_node name="Customer">
<text_node>
<RDB_node>
<table name="order_tab"/>
<column name="customer" type="char(128)"/>
</RDB_node>
</text_node>
</element_node>
<element_node name="Part">
<attribute_node name="Key">
<RDB_node>
<table name="part_tab"/>
<column name="part_key" type="integer"/>
</RDB_node>
</attribute_node>
<element_node name="Quantity">
<text_node>
<RDB_node>
<table name="part_tab"/>
<column name="qty" type="integer"/>
</RDB_node>
</text_node>
</element_node>
<element_node name="ExtendedPrice">
<text_node>
<RDB_node>
<table name="part_tab"/>
<column name="price" type="real"/>
<condition>
price > 2500.00
</condition>
</RDB_node>
</text_node>
</element_node>
<element_node name="Tax">
<text_node>
<RDB_node>
<table name="part_tab"/>
<column name="tax" type="real"/>
```

-continued

```
</RDB_node>
</text_node>
</element_node>
<element_node name="shipment">
<element_node name="ShipDate">
<text_node>
<RDB_node>
<table name="ship_tab"/>
<column name="date" type="date"/>
<condition>
date > "Jan. 01, 1996"
</condition>
</RDB_node>
</text_node>
</element_node>
<element_node name="ShipMode">
<text_node>
<RDB_node>
<table name="ship_tab"/>
<column name="mode" type=char(120)"/>
</RDB_node>
</text_node>
</element_node>
<element_node name="Comment">
<text_node>
<RDB_node>
<table name="ship_tab"/>
<column name="comment" type="varchar(2k)"/>
</RDB_node>
</text_node>
</element_node>
</element_node> <! -- end of element Shipment>
</element_node> <! -- end of element Part --->
</element_node> <! -- end of element Order --->
</root_node>
</Xcollection>
</DAD>
```

G.1.2 Defining Xcollection for Decomposition in DAD

One DAD can used for both composition and decomposition. For decomposition, additional information is required to be specified in the DAD, however this information is just ignored when the DAD is used for composition.

The additional information needed for decomposition is described below:

Primary Key for each table in the RDB_node for the root element_node

In order to tie XML collection tables together, the primary-foreign key relationship is preserved among the tables. The primary key can consists of a single column or as a composite one consisting of multiple columns. The primary key must be specified for each table. A user does so by adding the attribute key to the table element of the RDB_node. In the following example, the RDB_node of the root element_node "Order" is defined as:

```
<element_node name="Order">
    <RDB_node>
        <table name="order_tab" key="order_key">
        <table name="part_tab" key="part_key, price"/>
        <table name="ship_tab" key="date"/>
        <condition>
            order_tab.order_key = part_tab.order_key AND
            part_tab.part_key = ship_tab.part_key
        </condition>
    </RDB_node>
``` with the keys specified. In the above example, the primary key of part_tab is a composite one.

Data Type of the column

In order to create the right data type for each column when creating new tables during the enabling XML collection process, the column type must be specified for the RDB_node for each attribute_node or text_node. This is because the real data is mapped from an XML attribute value or element text to relational columns. A user does so by adding the attribute type to the column element. In the following example, the RDB_node of attribute_node "Key" of the element_node "Order" is defined as:

```
<attribute_node name="Key">
    <RDB_node>
        <table name="order_tab"/>
        <column name="order_key" type="integer"/>
    </RDB_node>
</attribute_node>
where the type is defined as integer.
```

G.1.3 Enabling an XML Collection

The purpose of enabling an XML Collection for decomposition is to parse a DAD, create new tables or check the mapping against existing tables. The DAD is stored into the XML_USAGE table when the XML Collection is enabled.

When a user prefers to have the XML System create collection tables, the user should enable the XML collection. Additionally, the enablement depends on the stored procedure the user chooses to use. The stored procedure dxxInsertXML( ) will take XML Collection name as the input parameter. In order to use the stored procedure dxxInsertXML( ), the user must enable an XML collection before calling it. The user can call stored procedure dxxShredXML( ) without the enabling of an XML collection by passing a DAD. In the later case, all tables specified must exist in the database.

G.1.3.1 Enabling XML Collection Option

For composition, an XML collection is not required to be enabled. The assumption is that all collection tables already exist in the database. The stored procedure can take a DAD as an input parameter and generate XML documents based on the DAD. On the other hand, the composition is the opposite of the decomposition. For XML collections enabled during the decomposition process, the DAD is likely to be used to compose XML documents again. If the same DAD is used, then the collection can be enabled for both composition and decomposition.

An XML Collection can be enabled through the XML System administration GUI (graphical user interface) or using the dxxadm command with the Enable_collection option. The syntax of the option on a DB2 server is as follows:

dxxadm enable_collection db_name collection_name DAD_file [-t tablespace]

where a. db_name: name of the database.
b. collection_name: name of the XML collection, which will be used as the parameter to the stored procedures.
c. DAD_file: Data Access Definition(DAD) file.
d. tablespace: Optional. The tablespace contains tables in the XML collection. If new tables need to be created for decomposition, then new tables will be created in the specified tablespace.

The following is an example of enabling the XML collection called sales_order in database mydb with the DAD_file Litem_DAD3.dad.

/home/u1>dxxadm enable_collection mydb sales_order Litem_DAD3.dad

DXXA009I XML System is enabling collection sales_order. Please wait.

DXXA010I XML System has successfully enabled the collection sales_order.

/home/u1>

The enable_collection option mainly does the following things to a database:

e. Read the DAD file, call XML parser to parse DAD, and save internal information for mapping.
f. Store internal information into the XML_USAGE table.

The option is good for performance and is usually helpful to perform composition and decomposition using one DAD.

G.1.3.2 Enable collection Option

The enable_collection option enables an XML collection associated with an application table. The association between the application table and the side table specified by the DAD is through the root_id.

Syntax dxxadm enable_collection db_name collection DAD_File [-t tablespace] [-l login] [-p password]

Argument g. db_name: the database name.
h. collection: the name of an XML collection.
i. DAD_File: the file containing the DAD.
j. tablespace: Optional. The tablespace containing a user table specified in the DAD or side table created by the XML System.
k. login: Optional. The user ID, which is only needed if the command is invoked from a DB2 client.
l. password: Optional. The password, which is only needed if the command is invoked from a DB2 client.

The enable_collection option will enable an XML collection. The enablement process is to parse the DAD and prepare tables for XML collection access. It takes the database name, a name of the XML collection, a DAD_File and an optional tablespace. The XML collection will be enabled based on the DAD in the DAD File. It checks whether the tables specified in the DAD exist. If the tables do not exist, the XML System will create the tables according to the specification in the DAD. The column name and data type is taken from the RDB_node of an attribute_node or text node. If the tables exist, the XML System will check whether the columns were specified with the right name and data types in the corresponding tables. If a mismatch is found, an error will be returned. The tablespace is optional, but it is specified if the collection tables are to be created in a tablespace other than the default tablespace of the specified database.

The enable_collection is required for decomposition stored procedure dxxInsertXML( ), and its pairing dxxRetrieveXML( ), and the dxxUpdateXML( ). For stored procedure dxxGenXML( ) and dxxShredXML( ) which take a DAD as input, the enablement of an XML collection is not required. For the latter stored procedures, it is assumed that all tables specified in the DAD exist in the database already. If they don't exist, an error will be returned. The enable_collection does have a pairing disable collection option. But the operation of disable_collection is much simpler. It just deletes the collection from XML_USAGE table.

As discussed above in Section E, FIG. 7 is a diagram illustrating code organization to compose XML documents.

The dxxGenXML( ) stored procedure 700 and the dxxRetrieveXML( ) stored procedure 702 each invoke the dxxComposeXML( ) module 704. Decision block 706 determines whether RDB_node mapping is to be performed. If RDB_node mapping is not to be performed, processing continues with SQL to XML module 708 and the SQL to XML mapping is performed by the SQL to XML mapping, technique 710. If RDB_node mapping is to be performed, processing continues with the dxxGenXMLFrom RDB( ) module 712 and RDB_node mapping is performed by the RDBR technique.

G.1.4 Using Stored Procedures for Decomposition

The decomposition of XML documents from an XML collection is performed through the use of stored procedures. The XML System provides the following stored procedures to compose documents.

dxxInsertXML( )

The dxxInsertXML( ) takes two input parameters, the name of an enabled XML collection and the XML document to be decomposed. It returns two output parameters: an error code and an error message.

The stored procedure dxxInsertXML( ) inserts an input XML document into an enabled XML collection which is associated with a DAD. The collection tables and the mapping are specified in the DAD. During the enabling process, the XML System has already checked or created the collection tables according to the specification of Xcollection. The stored procedure dxxInsertXML( ) will decompose the input XML document according to the mapping specified in the DAD and insert un-tagged XML data into the tables of the named XML collection.

Stored Procedure Declaration:
dxxInsertXML(char(UDB_SIZE) collectionName, /* input */
CLOB AS LOCATOR xmlobj, /* input */
long returnCode, /* output */
varchar(1024) returnMsg) /* output */

Parameters:
collectionName: IN, the name of an enabled XML collection.
xmlobj: IN, an XML document object in CLOB LOCATOR type.
returnCode: OUT, return code in case of error,
returnMsg: OUT, message text in case of error.

The following is an example of this stored procedure call.
EXEC SQL INCLUDE SQLCA;
EXEC SQL BEGIN DECLARE SECTION;
char collection[64]; /* name of an XML collection */
SQL TYPE is CLOB_FILE xmlDoc; /* input XML document */
long returnCode; /* error code */
char returnMsg[1024]; /* error message text */
short collection_ind;
short xmlDoc_ind;
short returnCode_ind;
short returnMsg_ind;
EXEC SQL END DECLARE SECTION;
/* initialize host variable and indicators */
strcpy(collection,"sales_order")
strcpy(xmlobj.name,"e:\xml\order1.xml");
xmlobj.name_length=strlen("e:\xml\order1.xml");
xmlobj.file_option=SQL_FILE_READ;
returnCode=0;
returnMsg[0]='\0';
collection_ind=0;
xmlobj_ind=0;
returnCode_ind=-1;
returnMsg_ind=-1;
/* Call the stored procedure */
EXEC SQL CALL db2xml!dxxInsertXML(:collection:collection_ind;
 :xmlobj:xmlobj_ind,
 :returnCode:returnCode_ind.:returnMsg:returnMsg_ind);

If the XML collection sales_order is enabled with Litem_DAD3.dad, then the dxxInsertXML( ) call will decompose the input XML document "e:\xml\order1.xml" and insert data into the sales_older collection tables according to the mapping specified in Litem_DAD3.dad.

dxxShredXML( )

The stored procedure dxxShredXML( ) work, as same as the stored procedure dxxInsertXML( ) except that it takes a DAD as the first input parameter instead of a name of an enabled XML collection. Therefore, it can be called without enabling an XML collection.

The stored procedure dxxShredXML( ) inserts an input XML document into an XML collection according to the Xcollection specification in the input DAD. If the tables used in the Xcollection of the DAD do not exist or the columns do not meet the data types specified in the DAD mapping, an error will be returned. The stored procedure dxxShredXML( ) decomposes the input XML document and inserts un-tagged XML data into the tables specified in the DAD.

Stored Procedure Declaration:
dxxShredXML(CLOB as LOCATOR dad, /* input */
CLOB as LOCATOR xmlobj, /* input */
long *returnCode, /* output */
varchar(1024) *returnMsg) /* output */

Parameters:
dad: In, a DAD in CLOB Locator type,
xmlobj: IN, an XML document object in CLOB LOCATOR type.
returnCode: OUT, return code in case of error,
returnMsg: OUT, message text in case of error.

The following is an example of the dxxShredXML( ) call.

```
EXEC SQL INCLUDE SQLCA;
EXEC SQL BEGIN DECLARE SECTION;
    SQL TYPE is CLOB_LOCATOR dad; /* DAD*/
    SQL TYPE is CLOB_FILE xmlDoc; /* input XML document */
    long     returnCode;   /* error code */
    char     returnMsg[1024];  /* error message text */
    short    dad_ind;
    short    xmlDoc_ind;
    short    returnCode_ind;
    short    returnMsg_ind;
    EXEC SQL END DECLARE SECTION;
    /* initialize host variable and indicators *
    /* make dad as the CLOB_LOCATOR of dad *
    strcpy(xmlobj.name,"e:\xml\order1.xml");
    xmlobj.name_length=strlen("e:\xml\order1.xml");
    xmlobj.file_option=SQL_FILE_READ;
    returnCode = 0;
    returnMsg[0] = '\0';
    dad_ind = 0;
    xmlobj_ind = 0;
    returnCode_ind = -1;
    returnMsg_ind = -1;
    /* Call the stored procedure */
    EXEC SQL CALL db2xml!dxxShredXML(:dad:dad_ind;
            :xmlobj:xmlobj_ind,
            :returnCode:returnCode_ind,:returnMsg:returnMsg_ind);
```

If the content of DAD_buf has the Litem_DAD3.dad content, then the dxxShredXML( ) call will decompose the input XML document "e:\xml\order1.xml" and insert data into the sales_order collection tables.

G.2 Example Decomposition

The following illustrates an example of decomposing an XML document into a relational database using a RDB_node in the DAD.

```
XML Document to be input:
<?xml version="1.0"?>
<!DOCTYPE Order SYSTEM "E:\dxx\test\dtd\litem.dtd">
<Order Key="1">
    <Customer>
        <Name>General Motor</Name>
        <Email>parts@gm.com</Email> </Customer>
    <Part Color="red">
        <Key>68</Key>
        <Quantity>36</Quantity>
        <ExtendedPrice>34850.16</ExtendedPrice>
        <Tax>0.06</Tax>
        <Shipment>
            <ShipDate>Aug. 19, 1998</ShipDate>
            <ShipMode>BOAT</ShipMode>
        </Shipment>
        <Shipment>
            <ShipDate>Aug. 20, 1998</ShipDate>
            <ShipMode>AIR</ShipMode>
        </Shipment>
    </Part>
    <Part Color="red">
        <key>128</key>
        <Quantity>28</Quantity>
        <ExtendedPrice>38000.00</ExtendedPrice>
        <Tax>0.07</Tax>
        <Shipment>
        <!-- This shipment will not be inserted. -->
        <ShipDate>Jan. 01, 1961</ShipDate>
        <ShipMode>BOAT</ShipMode>
        </Shipment>
        <Shipment>
            ShipDate>Dec. 30, 1998</ShipDate>
            <ShipMode>TRUCK</ShipMode>
        </Shipment>
    /Part>
</Order>
Document Access Definition (DAD):
<?xml version="1.0"?>
<!DOCTYPE Order SYSTEM "E:\dtd\dxxdad.dtd">
<DAD>
    <dtdid>E:\dtd\lineItem.dtd</dtdid>
    <validation>YES</validation>
    <Xcollection>
    <root_node>
    <element_node name="Order">
        <RDB_node>
            table name="order_tab" key="order_key"/>
            <table name="part_tab" key="part_key"/>
            <table name="ship_tab" key="ship_date"/>
            <condition>
                order_tab.order_key=part_tab.o_key AND
                part_tab.part_key=ship_tab.p_key
            </condition>
        </RDB_node>
        <attribute_node name="Key">
            <RDB_node>
                <table name="order_tab"/>
                <column name="order_key" type="integer"/>
            </RDB_node>
        </attribute_node>
        <element_node name="Customer">
            <element_node name="Name">
                <text_node>
                    <RDB_node>
                        table name="order_tab"/>
                        <column name="customer_name" type="char(128)"/>
                    </RDB_node>
                </text_node>
            </element_node>
            <element_node name="Email">
                <text_node>
                    <RDB_node>
```

```xml
            <table name="order_tab"/>
            <column name="customer_email" type="char(128)">
        </RDB_node>
      </text_node>
    </element_node>
  </element_node>
  <element_node name="Part">
    <attribute_node name="Color">
      <RDB_node>
        <table name="part_tab"/>
        <column name="color"/>
      </RDB_node>
    </attribute_node>
    <element_node name="Key">
      <text_node>
        <RDB_node>
          <table name="part_tab"/>
          <column name="part_key" type="integer"/>
        </RDB_node>
      </text_node>
    </element_node>
    <element_node name="ExtendedPrice">
      <text_node>
        <RDB_node>
          <table name="part_tab"/>
          <column name="price" type="real"/>
          <condition>
            price > 2500.00
          </condition>
        </RDB_node>
      </text_node>
    </element_node>
    <element_node name="Tax">
      <text_node>
        <RDB_node>
          <table name="part_tab"/>
          <column name="tax" type="real"/>
        </RDB_node>
      </text_node>
    </element_node>
    <element_node name="Quantity">
      <text_node>
        <RDB_node>
          <table name="part_tab"/>
          <column name="qty" type="integer"/>
        </RDB_node>
      </text_node>
    </element_node>
    <element_node name="shipment">
      <element_node name="ShipDate">
        <text_node>
          <RDB_node>
            <table name="ship_tab"/>
            <column name="date" type="date"/>
            <condition>
              date > 'Jan. 01, 1966'
            </condition>
          </RDB_node>
        </text_node>
      </element_node>
      <element_node name="ShipMode">
        <text_node>
          <RDB_node>
            <table name="ship_tab"/>
            <column name="mode" type="char(128)"/>
          </RDB_node>
        </text_node>
      </element_node>
      <element_node name="Comments">
        <text_node>
          <RDB_node>
            <table name="ship_tab"/>
            <column name="comments" type="varchar(2000)"/>
          <RDB_node>
        </text_node>
      </element_node>
    </element_node> <!-- end of element Shipment -->
  </element_node> <!-- end of element Part -->
</element_node> <!-- end of element Order -->
```

```
</root_node>
</Xcollection>
</DAD>
```

G.3 Detailed Techniques

The following discussion focuses on the technique for one embodiment of the invention. In particular, the following includes pseudocode and data structures used by the technique.

G.3.1 Data Structures

The following data structures are used for decompostion of XML documents using RDB-nodes.

```
/* ---------------------------------*
Column to XML node pair
*---------------------------------*/
typedef struct col2xml {
char col[DB2_TAB_COL_VIEW_LEN];
char dataType[DB2_TAB_COL_VIEW_LEN+8]; /* data type of the column */
char xml[DXX_XML_FIELD_SIZE]; /* xml can be attribute or element name */
int xmlType; /* DXX_ATTRIBUTE or DXX_TEXT */
int xmlLevel; /* for determining if a column
            needs to be copies to the
            next row */
int indexInSQLDA;
} DXX_COL2XML;
/*---------------------------------
* Table and Column pair
*---------------------------------*/
typedef struct tabcol {
char tab[DB2_TAB_COL_VIEW_LEN];
char col[DB2_TAB_COL_VIEW_LEN];
int indexInSQLDA;
} DXX_TAB_COL;
/*---------------------------------
* Join information
*---------------------------------*/
typedef struct join_info {
char col[DB2_TAB_COL_VIEW_LEN];
            /* column used in the join condition */
int num_join; /* number of foreign columns to be joined */
DXX_TAB_COL foreign[DXX_NUM_FOREIGN];
    /* foreign column and its table to be joined */
} DXX_JOIN_INFO;
/*---------------------------------
* Primary key Information:
*---------------------------------*/
typedef struct pri_key {
int num_col; /* number of columns in the key */
char name[DXX_NUM_MAPPING][DB2_TAB_COL_VIEW_LEN];
        /* the column names of the primary key */
} DXX_PRIKEY;
/*---------------------------------
* Foreign key Information:
*---------------------------------*/
typedef struct for_key {
int num_col; /* number of columns in the key */
DXX_COL2XML col[DXX_NUM_MAPPING];
        /* the columns of the foreign key */
} DXX_FORKEY;
/*---------------------------------
* Table Information:
---------------------------------*/
typedef struct tab {
char name[DB2_TAB_COL_VIEW_LEN]; /* name of the table */
DXX_PRIKEY pri_key; /* primary key */
DXX_FORKEY for_key; /* foreign key */
int level; /* relational level of the table */
char top_element[DXX_XML_FIELD_SIZE];
        /* the highest level of XML element using
        * column data of this table */
char sql_stmt[MAX_STMT_LEN]; /* SQL statement */
SQLHSTMT hstmt; /* CLI statement handle */
struct sqlda *sqldaPtr; /* pointer of selected data */
int num_col; /* number of columns which data used in the
```

```
       * XML document */
DXX_COL2XML col2xml[DXX_NUM_MAPPING];
       /* mapping between columns in this table to
       * XML attribute or element text */
int num_join; /* number of columns in this table which
       * will form join conditions */
DXX_JOIN_INFO join_info[DXX_NUM_JOIN_IN_TABLE]; /* join information *
char condition[DXX_CONDITION_IN_REL];
/* condition of select for columns in this
* table */
} DXX_TAB;
/*--------------------------------------------
* Relation Information for entire XML documents
*--------------------------------------------*/
typedef struct rel {
int current_level; /* the current XML level during treversal */
int num_tables; /* number tables to generate/decompose XML doc*/
DXX_TAB *tab[DXX_NUMTAB_IN_REL]; /* details of each table */
char **top_elements; /* index to tab[i]->top_element for fast search. */
SQLHDBC hdbc; /* CLI connection handle */
} DXX_REL;
/*--------------------------------------------
* Data structure to store a row
*--------------------------------------------*/
typedef struct row {
int num_col;
char **coldata; /* Array of pointers */
} DXX_ROW;
/*--------------------------------------------
* Data structure to store the rows
*--------------------------------------------*/
typedef struct rows {
int num_rows;
DXX_ROW *row[DXX_MAX_ROWS];
} DXX_ROWS;
```

The following routine will enable a column.
enableColl(dadbuf,tablespace,sqlstate, msgtext)
  dadbuf------------a memory buffer containing a document ac
  sqlstate----------OUT: the SQL state in case of errors
  msgtext-----------OUT: message text in case of errors Note that in the following routine, the sqlstate and msgtext are ignored in one embodiment.

```
       DOMElement dad;
       DOMElement dad_root_element;
       DXX_REL relation_info;
       DXX_REL *rel = &relation_info;
   /* Parse the DAD and prepare the SQL query */
       parse dad_buf to get the DOM tree of DAD;
       dad_root_element = the first element_node of dad;
   /* init relational structure */
       rel->current_level = 0;
       rel->num_tables = 0;
```

```
   /* set relational structure */
       setRel(rel,dad,DXX_DECOMPOSE);
   /* process relational information */
       process_rel(rel,dad_root_element,0,DXX_DECOMPOSE);
   /* prepare tables */
       prepare_tables(rel,tablespace);
   /* Register collection in XML_usage table */
       insert a new row into XML_usage table, using collection name;
}
```

G.3.2 Setup Relational Structure

This routine will process the RDB_node of the top element code and initialize the REL structure of entire XML documents. After the process, all tables involved in composing/decomposing XML documents should be included in the REL structure, and the relationship between tables should also be recorded in the REL.

```
setRel(rel,dad, dxx_type) {
    working variable:
        DXX_TAB *current_tab;
    get the RDB_node of the top_element_node;
    if no RBD_node
        return error;
    for each table in RDB_node do {
        allocate space for current_tab;
        current_tab->name = RDB_node's table name;
        if (dxx_type == DXX_DECOMPOSE)
            current_tab->primary_key_name = RDB_node's table key;
        current_tab->top_element = NULL;
```

-continued

```
        current_tab->level = 0;
        current_tab->num_col = 0;
        current_tab->selectDaPtr = NULL;
        current_tab->condition = NULL;
        if ( RDB_node's condition != NULL )
        scan the condition of RDB_node,
        current_tab->num_join = 0;
        for each current_tab.column in the predicate do {
            i = current_tab->num_join;
            current_tab->join_info[i].col = current_tab.column;
            current_tab->join_info[i].num_join = 0;
            for each other_tab.col = current_tab.column do {
                j = current_tab->join_info[i].num_join;
                current_tab->join_info[i].foreign[j].col = col in other_tab
                current_tab->join_info[i].foreign[j].tab = other_tab
                current_tab->join_info[i].foreign[j].indexInSQLDA=DXX_NONE
                current_tab->join_info[i].num_join++;
            }
            current_tab->num_join++;
        }
    rel->tab[i] = current_tab;
    rel->num_tables++;
}
    Example:
        rel->tab[0].name = "order_tab";
        rel->tab[0].primary_key_name = "order_key";
        rel->tab[0].level = 0;
        rel->tab[0].top_element = NULL;
        rel->tab[0].selectDaPtr = NULL;
        rel->tab[0].num_col = 0;
        rel->tab[0].num_join = 1;
        rel->tab[0]->join_info[0]->col = "order_key";
        rel->tab[0]->join_info[0]->num_join = 1;
        rel->tab[0]->join_info[0]->foreign[0].col = "o_key";
        rel->tab[0]->join_info[0]->foreign[0].tab = "part_tab";
        rel->tab[0]->join_info[0]->foreign[0].indexInSQLDA = DXX_NONE;
        rel->tab[0]->condition = NULL;
        rel->tab[1].name = "part_tab";
        rel->tab[1].primary_key_name = "part_key";
        rel->tab[1].level = 0;
        rel->tab[1].top_element = NULL;
        rel->tab[1].selectDaPtr = NULL;
        rel->tab[1].num_col = 0;
        rel->tab[1].num_join = 2;
        rel->tab[1]->join_info[0]->col = "o_key";
        rel->tab[1]->join_info[0]->num_join = 1;
        rel->tab[1]->join_info[0]->foreign[0].col = "order_key";
        rel->tab[1]->join_info[0]->foreign[0].tab = "order_tab";
        rel->tab[1]->join_info[0]->foreign[0].indexInSQLDA = DXX_NONE;
        rel->tab[1]->join_info[1]->col = "part_key";
        rel->tab[1]->join_info[1]->num_join = 1;
        rel->tab[1]->join_info[1]->foreign[0].col = "p_key";
        rel->tab[1]->join_info[1]->foreign[0].tab = "ship_tab";
        rel->tab[1]->join_info[1]->foreign[0].indexInSQDLA = DXX_NONE;
        rel->tab[1]->condition = NULL;
        rel->tab[2].name = "ship_tab";
        rel->tab[2].primary_key_name = "ship_date";
        rel->tab[2].top_element = NULL;
        rel->tab[2].level = 0;
        rel->tab[2].selectDaPtr = NULL;
        rel->tab[2].num_col = 0;
        rel->tab[2].num_join = 1;
        rel->tab[2]->join_info[0]->col = "p_key";
        rel->tab[2]->join_info[0]->num_join = 1;
        rel->tab[2]->join_info[0]->forign[0].col = "part_key";
        rel->tab[2]->join_info[0]->forign[0].tab = "part_tab";
        rel->tab[2]->join_info[0]->foreign[0].indexInSQLDA = DXX_NONE;
        rel->tab[2]->condition = NULL;
        rel->num_tables = 3;
```

G.3.2.1 Process Relational Information

This is the second phase of the preparation process to gather all information to generate SQL statements. It recursively processes each RDB_node for each attribute, text, and element node of DAD, and records the mapping relationship into the REL data structure.

```
process_rel(rel, dom_node,current_level, dxx_type)
{
  /* The first pass fills in everything in rel,
     except foreign_key. */
  process_rel1(rel, dom_node.current_level, dxx_type):
  if (dxx_type == DXX_DECOMPOSE) {
    /* The second pass fills in the foreign_key of each table
       in rel and update num_col. */
    process_rel2(rel);
  }
  findTopElements(rel, dom_node, dxx_type);
  Create a hash table or sorted array of all top_elements
  rel->top_elements for fast search.
}
process_rel1(rel, dom_node, dxx_type)
{
  if (dom_node type == element_node) {
    rel->current_level++;
    child = DOMGetFirstChild;
    while ( child != NULL ) {
      process_rel1(rel,child,dxx_type);
      child = DOMGetNextchild;
    }
  }
  if (type == attribute_node ||
      type == text_node ||
      (dom_node is a leaf element node && DXX_DECOMPOSE)) {
    call DOMgetChild to get the RDB_node of dom_node;
    if ( there is no RDB_node )
    call process_RDB_node(rel,dom_node, RDB_node.dxx_type);
  }
  if (dom_node type == element_node)
    rel->current_level--;
}
/* Fill in the foreign_key of each table in rel. */
process_rel2(rel)
{
  /* Working variables: */
  DXX_TAB *foreignTab;
  for (tabIndex = 0; tabIndex < rel->num_tables; tabIndex++) {
    current_tab = rel->tab[tabIndex];
    for (i = 0; i < current_tab->num_join; i++ ) {
      for ( j=0; j< current_tab>join_info[i].num_join; j++ ) {
        foreignTab = findTabByName(rel,
               current_tab->join_info[i].foreign[j].tab);
        if (foreignTab->level < current_tab->level) {
          strcpy(current_tab->foreign_key.col,
              current_tab->join_info[i].foreign[j].col);
          Find k such that foreignTab->col2xml[k].col
            equals current_tab->foreign_key.col;
          current_tab->foreign_key.xml =
            foreignTab->col2xml[k].xml;
          current_tab->foreign_key.xmlType =
            foreignTab->col2xml[k].xmlType;
          current_tab->foreign_key.dataType =
            foreignTab->col2xml[k].dataType;
        }
      }
    }
  }
}
```

G.3.2.2 Process RDB_node
The following routine will process a RDB_node.

```
process_RDB_node(rel,dom_node, rdb_node, dxx_type)
{
  working variables:
    DXX_TAB *mytab;
    int i;
  /* It is attribute_node, text_node, or a leaf element_node in
     DAD. */
  /* Note: table must be specified in RDB_node */
    mytab = rel->tab[?] such that mytab.name = table of RDB_node
    if no mytab found
      return error;
    i = mytab->num_col;
    mytab->col2xml[i].col=column of RDB_node;
    mytab->col2xml[i].xmlLevel = current_level;
    if ( dxx_type == DXX_DECOMPOSE ) {
      mytab->col2xml[i].dataType= type of RDB_node;
    }
    if ( it is an attribute_node ) {
      mytab->col2xml[i].xml=name of the attribute
      if (dxx_type == DXX_DECOMPOSE)
        mytab->col2xml[i].xmlType = DXX_ATTRIBUTE;
    }
    else if (it is a text_node) {
      mytab->col2xml[i].xml=name of the parent element_node;
      if (dxx_type == DXX_DECOMPOSE)
        mytab->col2xml[i].xmlType = DXX_TEXT;
    } else { /* It is a leaf element_node in DAD. */
      mytab->col2xml[i].xml=name of element_node;
      if (dxx_type == DXX_DECOMPOSE)
        mytab->col2xml[i].xmlType = DXX_ELEMENT;
    }
    mytab->num_col++;
    if ( condition != NULL )
      add condition to mytab->condition;
}
```

Definition of a Qualifying Parent:

The parent p of an element qualifies for a table t if all of the following four conditions are met;

p exists.

p is intermediate.

p has multi_occurrence==YES p does not have any child mapped to a table other than t.

Intuitively, if a parent qualifies for a table, it is a candidate to be chosen as the top-element of the table.

Definition of Top-element:

Let e be the highest element in DAD that belongs to a table t.

If e does not have a parent qualifying for t, then e is the top-element of t.

Otherwise, the top-element of t is the highest element in the parent chain of e that does not have a parent qualifying for t.

```
findTopElement(rel,dom_node, rdb_node, dxx_type)
{
  working variables:
    DXX_TAB *mytab;
    int i;
  /* It is attribute_node, text_node, or a leaf element_node in DAD. */
  /* Note: table must be specified in RDB_node */
    mytab = rel->tab[?] such that mytab.name = table of RDB_node
    if no mytab found
```

```
            return error;
        if ( mytab->top_element == NULL ) {
            parent_node = parent element_node of this dom_node;
            grandparent_node = parent of the parent_node;
            while ( grandparent_node exists &&
                grandparent_node is intermediate &&
                grandparent_node has multiple occurrence &&
                grandparent_node does not have children mapped to
                other tables ) {
            parent_node = grandparent_node;
            grandparent_node = parent of the grandparent_node;
            }
            mytab->top_element = name of the parent_node;
        }
    }
    /* findTopElements finds the top-element for each table in rel. */
    /* Because of a problem raised by Dorine Yelton, we can no longer find
        the top element during process_RDB_node in process_rel1. */
    /* findTopElements assumes that process_rel1 has been called. */
    findTopElements(rel, dom_node, dxx_type)
    {
        if (dom_node type == element_node) {
            rel->current_level++;
            child = DOMGetFirstChild;
            while ( child != NULL ) {
                findTopElements(rel,child,dxx_type);
                child = DOMGetNextchild;
            }
        }
        if (type == attribute_node ||
            type == text_node ||
            (dom_node is a leaf element node && DXX_DECOMPOSE)) {
            call DOMgetChild to get the RDB_node of dom_node;
            if ( there is no RDB_node )
                    return error;
            call findTopElement(rel,dom_node, RDB_node,dxx_type);
        }
    if (dom_node type == element_node)
        rel->current_level--;
}
Example:
            rel->tab[0].name = "order_tab";
            rel->tab[0].primary_key_name = "order_key";
            rel->tab[0].foreign_key.col = " ";
            rel->tab[0].top_element = "Order";
            rel->tab[0].selectDaPtr = NULL;
            rel->tab[0].num_col = 3;
            rel->tab[0]->col2xml[0].xml= "Key";
            rel->tab[0]->col2xml[0].col="order_key";
            rel->tab[0]->col2xml[0].dataType="integer";
            rel->tab[0]->col2xml[0].xmlType=DXX_ATTRIBUTE;
            rel->tab[0]->col2xml[0].xmlLevel=0;
            rel->tab[0]->col2xml[1].xml= "name";
            rel->tab[0]->col2xml[1].col="customer_name";
            rel->tab[0]->col2xml[1].dataType="char(128)";
            rel->tab[0]->col2xml[1].xmlType=DXX_TEXT;
            rel->tab[0]->col2xml[1].xmlLevel=2;
            rel->tab[0]->col2xml[2].xml= "email";
            rel->tab[0]->col2xml[2].col="customer_email";
            rel->tab[0]->col2xml[2].dataType="char(128)";
            rel->tab[0]->col2xml[2].xmlType=DXX_TEXT;
            rel->tab[0]->col2xml[2].xmlLevel=2;
            rel->tab[0].num_join = 1;
            rel->tab[0]->join_info[0]->col = "order_key";
            rel->tab[0]->join_info[0]->num_join = 1;
            rel->tab[0]->join_info[0]->foreign[0].col = "o_key";
            rel->tab[0]->join_info[0]->foreign[0].tab = "part_tab";
            rel->tab[0]->join_info[0]->foreign[0].indexInSQLDA = DXX_NONE;
            rel->tab[0]->condition = NULL;
            rel->tab[1].name = "part_tab";
            rel->tab[1].primary_key_name = "part_key";
            rel->tab[1].foreign_key.col = "order_key";
            rel->tab[1].foreign_key.dataType = "integer";
            rel->tab[1].foreign_key.xml = "Key";
            rel->tab[1].foreign_key.xmlType = DXX_ATTRIBUTE;
            rel->tab[1].top_element = "Part";
            rel->tab[1].selectDaPtr = NULL;
            rel->tab[1].num_col = 5;
            rel->tab[1]->col2xml[0].xml = "Color";
```

-continued

```
rel->tab[1]->col2xml[0].col = "Color";
rel->tab[1]->col2xml[0].dataType="char(5)";
rel->tab[1]->col2xml[0].xmlType=DXX_ATTRIBUTE;
rel->tab[1]->col2xml[0].xmlLevel=1;
rel->tab[1]->col2xml[1].xml= "Key";
rel->tab[1]->col2xml[1].col="part_key";
rel->tab[1]->col2xml[1].dataType="integer";
rel->tab[1]->col2xml[1].xmlType=DXX_TEXT;
rel->tab[1]->col2xml[1].xmlLevel=2;
rel->tab[1]->col2xml[2].xml= "Quantity";
rel->tab[1]->col2xml[2].col="qty";
rel->tab[1]->col2xml[2].dataType="integer";
rel->tab[1]->col2xml[2].xmlType=DXX_TEXT;
rel->tab[1]->col2xml[2].xmlLevel=2;
rel->tab[1]->col2xml[3].xml= "ExtendedPrice";
rel->tab[1]->col2xml[3].col="price";
rel->tab[1]->col2xml[3].dataType="real";
rel->tab[1]->col2xml[3].xmlType=DXX_TEXT;
rel->tab[1]->col2xml[3].xmlLevel=2;
rel->tab[1]->col2xml[4].xml= "Tax";
rel->tab[1]->col2xml[4].col="Tax";
rel->tab[1]->col2xml[4].dataType="real";
rel->tab[1]->col2xml[4].xmlType=DXX_TEXT;
rel->tab[1]->col2xml[4].xmlLevel=2;
rel->tab[1].num_join = 2;
rel->tab[1]->join_info[0]->col = "o_key";
rel->tab[1]->join_info[0]->type = "integer";
rel->tab[1]->join_info[0]->num_join = 1;
rel->tab[1]->join_info[0]->foreign[0].col = "order_key";
rel->tab[1]->join_info[0]->foreign[0].tab = "order_tab";
rel->tab[1]->join_info[0]->foreign[0].indexInSQLDA = DXX_NONE;
rel->tab[1]->join_info[1]->col = "part_key";
rel->tab[1]->join_info[1]->type = "integer";
rel->tab[1]->join_info[1]->num_join = 1;
rel->tab[1]->join_info[1]->foreign[0].col = "p_key";
rel->tab[1]->join_info[1]->foreign[0].tab = "ship_tab";
rel->tab[1]->join_info[1]->foreign[0].indexInSQLDA = DXX_NONE;
rel->tab[1]->condition = "price > 2500.00";
rel->tab[2].name = "ship_tab";
rel->tab[2].primary_key_name = "ship_date";
rel->tab[2].foreign_key.col = "part_key";
rel->tab[2].foreign_key.dataType = "integer";
rel->tab[2].foreign_key.xml = "Key";
rel->tab[2].foreign_key.xmlType = DXX_TEXT;
rel->tab[2].top_element = "Shipment";
rel->tab[2].selectDaPtr = NULL;
rel->tab[2].num_col = 2;
rel->tab[2]->col2xml[0].xml= "ShipDate";
rel->tab[2]->col2xml[0].col="date";
rel->tab[2]->col2xml[0].dataType="date";
rel->tab[2]->col2xml[0].xmlType=DXX_TEXT;
rel->tab[2]->col2xml[0].xmlLevel=3;
rel->tab[2]->col2xml[1].xml= "ShipMode";
rel->tab[2]->col2xml[1].col="mode";
rel->tab[2]->col2xml[1].dataType="char(128)";
rel->tab[2]->col2xml[1].xmlType=DXX_TEXT;
rel->tab[2]->col2xml[1].xmlLevel=3;
rel->tab[2].num_join = 1;
rel->tab[2]->join_info[0]->col = "p_key";
rel->tab[2]->join_info[0]->type = "integer";
rel->tab[2]->join_info[0]->num_join = 1;
rel->tab[2]->join_info[0]->forign[0].col = "part_key";
rel->tab[2]->join_info[0]->forign[0].tab = "part_tab";
rel->tab[2]->join_info[0]->foreign[0].indexInSQLDA = DXX_NONE;
rel->tab[2]->condition = "date > '1966-01-01'";
rel->num_tables = 3;
```

G.3.3 Prepare Tables

The following routine checks whether the tables in the rel structure exist and creates new tables if they do not exist.

```
prepare_tables(DXX_REL *rel, tablespace)
{
    working variables:
    DXX_TAB *current_tab;
    for ( i=0; i < rel->num_tables; i++ ) {
        current_tab = rel->table[i];
        check whether the table current_tab->name exist;
        if ( table exists in database )
            check_table(current_tab, tablespace);
```

```
        else
            create_table(current_tab);
    }
}
```

G.3.3.1 Check Table

It is important to ensure that the existing table in the database complies with the DXX_tab data structure in memory.

```
check_table(DXX_TAB *tab) {
  /* Local variables: */
  int i;
  char mytypename[18];
  long mylength;
  /* Local host variables: */
  char tabname[8];
  char colname[8];
  char typename[18];
  long length;
  strcpy(tabname, tab->name);
  /* Check col2xml. */
  for (i=0; i<tab->num_col; i++) {
    strcpy(colname, tab->col2xml[i].col);
    /* Try to get column type and length from syscat. */
    EXEC SQL SELECT
        typename into :typename;
        length into :length
      FROM syscat.columns
      WHERE tabname = :tabname
        AND colname = :colname;
    if (SQLCODE == 100) {
      /* Error: Table <mv>tabname</mv>does not have column <mv>colname</mv>. */
    }
    Break down tab->col2xml[i].dataType into mytypename and mylength;
    if (mytypename is different from typename) {
      /* Error: Column <mv>colname</mv> of <mv>tabname</mv>
         should have type <mv>typename</mv>. */
    }
    if ((length > 0) &&
        (mylength > length)) {
      /* Error: Column <mv>colname</mv> of <mv>tabname</mv>
         cannot be longer than <mv>length</mv>. */
    }
  }
  /* Check join_info. */
  for (i=0; i<tab->num_join; i++) {
    strcpy(colname, tab->join_info[i].col);
    /* Try to get column type and length from syscat. */
    EXEC SQL SELECT
        typename into :typename,
        length into :length
      FROM syscat.columns
      WHERE tabname = :tabname
        AND colname = :colname;
    if (SQLCODE == 100) {
      /* Error: Table <mv>tabname</mv> does not have column <mv>colname</mv>. */
    }
  }
}
```

G.3.3.2 Create New Table for Decomposition

The following routine creates a new table for decomposition.

```
create_table(DXX_TAB *dxx_tab, tablespace) {
  working variables:
    char sql_stmt[];
    char col_stmt[];
    char col_type[];
  sprintf(sql_stmt,"CREATE table %s (",dxx_tab->name);
  /* create all columns from XML */
  for ( i = 0; i < dxx_tab->num_col; i++ ){
    init col_stmt;
    if ( dxx_tab->col2xml[i].col = dxx_tab->primary_key_name ) {
      /* key */
      sprintf(col_stmt," %s %s not null primary key,",
          dxx_tab->col2xml[i].col, dxx_tab->col2xml[i].dataType);
    }
    else {
      sprintf(col_stmt," %s %s,",
          dxx_tab->col2xml[i].col, dxx_tab->col2xml[i].dataType);
    }
    strcat(sql_stmt,col_stmt);
  }
```

```
if (dxx_tab->foreign_key.col[0]) {
  /* Add foreign key to sql_stmt. */
  sprintf(col_stmt, " %s %s ",
          dxx_tab->join_info[0].col,
          dxx_tab->foreign_key.dataType);
  strcat(sql_stmt, col_stmt);
  for ( i = 0; i < dxx_tab->num_join; i++ ){
    init col_stmt;
    if (dxx_tab->join_info[i].foreign[0].col ==
        dxx_tab->foreign_key.col) {
      sprintf(col_stmt,"REFERENCES %s(%s))",
              dxx_tab->join_info[i].foreign[0].tab,
              dxx_tab->join_info[i].foreign[0].col);
    }
  }
  strcat(sql_stmt,col_stmt);
}
Execute sql_stmt;
``` examples:
create table order_tab (order_key integer not null primary key,
  customer_name char(32),
  customer_email char(100));
create table part_tab (part_key integer not null primary key,
  price real,
  qty integer,
  tax real,
  o_key integer REFERENCES order_tab(order_key));
create table ship_tab (ship_date date not null primary key,
  ship_mode char(64),
  comments char(2k),
  p_key integer REFERENCES part_tab(part_key));

G.3.3.3 Insert XML Document Into an Enabled Collection

The following insert will insert an XML document into an enabled collection.

dxxInsert(collection_name,xmlobj,sqlstate, msgtext)
  collection_name----the name of enabled XML collection
  xmlobj------------the input XML document
  sqlstate----------OUT: the SQL state in case of errors
  msgtext-----------OUT: message text in case of errors Note that in the following routine, the sqlstate and msgtext are ignored in this embodiment.

```
dxxInsert(collection_name, xmlobj, sqlstate, msgtext) {
  working variable:
    DOMElement  dad_root_element;
    DOMNode     xml_root_element;
    DOMNodeList rootXMLNodeList;
    DXX_REL     relation_info;
    DXX_REL     *rel = &relation_info;
  /* retrieve DAD from XML_usage table */
  select DAD from xml_usage where col_name = collection
  /* get DAD and parse */
  parse DAD;
  set dad_root_element to be the root element_node of DAD;
  /* set relational structure */
    setRel(rel,dad,DXX_DECOMPOSE);
  /* process relational information */
    process_rel(rel,dad_root_element,0,DXX_DECOMPOSE);
  /* parse the xmlobj to get the DOM tree of XMLobj */
  parse xmlobj to get the xmldom of XML obj;
  xml_root_element = the root element of xmldom;
  create a rootXMLNodeList, which has only one node:
      xml_root_element;
  /* decompose XML obj */
  decompose_element(rel,rootXMLNodeList,dad_root_element);
}
```

G.3.3.4 Decompose Element
The following routine decomposes an element.

```
decompose_element (DXX_REL *rel,
      DOMNodeList *xml_element_nodes,
      DOMElement *dad_element_node)
{
  working variables:
      char sql_stmt[]; /* stmt for insert */
  char pre_insrt_stmt[]; /* stmt for insert */
  char dad_element_name[];
  DXX_TAB * current_tab;
  DXX_ROWS dxx_row;
  DXX_ROWS * dxx_rows = &dxx_row;
  char row[];
  HSTMT hstmt;
  1. call DOMgetAttribute to get element_name from dad_element_node;
  2. find current_tab = rel->table[i] such that
         rel->table[i].top_element = element_name;
     if not found then
         current_tab = rel->table[i] such that
         current_tab->col2xml[?].xml = element_name
  if (current_tab not found) {
  /* Call decompose_element on each children. */
  for each child node of the dad_element_node do
    if (the child node is an element_node) {
        child_name = child_dad_element_node's name:
        childXMLNodes = NULL;
        call dxx_getNodeList (xml_element_nodes,
            child_name, childXMLNodes);
        call decompose_element (rel, childXMLnodes,
            child_dad_element_node);
    }
  } else {
  3. if (current_tab->sql_stmt[0] == '\0') {
    /* Generate the SQL insertion stmt with parameter markers. */
```

```
        call generate_SQLi (current_tab, pre_insert_stmt) ;
    else
        strcpy (pre_insert_stmt, current_tab->sql_stmt) ;
    4. /* Fill the rows with the data from xml_element_nodes */
        call gen_rows (rel, current_tab, xml_element_nodes, dad_element_node.
            dxx_rows) ;
    5. /* insert the rows */
        CLI_AllocHandle (SQL_HANDLE_STMT, rel->hdbc, &hstmt) ;
        CLI_Prepare (hstmt, sql_stmt) ;
        for ( i = 0; i < dxx_rows->num_rows; i++) {
            init sql_stmt;
            dxxrow_to_stmt (pre_insert_stmt.
            dxx_rows->row[i],
            current_tab->col2xml,
            hstmt);
            CLI_Execute (hstmt) ;
          Free dxx_rows->row[i];
        }
        Free dxx_rows->row;
        CLI_FreeHandle (hstmt) ;
    6. for each child node of the dad_element_node do {
        if( (the child node is an element_node ) AND
        (current_tab->top_element != child_name) AND
        (current_tab->col2xml[?].xml != child_name)) {
        child_name = child_dad_element_node's name;
        childXMLNodes = NULL;
        call dxx_getNodeList (xml_element_nodes, child_name, childXMLNodes) ;
        call decompose_element (rel, childXMLnodes, child_dad_element_node) ;
        else /* covered by this one */
            ; /* do nothing */
        }
    } /* end if (current_tab not found) */
}
```

G.3.3.4.1 Get Node List

The following routine returns a list of nodes with a specified element_name from a right parent chain.

```
dxx_getNodeList(DOM_NodeList xml_element_nodes,
                char *child_name,
                DOM_NodeList *returnNodeList)
{
    /* Local variables: */
    int n;
    int i;
    n = xml_element_nodes.getLength();
    for (i=0; i<n; i++) {
        xml_element = xml_element_nodes.item(i);
        children = xml_element.getChildren();
        for each xml_child in the children do {
            if ( xml_child_name == child_name ) {
```

```
                add xml_child to returnNodeList;
                found = TRUE;
            }
        }
        if ( not found ) {
            dxx_getNodeList(children,element_name,returnNodeList);
        }
    } /* end of for i */
    return mynodeList;
}
```

G.3.3.4.2 Generate SQL

The following routine generates an SQL insertion statement with parameter markers.

```
generate_SQLi(DXX_TAB *current_tab, /* input */
              char *sql_stmt) /* output */
{
working variables:
    char[] insert_stmt;
/* Generate the first part of the statement,
    such as: INSERT INTO t1 (n,x,c)*/
sprintf(insert_stmt,"insert into %s (",current_tab->name);
for (i=0; i< current_tab—>num_col; i++) {
    sprintf(insert_stmt, "%s",current_tab—>col2xml[i].col);
}
/* Identify columns as the foreign key to parent table*/
for (i=0; i<current_tab—>for_key.num_col; i++) {
    strcat(insert_stmt, current_tab—>join_info[i].col);
    strcat(insert_stmt, ", ");
}
Remove the last comma from insert_stmt;
```

-continued

```
strcat(insert_stmt, ")");
strcpy(sql_stmt, insert_stmt);
/* Generate the rest of the statement with parm_markers.
   For example, a complete statement may look like:
      INSERT INTO t1 (n,x,c) SELECT * FROM
      TABLE(VALUES (CAST(? AS INTEGER),CAST(? AS DOUBLE),
         CAST(? AS CHAR(5)))) AS t(n,x,c)
      WHERE x≧2
*/
strcpy(colNames, strchr(insert_stmt, '('));
parm_markers[0] ='\0';
for (i=0; i<current_tab—>num_col; i++) {
   strcat(parm_markers, "CAST(? AS ");
   strcat(parm_markers, current_tab—>col2xml[i].dataType);
   strcat(parm_markers, "), ");
}
for (i=0; i<current_tab—>for_key.num_col; 1++) {
   strcat(parm_markers, "CAST(? AS ");
   strcat(parm_markers,
         current_tab—>for key.col[i].dataType);
            strcat(parm_markers, "), ");
}
Remove the last comma from parm_markers;
sprintf(sql_stmt,
        "%s SELECT * FROM TABLE( VALUES "
        "(%s)) AS t%s WHERE %s",
        insert_stmt, parm_markers, colNames,
        current_tab—>condition);
}
Example:
1. INSERT INTO order_tab (order_key, customer_name, customer_email)
   SELECT * FROM TABLE(VALUES (CAST(? AS INTEGER), CAST(? AS
   CHAR(128)),
                  CAST(? AS CHAR(128)))) AS
   t(order_key, customer_name, customer_email)
2. INSERT INTO part_tab (color, part_key, o_key)
   SELECT * FROM TABLE(VALUES (CAST(? AS CHAR(10)),CAST(? AS INTEGER),
                  CAST(? AS INTEGER))) AS
   t(color, part_key, o_key)
   WHERE price > 2500.00
3. INSERT INTO ship_tab (ship_date, ship_mode, p_key)
   SELECT * FROM TABLE( VALUES (CAST(? AS DATE), CAST(? AS CHAR(128)),
                  CAST(? AS INTEGER))) AS
   t(ship_date, ship_mode, p_key)
   WHERE date > 'Jan. 01, 1966'
```

G.3.3.4.3 Generate Row Data Structure

The following routine generates the row data structures from the data of xml_elements.

G.3.3.4.4 Get Row Data from an XML Element

The following routine gets the row data from an XML element.

```
gen_rows(DXX_REL *rel,
        DXX_TAB *current_tab,
        DOMNodeList xml_element_nodes,
        DOMElement dad_element_node,
        DXX_ROWS *dxxrows)
{
working valuble:
   DXX_ROW *row;
   get the element_name by call DOMGetAttribute of dad_element_node;
   /* initialize the internal data structure */
   dxxrows->num_rows = 0;
   for(i = 0; i< MAX_NUM_ROWS; i++)
      dxxrows->row[i] = NULL;
   /* loop to work on each instance of the xml_element_node */
   for (i = 0; i < xml_element_nodes.length; i++) {
      xml_element = (element) xml_element_nodes.item(i);
      call get_rows(rel, current_tab,xml_element,dad_element_node,dxxrows);
      }
}
```

```
get_rows(DXX_REL *rel,
         DXX_TAB *current_tab,
         DOMElement xml_element,
         DOMElement dad_element_node,
         DXX_ROWDATA *dxxrows)
{
   call DOMgetChildNodes to get a list of all children of
         dad_element_node
   for each child_node, do {
      if (isChildAttrNode ||
          isChildTextNode ||
          isChildElementNode) {
         set isChildInCurrentTab to TRUE, if the child_node name equals
         current_tab—>top_element or in its col2xml[];
         set isChildTopOfAnotherTab to TRUE if the child_node name equals
         to another_tab—>top_element where another_tab != current_tab.
         Use rel—>top_elements for fast search.
         if (isChildInCurrentTab ||
             isChildIntermediate ||
             isChildTextNode) {
            set isChildAttrNode to TRUE if the child_node is attribute_node;
            if(isChildAttrNode) {
               get attribute_name from child_node
               get_coldata(rel, current_tab,dxxrows,DXX_ATTRIBUTE,
                     xml_element,attribute_name);
            }
            if (isChildTextNode) {
               get element_name from child_node;
               get_coldata(rel, current_tab,dxxrows,DXX_TEXT.
                     xml_element, element_name);
            }
            if (isChildElementNode &&
                !isChildTopOfAnotherTab) {
               get name of the child node;
               Construct a single element node list (xml_element_nodes) for xml_element;
               nodeList = getNodeList(xml_element_nodes, child_element_name);
               for each node in Nodlist do {
                  call get_rows(rel, current_tab.child_xml_element,
                        dad_child_element_node,
                        dxxrows);
               }
            }
         } else {
            /* Child is not in current tab.
                  Do nothing. */
         }
      }
   }
   if (there is no significant child &&
         dad_element_node is in current_tab) {
      /* This dad_element_node is a leaf-node and should be inserted
            without decomposition. */
      get_coldata(rel, current_tab, dxxrows, DXX_ELEMENT,
            xml_element, element_name);
   }
}
```

G.3.3.4.5 Get Data from Column

The following routine gets data from a column.

```
/* Get data from its column. */
get_coldata(DXX_REL *rel,
            DXX_TAB *current_tab,
            DXX_ROWS *dxxrows,
            int xmlType,
            DOMElement xml_element,
            char *xml_name)
{
   /* working variables: */
   int colIndex;
   int colType;
   int xmlLevel;
   DXX_ROW *row;
   /* find column index */
```

-continued

```
   for (i = 0; i < current_tab—>num_col; i++) {
      if(current_tab—>col2xml[i].xml = xml_name) {
         colIndex = i;
         colType = current_tab—>col2xml[i].dataType;
         xmlLevel = current_tab—>col2xml[i].xmlLevel;
         break;
      }
   }
   if(xmlType == DXX_ATTRIBUTE) {
      data = xml_element.DOMGetAttribute(xml_name);
   } else if(xmlType == DXX_TEXT) {
      xml_text_nodelist = the text child nodes of xml_element;
      Concatenate all the text from xml_text_nodelist and
      set it to xml_text_node;
      data = xml_text_node.getNodeValue();
```

```
} else {
/* xmlType == DXX_ELEMENT */
data = serialize xml_element as XML;
}
length = strlen(data);
if(colType is char, varchar, date, time, or timestamp) {
   /* Enclose the data with single-quotes. */
   check length with colType;
   length+2;
}
if (dxx_rows—>num_rows == 0 ) {
   allocate dxx_rows—>row[0];
   dxx_rows—>num_rows++;
   row = dxx_rows—>row[0];
   row—>num_col = current_tab—>num_col;
   allocate row—>coldata
      as an array of size row—>num_col;
   memset row—>coldata[...] to NULL;
   get_foreign_key_value(rel,
             xml_element,
             current_tab—>foreion_key,
             &(row—>coldata[row—>num_col-1]));
}
else {
   previous_row = dxx_rows[dxx_rows—>num_rows-1];
   if (previous_row—>coldata[colIndex] == NULL) {
      /* we know that it is not filled */
      row = previous_row;
   }
   else {
      /* previous_row's coldata is filled */
      allocate dxx_rows[dxx_rows—>num_rows]
      row = dxx_rows[dxx_rows—>num_rows];
      row—>num_col = current_tab—>num_col;
      allocate row—>coldata
         as an array of size row—>num_col;
      copy_row(row,previous_row,colIndex,current_tab);
      get_foreign_key_value(rel,
             xml_element,
             current_tab—>foreign_key,
             &(row—>coldata[row—>num_col-1]));
      dxx_rows—>num_rows++;
   }
}
row—>coldata[colIndex]=malloc(length+1);
copy data to row—>coldata[i], add single-quotes if needed;
}
```

G.3.3.4.6 Get Foreign Key Values

```
/* Get foreign key value by climbing the DOM tree. */
get_foreign_key_value(DXX_REL *rel,
             DOM_Element xml_element,
             DXX_COL2XML *foreign_key,
             char **foreign_key_value) /* OUT */.
{
  /* working variables: */
  DOM_Element parent;
  char        *data;
  DOM_NodeList nl;
  DOM_Element e;
  parent = xml_element.getParentNode();
  while (parent is in the same table as xml_element ||
         parent is an intermediate node) {
     parent = parent.getParentNode();
  }
  switch(foreign_key—>xmlType) {
  case DXX_ATTRIBUTE:
     data = parent.getAttribute(foreign_key—>xml);
     break;
  case DXX_TEXT:
     nl = parent.getElementsByTagName(foreign_key—>xml);
     e = nl.item(0); /* the first element whose name is foreign_key—>xml */
     data = e.getFirstChild().getNodeValue();
     break;
  default:
     /*error: unknown foreign_key_xmlType */
  } /* end of switch(foreign_key_xmlType) */
  Allocate *foreign_key_value;
  Copy data into * foreign_key_value and
     enclose the data with single-quotes if needed
     according to foreign_key—>dataType;
}
/* Copy the columns of a row down to the current level. */
copy_row(DXX_ROW *row,
          DXX_ROW *previous_row,
          int colIndex,
          DXX_TAB *current_tab) {
num_cols = previous_row—>num_cols +
           (current_tab—>foreign_key.col[0])? 1: 0;
for(i = 0; i < num_cols;i++) {
   previousLevel = current_tab—>col2xml[i].xmlLevel;
   if(previous_row—>coldata[i] != NULL && i !=colIndex
      && previousLevel ≤ current_tab—>level) {
      row—>coldata[i] = strdup(previous_row—>coldata[i]);
   } else {
      row—>coldata[i] = NULL;
   }
 }
}
```

G.3.3.4.7 Insert Bind

The following routine binds the parameters of an INSERT statement with the data in a row structure using CLI.

```
dxxrow_to_stmt(char *prefix,
          DXX_ROW *row,
          COL2XML *col2xml,
          SQLHSTMT hstmt)
{
  /* Local variables: */
  CLI_type. CLI_size, CLI_digits, bufLen;
  int i;
  for (i=0; i<row—>num_col; i++) {
   Get the CLI parameters CLI_type, CLI_size, and CLI_digits.
   CLI_BindParameter(hstmt, i+l, SQL_PARAM_INPUT.SQL_C_CHAR.
           CLI_type, CLI_size, CLI_digits,
           row—>coldata[i], bufLen, NULL);
  }
}
```

G.3.3.5 Shred XML Document into DB2 Databases

The following routine shreds an XML document into a DB2 database. The stored procedure dxxShredXML( ) works the same as dxxInsertXML( ) except that it takes a DAD as the first input parameter instead of a name of an enabled XML collection. Therefore, it can be called without enabling an XML collection.

The stored procedure dxxShredXML( ) inserts an input XML document into an enabled XML collection according to the Xcollection specification in the input DAD. If the tables used in the Xcollection of the DAD do not exist or the columns do not meet the data types specified in the DAD mapping, an error will be returned. The stored procedure dxxShredXML( ) decomposes the input XML document and inserts fragmented XML data into the tables specified in the DAD.

Stored Procedure Declaration:
dxxShredXML(char(128) DAD_buf, /* input */
   CLOB xmlobj, /* input */
   long *errCode, /* output */
   varchar(1024) *errMsg) /* output */

Parameters:
   DAD_buf: a buffer containing the DAD,
   xmlobj: IN, an XML document object in XMLCLOB type.
   errCode: OUT, return code in case of error,
   errMsg:OUT, message text in case of error.

The following is an example of the dxxShredXML( ) call.

```
EXEC SQL INCLUDE SQLCA;
EXEC SQL BEGIN DECLARE SECTION;
    char DAD_buf[128]; /* name of an XML collection */
    SQL TYPE is CLOB_FILE xmlDoc;/* input XML document */
    long errCode; /* error code */
    char errMsg[1024]; /* error message text */
    short dad_ind
    short xmlDoc_ind;
    short errCode_ind;
    short errMsg_ind;
EXEC SQL END DECLARE SECTION;
/*....... suppose the ptrBuf has DAD content */
/* initialize host variable and indicators */
strcpy(DAD_buf,ptrBuf);
strcpy(xmlobj.name,"e:\xml\order1.xml");
xmlobj.name_length=strlen("e:\xml\order1.xml");
xmlobj.file_option=SQL_FILE_READ;
errCode = 0;
errMsg[0] ='\0';
dad_ind = 0;
xmlobj_ind = 0;
errCode_ind = -1;
errMsg_ind = -1;
/* Call the stored procedure */
EXEC SQL CALL db2xml!dxxShredXML(:DAD_buf:dad_ind;
        :xmlobj:xmlobj_ind,
        :errCode:errCode_ind,:errMsg:errMsg_ind);
```

If the content of DAD_buf has the Litem_DAD3.dad content, then the dxxShredXML( ) call will decompose the input XML document "e:\xml\order1.xml" and insert data into the sales_order collection tables.

CONCLUSION

This concludes the description of an embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method transforming data stored on a data storage device that is connected to a computer, the method comprising:
   generating a document object model tree using a document access definition, wherein the data access definition defines: (1) a collection of one or more tables in a relational database management system for storing attributes for an XML document, (2) how data stored in the tables maps to the XML document, (3) a query for mapping the data stored in the tables to the XML document, and (4) a table that will contain the XML document after the XML document is generated;
   traversing the document object model tree to obtain information to retrieve relational data from the relational database management system; and
   mapping the relational data to one or more XML documents using the document access definition.

2. The method of claim 1, wherein the document access definition defines a mapping between the relational data and one or more XML documents.

3. The method of claim 1, wherein the document object model tree comprises one or more relational database nodes.

4. The method of claim 3, wherein a relational database node comprises an attribute node that maps to a column of a relational database table.

5. The method of claim 3, wherein a relational database node comprises an element node that maps to a column of a relational database table.

6. The method of claim 3, wherein a relational database node comprises a text node that maps to a column of a relational database table.

7. The method of claim 3, wherein the relational database node identifies a relational table into which XML document data is to be stored.

8. The method of claim 3, wherein the relational database node identifies a column in a relational table that contains XML document data to be retrieved.

9. The method of claim 3, wherein the relational database node identifies one or more predicates used to select column data from a relational table to store into one or more XML documents.

10. The method of claim 3, wherein the relational database node identifies a join relationship for joining multiple tables.

11. The method of claim 10, wherein the relational database node identifies a primary and foreign key relationship for the join relationship.

12. The method of claim 1, further comprising generating queries to obtain relational data using the document object model tree.

13. The method of claim 1, wherein the relational data comprises an attribute value to be written to an XML document.

14. The method of claim 1, wherein the relational data comprises element text to be written to an XML document.

15. The method of claim 1, further comprising a stored procedure that receives the document access definition and outputs a table populated with the one or more XML documents.

16. An apparatus for transforming data, comprising:
a computer having a data store coupled thereto, wherein the data store stores data; and
one or more computer programs, performed by the computer, for generating a document object model tree using a document access definition, wherein the data access definition defines: (1) a collection of one or more tables in a relational database management system for storing attributes for an XML document, (2) how data stared in the tables maps to the XML document, (3) a query for mapping the data stored in the tables to the XML document, and (4) a table that will contain the XML document after the XML document is generated, traversing the document object model tree to obtain information to retrieve relational data from the relational database management system, and mapping the relational data to one or more XML documents using the document access definition.

17. The apparatus of claim 16, wherein the document access definition defines a mapping between the relational data and one or more XML documents.

18. The apparatus of claim 16, wherein the document object model tree comprises one or more relational database nodes.

19. The apparatus of claim 18, wherein a relational database node comprises an attribute node that maps to a column of a relational database table.

20. The apparatus of claim 18, wherein a relational database node comprises an element node that maps to a column of a relational database table.

21. The apparatus of claim 18, wherein a relational database node comprises a text node that maps to a column of a relational database table.

22. The apparatus of claim 18, wherein the relational database node identifies a relational table into which XML document data is to be stored.

23. The apparatus of claim 18, wherein the relational database node identifies a column in a relational table that contains XML document data to be retrieved.

24. The apparatus of claim 18, wherein the relational database node identifies one or more predicates used to select column data from a relational table to store into one or more XML documents.

25. The apparatus of claim 18, wherein the relational database node identifies a join relationship for joining multiple tables.

26. The apparatus of claim 25, wherein the relational database node identifies a primary and foreign key relationship for the join relationship.

27. The apparatus of claim 16, further comprising generating queries to obtain relational data using the document object model tree.

28. The apparatus of claim 16, wherein the relational data comprises an attribute value to be written to an XML document.

29. The apparatus of claim 16, wherein the relational data comprises element text to be written to an XML document.

30. The apparatus of claim 16, further comprising a stored procedure that receives the document access definition and outputs a table populated with the one or more XML documents.

31. An article of manufacture comprising a program storage medium readable by a computer and embodying one or more instructions executable by the computer to perform steps for transforming data in a data store connected to the computer, comprising:
generating a document object model tree using a document access definition, wherein the data access definition defines: (1) a collection of one or more tables in a relational database management system for storing attributes for an XML document, (2) how data stored in the tables maps to the XML document, (3) a query for mapping the data stored in the tables to the XML document, and (4) a table that will contain the XML document after the XML document is generated;
traversing the document object model tree to obtain information to retrieve relational data from the relational database management system; and
mapping the relational data to one or more XML documents using the document access definition.

32. The article of manufacture of claim 31, wherein the document access definition defines a mapping between the relational data and one or more XML documents.

33. The article of manufacture of claim 31, wherein the document object model tree comprises one or more relational database nodes.

34. The article of manufacture of claim 33, wherein a relational database node comprises an attribute node that maps to a column of a relational database table.

35. The article of manufacture of claim 33, wherein a relational database node comprises an element node that maps to a column of a relational database table.

36. The article of manufacture of claim 33, wherein a relational database node comprises a text node that maps to a column of a relational database table.

37. The article of manufacture of claim 33, wherein the relational database node identifies a relational table into which XML document data is to be stored.

38. The article of manufacture of claim 33, wherein the relational database node identifies a column in a relational table that contains XML document data to be retrieved.

39. The article of manufacture of claim 33, wherein the relational database node identifies one or more predicates used to select column data from a relational table to store into one or more XML documents.

40. The article of manufacture of claim 33, wherein the relational database node identifies a join relationship for joining multiple tables.

41. The article of manufacture of claim 40, wherein the relational database node identifies a primary and foreign key relationship for the join relationship.

42. The article of manufacture of claim 31, further comprising generating queries to obtain relational data using the document object model tree.

43. The article of manufacture of claim 31, wherein the relational data comprises an attribute value to be written to an XML document.

44. The article of manufacture of claim 31, wherein the relational data comprises element text to be written to an XML document.

45. The article of manufacture of claim 31, further comprising a stored procedure that receives the document access definition and outputs a table populated with the one or more XML documents.

* * * * *